US012752737B2

(12) United States Patent
Young et al.

(10) Patent No.: US 12,752,737 B2
(45) Date of Patent: Oct. 6, 2026

(54) USER INTERFACES FOR MANAGING CAR KEY CREDENTIALS

(71) Applicant: Apple Inc., Cupertino, CA (US)

(72) Inventors: Trevor W. Young, Livermore, CA (US); Alexander D. Pelletier, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 70 days.

(21) Appl. No.: 18/896,815

(22) Filed: Sep. 25, 2024

(65) Prior Publication Data

US 2025/0376129 A1 Dec. 11, 2025

Related U.S. Application Data

(60) Provisional application No. 63/656,979, filed on Jun. 6, 2024.

(51) Int. Cl.
*B60R 25/24* (2013.01)
*G06F 21/32* (2013.01)
*G07C 9/20* (2020.01)

(52) U.S. Cl.
CPC ............ *B60R 25/241* (2013.01); *G06F 21/32* (2013.01); *G07C 9/20* (2020.01)

(58) Field of Classification Search
None
See application file for complete search history.

(56) References Cited

U.S. PATENT DOCUMENTS 2,013,027 A 9/1935 Branch
8,353,448 B1 1/2013 Miller et al.
8,381,969 B1 2/2013 Miller et al.
8,466,875 B2 6/2013 Nakada et al.
8,720,771 B2 5/2014 Mackinnon Keith
8,943,187 B1 1/2015 Saylor
9,324,067 B2 4/2016 Van Os et al.
9,348,492 B1 5/2016 Penilla et al.
9,485,251 B2 11/2016 White et al.
9,608,970 B1 3/2017 Gehret et al.
9,961,408 B2 5/2018 Mickelsen et al.
10,057,227 B1 8/2018 Hess et al.
10,108,909 B2 10/2018 Sulavik et al.
10,163,105 B1 12/2018 Ziraknejad et al.
10,164,975 B1 12/2018 Son et al.
10,192,217 B1 1/2019 Ellis et al.
10,234,953 B1 3/2019 Li et al.
10,242,351 B1 3/2019 Wilson et al.
(Continued)

FOREIGN PATENT DOCUMENTS

AU 2021100511 A4 4/2021
AU 2021213717 A1 2/2022
(Continued)

OTHER PUBLICATIONS

Applicant-Initiated Interview Summary received for U.S. Appl. No. 18/628,031, mailed on Dec. 2, 2025, 2 pages.
(Continued)

*Primary Examiner* — Fekadeselassie Girma
(74) *Attorney, Agent, or Firm* — YHE Law LLP

(57) ABSTRACT

The present disclosure generally relates to managing car key credentials, including transferring a car key during a device setup process and configuring a new role for sharing a car key.

21 Claims, 32 Drawing Sheets

(56) References Cited

U.S. PATENT DOCUMENTS 10,275,956 B1 4/2019 Gehret et al.
10,282,727 B2 5/2019 Van Os et al.
10,332,104 B2 6/2019 Prakash et al.
10,339,521 B1 7/2019 Bodkin et al.
10,366,387 B2 7/2019 Aabye et al.
10,373,395 B1 8/2019 Harned et al.
10,503,912 B1 12/2019 Kerr
10,621,575 B1 4/2020 Belleville et al.
10,701,067 B1 6/2020 Ziraknejad et al.
10,769,625 B2 9/2020 Pandiarajan et al.
10,776,779 B1 9/2020 Ellis et al.
10,803,400 B2 10/2020 Sindia et al.
10,853,791 B1 12/2020 Ellis et al.
10,878,437 B2 12/2020 Ye et al.
11,026,085 B2 6/2021 Grange et al.
11,080,700 B2 8/2021 Ortiz et al.
11,127,013 B1 9/2021 Boyd et al.
11,134,294 B2 9/2021 Lee et al.
11,157,918 B1 10/2021 Ellison et al.
11,182,774 B1 11/2021 Boyd et al.
11,206,544 B2 12/2021 Boyd et al.
11,312,207 B1 4/2022 Sanders et al.
11,488,140 B2 11/2022 Bhuptani et al.
11,615,199 B1 3/2023 Poder et al.
11,748,507 B2 9/2023 Cool et al.
2002/0120867 A1 8/2002 Mitchell et al.
2005/0074126 A1 4/2005 Stanko
2005/0099275 A1 5/2005 Kamdar et al.
2005/0177867 A1 8/2005 Toutonghi
2006/0255906 A1 11/2006 Ghabra et al.
2008/0041936 A1 2/2008 Vawter
2008/0048022 A1 2/2008 Vawter
2008/0214150 A1 9/2008 Ramer et al.
2009/0320125 A1 12/2009 Pleasant et al.
2010/0026503 A1 2/2010 Proefke et al.
2010/0075656 A1 3/2010 Howarter et al.
2011/0077983 A1 3/2011 Hua et al.
2011/0113363 A1 5/2011 Hunt et al.
2011/0126003 A1 5/2011 Engert
2011/0131494 A1 6/2011 Ono et al.
2011/0165859 A1 7/2011 Wengrovitz
2011/0202988 A1 8/2011 Otranen et al.
2011/0231911 A1 9/2011 White et al.
2011/0282785 A1 11/2011 Chin
2012/0129493 A1 5/2012 Vasudevan
2012/0200390 A1 8/2012 Saravanan
2012/0323664 A1 12/2012 Klems
2013/0024371 A1 1/2013 Hariramani et al.
2013/0046600 A1 2/2013 Coppinger
2013/0073459 A1 3/2013 Zacarias et al.
2013/0099892 A1 4/2013 Tucker et al.
2013/0263211 A1 10/2013 Neuman et al.
2013/0275008 A1 10/2013 Breed
2013/0304642 A1 11/2013 Campos
2014/0047331 A1 2/2014 Feldman et al.
2014/0129053 A1 5/2014 Kleve et al.
2014/0244494 A1 8/2014 Davis et al.
2014/0244495 A1 8/2014 Davis et al.
2014/0244514 A1 8/2014 Rodriguez et al.
2014/0258110 A1 9/2014 Davis et al.
2014/0279519 A1 9/2014 Mattes et al.
2014/0304173 A1 10/2014 Ernsdorff
2014/0365466 A1 12/2014 Chu et al.
2015/0053757 A1 2/2015 Williams et al.
2015/0074774 A1 3/2015 Nema et al.
2015/0081346 A1 3/2015 Charles
2015/0134454 A1* 5/2015 Sandbrook ......... G06Q 30/0261 705/14.58
2015/0178721 A1 6/2015 Pandiarajan et al.
2015/0210287 A1 7/2015 Penilla et al.
2015/0271175 A1 9/2015 Je et al.
2015/0278780 A1 10/2015 Vaidyanathan et al.
2015/0294515 A1 10/2015 Bergdale et al.
2015/0324791 A1 11/2015 Khan
2015/0348001 A1 12/2015 Van Os et al.
2015/0363986 A1* 12/2015 Hoyos .................. H04W 12/08 340/5.61
2016/0018525 A1 1/2016 Lanzagorta
2016/0055511 A1 2/2016 Chidella et al.
2016/0057138 A1 2/2016 Hoyos et al.
2016/0070447 A1 3/2016 Righter et al.
2016/0072794 A1 3/2016 Engert
2016/0078143 A1 3/2016 Huang et al.
2016/0078581 A1 3/2016 Maher
2016/0134599 A1 5/2016 Ross et al.
2016/0152211 A1* 6/2016 Owens ................. B60R 25/102 348/148
2016/0180332 A1 6/2016 Wilczynski
2016/0232518 A1 8/2016 Butler et al.
2016/0252978 A1 9/2016 Yoo et al.
2016/0259497 A1 9/2016 Foss et al.
2016/0294831 A1 10/2016 Borunda et al.
2016/0295005 A1 10/2016 Schussmann et al.
2016/0300054 A1 10/2016 Turgeman et al.
2016/0343187 A1* 11/2016 Trani .................... H04W 4/021
2016/0357752 A1 12/2016 Yang et al.
2016/0373458 A1 12/2016 Moreton et al.
2017/0032485 A1 2/2017 Vemury
2017/0053470 A1 2/2017 Bergerhoff et al.
2017/0091765 A1 3/2017 Lloyd et al.
2017/0103388 A1 4/2017 Pillai et al.
2017/0109901 A1 4/2017 Raj
2017/0120864 A1 5/2017 Fischer et al.
2017/0124312 A1 5/2017 Inoue
2017/0140642 A1 5/2017 Kim
2017/0151928 A1 6/2017 Kang et al.
2017/0169528 A1 6/2017 Kundu et al.
2017/0213211 A1 7/2017 Sibert et al.
2017/0232933 A1 8/2017 Nishidai et al.
2017/0243200 A1 8/2017 Vaidyanathan et al.
2017/0248946 A1 8/2017 Ogura et al.
2017/0249791 A1 8/2017 Woo et al.
2017/0286648 A1 10/2017 Yamaguchi et al.
2017/0286656 A1 10/2017 Kohli
2017/0301205 A1* 10/2017 Blaser ................... H04W 48/02
2017/0337542 A1 11/2017 Kim et al.
2017/0339151 A1 11/2017 Van Os et al.
2017/0343200 A1 11/2017 Lai et al.
2017/0357520 A1 12/2017 De Vries et al.
2017/0357973 A1 12/2017 Van Os et al.
2018/0013769 A1 1/2018 Robinson et al.
2018/0018595 A1 1/2018 Scott et al.
2018/0018664 A1 1/2018 Purves et al.
2018/0029560 A1 2/2018 Mohaupt et al.
2018/0033034 A1 2/2018 Ye et al.
2018/0041503 A1 2/2018 Lindemann
2018/0103414 A1 4/2018 Golsch
2018/0108031 A1 4/2018 Jones et al.
2018/0130044 A1 5/2018 Gage et al.
2018/0165655 A1 6/2018 Marcelle et al.
2018/0165676 A1 6/2018 Bhatt et al.
2018/0167387 A1 6/2018 Bhatt et al.
2018/0186333 A1 7/2018 Santiano et al.
2018/0191501 A1 7/2018 Lindemann
2018/0195874 A1 7/2018 Andrew et al.
2018/0198909 A1 7/2018 Milstein
2018/0215344 A1* 8/2018 Santora ................... B60R 25/33
2018/0260553 A1 9/2018 Hoyos et al.
2018/0265095 A1 9/2018 Joe et al.
2018/0276657 A1 9/2018 Cho et al.
2018/0322488 A1 11/2018 Arana et al.
2018/0335928 A1 11/2018 Van Os et al.
2018/0336327 A1 11/2018 Wallace et al.
2018/0349581 A1 12/2018 Ramalingam
2018/0357846 A1 12/2018 Chen
2018/0367946 A1 12/2018 Best
2019/0043148 A1 2/2019 Vemury
2019/0057412 A1 2/2019 Bhattacharjee et al.
2019/0061687 A1 2/2019 Khalil
2019/0080070 A1 3/2019 Van Os et al.
2019/0080189 A1 3/2019 Van Os et al.
2019/0092279 A1 3/2019 Jarvis et al.
2019/0163876 A1 5/2019 Remme et al.
2019/0164165 A1 5/2019 Ithabathula

(56) References Cited

U.S. PATENT DOCUMENTS

| | | | |
|---|---|---|---|
| 2019/0168036 A1 | 6/2019 | Conboy | |
| 2019/0168410 A1 | 6/2019 | Conboy | |
| 2019/0171998 A1 | 6/2019 | Conboy | |
| 2019/0172149 A1 | 6/2019 | Conboy | |
| 2019/0172161 A1 | 6/2019 | Conboy | |
| 2019/0180021 A1 | 6/2019 | Mukundala | |
| 2019/0197527 A1 | 6/2019 | Agarwalla et al. | |
| 2019/0213525 A1 | 7/2019 | Haci et al. | |
| 2019/0220662 A1 | 7/2019 | Shenouda Dawoud | |
| 2019/0263356 A1 | 8/2019 | Golsch et al. | |
| 2019/0287111 A1 | 9/2019 | Cvetkovich et al. | |
| 2019/0304216 A1 | 10/2019 | Mendelson et al. | |
| 2019/0305949 A1 | 10/2019 | Hamel et al. | |
| 2019/0327228 A1 | 10/2019 | Pantfoerder et al. | |
| 2019/0355191 A1 | 11/2019 | Jones et al. | |
| 2019/0364020 A1 | 11/2019 | Wardell et al. | |
| 2019/0370781 A1 | 12/2019 | Van Os et al. | |
| 2020/0020196 A1 | 1/2020 | Petersen et al. | |
| 2020/0029173 A1 | 1/2020 | Pang et al. | |
| 2020/0052905 A1 | 2/2020 | Mathias et al. | |
| 2020/0065822 A1 | 2/2020 | Lin et al. | |
| 2020/0079320 A1 | 3/2020 | Lacoss-Arnold | |
| 2020/0125223 A1 | 4/2020 | Fu | |
| 2020/0126052 A1 | 4/2020 | Deliwala et al. | |
| 2020/0211031 A1 | 7/2020 | Patil | |
| 2020/0254875 A1 | 8/2020 | Strandberg | |
| 2020/0269811 A1 | 8/2020 | Kim et al. | |
| 2020/0320653 A1 | 10/2020 | Hastings et al. | |
| 2020/0349244 A1 | 11/2020 | Kim et al. | |
| 2020/0387686 A1 | 12/2020 | Jhang et al. | |
| 2020/0391049 A1 | 12/2020 | Moffat et al. | |
| 2021/0004792 A1 | 1/2021 | Kikinis et al. | |
| 2021/0014678 A1 | 1/2021 | Seagraves et al. | |
| 2021/0089635 A1 | 3/2021 | Weeresinghe | |
| 2021/0127233 A1 | 4/2021 | Santavicca et al. | |
| 2021/0168602 A1 | 6/2021 | Kim et al. | |
| 2021/0229630 A1 | 7/2021 | Kramar et al. | |
| 2021/0245367 A1* | 8/2021 | Zweig | G06F 9/4451 |
| 2021/0266500 A1 | 8/2021 | Taylor et al. | |
| 2021/0287768 A1 | 9/2021 | Craig et al. | |
| 2021/0319468 A1 | 10/2021 | Zhu et al. | |
| 2021/0319862 A1 | 10/2021 | Boyd et al. | |
| 2021/0321263 A1 | 10/2021 | Boyd et al. | |
| 2021/0373744 A1 | 12/2021 | Miller et al. | |
| 2021/0373745 A1 | 12/2021 | Chang | |
| 2021/0374714 A1 | 12/2021 | Chang | |
| 2021/0374750 A1 | 12/2021 | Miller et al. | |
| 2021/0377742 A1 | 12/2021 | Boyd et al. | |
| 2021/0392125 A1 | 12/2021 | Bryson | |
| 2022/0011999 A1 | 1/2022 | Lovelock et al. | |
| 2022/0014353 A1 | 1/2022 | Lim et al. | |
| 2022/0135001 A1 | 5/2022 | Alsina et al. | |
| 2022/0277295 A1 | 9/2022 | Robinson-Morgan et al. | |
| 2022/0332285 A1 | 10/2022 | Sanders et al. | |
| 2022/0391481 A1 | 12/2022 | Villanueva Gaviola et al. | |
| 2022/0391482 A1 | 12/2022 | Villanueva Gaviola et al. | |
| 2023/0039942 A1 | 2/2023 | Young et al. | |
| 2023/0045850 A1 | 2/2023 | Sammoura et al. | |
| 2023/0089689 A1 | 3/2023 | Pons Bordes et al. | |
| 2023/0089891 A1* | 3/2023 | Subramanian | B60R 25/02 726/18 |
| 2023/0234537 A1 | 7/2023 | Kramar et al. | |
| 2023/0394899 A1 | 12/2023 | Young | |
| 2024/0036713 A1 | 2/2024 | Chang | |
| 2024/0104188 A1 | 3/2024 | Villanueva Gaviola et al. | |
| 2024/0147243 A1 | 5/2024 | Villanueva Gaviola et al. | |
| 2024/0198960 A1 | 6/2024 | Kramar et al. | |
| 2024/0227620 A1* | 7/2024 | Tremblay | G06Q 10/02 |
| 2024/0253419 A1 | 8/2024 | Sanders et al. | |
| 2025/0083640 A1* | 3/2025 | Xu | B60H 1/00657 |
| 2025/0142343 A1 | 5/2025 | Villanueva Gaviola et al. | |
| 2025/0196805 A1 | 6/2025 | Kramar et al. | |
| 2025/0217466 A1 | 7/2025 | Pons Bordes et al. | |
| 2025/0263046 A1 | 8/2025 | Alsina | |
| 2025/0356710 A1 | 11/2025 | Young | |

FOREIGN PATENT DOCUMENTS

| | | | |
|---|---|---|---|
| CN | 101689188 | A | 3/2010 |
| CN | 101884188 | A | 11/2010 |
| CN | 103635923 | A | 3/2014 |
| CN | 103886460 | A | 6/2014 |
| CN | 104823383 | A | 8/2015 |
| CN | 105099694 | A | 11/2015 |
| CN | 105190659 | A | 12/2015 |
| CN | 105321067 | A | 2/2016 |
| CN | 105338066 | A | 2/2016 |
| CN | 105398420 | A | 3/2016 |
| CN | 105787755 | A | 7/2016 |
| CN | 106157125 | A | 11/2016 |
| CN | 106453341 | A | 2/2017 |
| CN | 106846563 | A | 6/2017 |
| CN | 107231797 | A | 10/2017 |
| CN | 107609865 | A | 1/2018 |
| CN | 108064393 | A | 5/2018 |
| CN | 109353309 | A | 2/2019 |
| CN | 109583876 | A | 4/2019 |
| CN | 109949120 | A | 6/2019 |
| CN | 110086609 | A | 8/2019 |
| CN | 110135872 | A | 8/2019 |
| CN | 110197059 | A | 9/2019 |
| CN | 112819475 | A | 5/2021 |
| EP | 2981115 | A2 | 2/2016 |
| EP | 3460692 | A1 | 3/2019 |
| EP | 3476670 | A1 | 5/2019 |
| EP | 3926888 | A1 | 12/2021 |
| JP | 2004-213362 | A | 7/2004 |
| JP | 2010-86327 | A | 4/2010 |
| JP | 2012-508930 | A | 4/2012 |
| JP | 2013-37568 | A | 2/2013 |
| JP | 2013-257878 | A | 12/2013 |
| JP | 2014-44719 | A | 3/2014 |
| JP | 2015-124530 | A | 7/2015 |
| JP | 2016-133969 | A | 7/2016 |
| JP | 2016-526211 | A | 9/2016 |
| JP | 2017-517788 | A | 6/2017 |
| JP | 2018-501680 | A | 1/2018 |
| JP | 2018-136886 | A | 8/2018 |
| JP | 2018-156283 | A | 10/2018 |
| JP | 2019-46122 | A | 3/2019 |
| JP | 2019-95880 | A | 6/2019 |
| JP | 2019-149167 | A | 9/2019 |
| JP | 2019-191753 | A | 10/2019 |
| JP | 2019-197332 | A | 11/2019 |
| JP | 2019-535931 | A | 12/2019 |
| KR | 10-2013-0035286 | A | 4/2013 |
| KR | 10-2013-0131956 | A | 12/2013 |
| KR | 10-1509596 | B1 | 4/2015 |
| KR | 10-2015-0066892 | A | 6/2015 |
| KR | 10-2016-0013334 | A | 2/2016 |
| KR | 10-1684188 | B1 | 12/2016 |
| KR | 10-2062919 | B1 | 1/2020 |
| KR | 10-2020-0108515 | A | 9/2020 |
| WO | 2008/157016 | A1 | 12/2008 |
| WO | 2009/009788 | A1 | 1/2009 |
| WO | 2013/003210 | A3 | 2/2013 |
| WO | 2014/105162 | A1 | 7/2014 |
| WO | 2014/134180 | A2 | 9/2014 |
| WO | 2014/146186 | A1 | 9/2014 |
| WO | 2015/153154 | A1 | 10/2015 |
| WO | 2015/184353 | A1 | 12/2015 |
| WO | 2015/194135 | A1 | 12/2015 |
| WO | 2016/128569 | A1 | 8/2016 |
| WO | 2016/196054 | A1 | 12/2016 |
| WO | 2016/196143 | A1 | 12/2016 |
| WO | 2017/078635 | A1 | 5/2017 |
| WO | 2017/218490 | A1 | 12/2017 |
| WO | 2018/048703 | A1 | 3/2018 |
| WO | 2018/071674 | A1 | 4/2018 |
| WO | 2018/074504 | A1 | 4/2018 |
| WO | 2018/081317 | A1 | 5/2018 |
| WO | 2018/160863 | A1 | 9/2018 |
| WO | 2019/069129 | A1 | 4/2019 |

(56) References Cited

FOREIGN PATENT DOCUMENTS

| | | | |
|---|---|---|---|
| WO | 2019/191213 | A1 | 10/2019 |
| WO | 2020/197694 | A1 | 10/2020 |
| WO | 12021/038298 | A2 | 3/2021 |

OTHER PUBLICATIONS

Intention to Grant received for European Patent Application No. 22723512.4, mailed on Dec. 12, 2025, 9 pages.
Result of Consultation received for European Patent Application No. 22723512.4, mailed on Nov. 26, 2025, 5 pages.
Applicant-Initiated Interview Summary received for U.S. Appl. No. 17/951,818, mailed on Oct. 14, 2025, 4 pages.
Intention to Grant received for European Patent Application No. 22785826.3, mailed on Oct. 2, 2025, 9 pages.
Notice of Allowance received for Chinese Patent Application No. 202410869730.9, mailed on Sep. 29, 2025, 4 pages (1 page of English Translation and 3 pages of Official Copy).
Decision to Grant received for European Patent Application No. 22785826.3, mailed on Dec. 18, 2025, 2 pages.
Notice of Allowance received for Chinese Patent Application No. 202280028985.1, mailed on Dec. 10, 2025, 5 pages (1 page of English Translation and 4 pages of Official Copy).
Decision to Refuse received for Japanese Patent Application No. 2024-032427, mailed on Oct. 10, 2025, 18 pages (8 pages of English Translation and 10 pages of Official Copy).
Non-Final Office Action received for U.S. Appl. No. 18/628,031, mailed on Oct. 28, 2025, 10 pages.
Office Action received for European Patent Application No. 21707473.1, mailed on Oct. 23, 2025, 6 pages.
Office Action received for Korean Patent Application No. 10-2024-0114771, mailed on Sep. 29, 2025, 5 pages (2 pages of English Translation and 3 pages of Official Copy).
Advisory Action received for U.S. Appl. No. 17/030,260, mailed on Dec. 13, 2022, 4 pages.
Advisory Action received for U.S. Appl. No. 17/222,568, mailed on Apr. 20, 2023, 5 pages,.
Advisory Action received for U.S. Appl. No. 17/375,767, mailed on Jun. 29, 2023, 2 pages.
Advisory Action received for U.S. Appl. No. 17/485,086, mailed on Sep. 9, 2022, 5 pages.
Advisory Action received for U.S. Appl. No. 17/900,734, mailed on Mar. 21. 2024, 5 pages.
Applicant-Initiated Interview Summary received for U.S. Appl. No. 17/030,260, mailed on Jan. 7, 2022, 2 pages.
Applicant-Initiated Interview Summary received for U.S. Appl. No. 17/485,086, mailed on Apr. 26, 2022, 2 pages.
Applicant-Initiated Interview Summary received for U.S. Appl. No. 17/030,256, mailed on Feb. 23, 2022, 2 pages.
Applicant-Initiated Interview Summary received for U.S. Appl. No. 17/030,256, mailed on Jun. 17, 2022, 2 pages.
Applicant-Initiated Interview Summary received for U.S. Appl. No. 17/030,257, mailed on Aug. 29, 2022. 5 pages.
Applicant-Initiated Interview Summary received for U.S. Appl. No. 17/030,257, mailed on Feb. 7, 2022, 5 pages.
Applicant-Initiated Interview Summary received for U.S. Appl. No. 17/030,257, mailed on Jan. 31, 2023, 7 pages.
Applicant-Initiated Interview Summary received for U.S. Appl. No. 17/030,259, mailed on Nov. 19, 2021, 18 pages.
Applicant-Initiated Interview Summary received for U.S. Appl. No. 17/030,260, mailed on May 5, 2022, 2 pages.
Applicant-Initiated Interview Summary received for U.S. Appl. No. 17/030,260, mailed on Nov. 29, 2022, 2 pages.
Interview Summary received for U.S. Appl. No. 17/030,260, mailed on Oct. 11, 2022, 2 pages.
Interview Summary received for U.S. Appl. No. 17/077,820, mailed on Oct. 6, 2022, 2 pages.
Applicant-Initiated Interview Summary received for U.S. Appl. No. 17/222,568, mailed on Aug. 25, 2023, 2 pages.
Applicant-Initiated Interview Summary received for U.S. Appl. No. 17/375,767, mailed on 2 pages.
Applicant-Initiated Interview Summary received for U.S. Appl. No. 17/375,767, mailed on Dec. 22, 2023, 2 pages.
Applicant-Initiated Interview Summary received for U.S. Appl. No. 17/375,767, mailed on Feb. 2, 2023, 2 pages.
Applicant-Initiated Interview Summary received for U.S. Appl. No. 17/375,767, mailed on Jun. 26, 2023, 2 pages.
Applicant-Initiated Interview Summary received for U.S. Appl. No. 17/375,767, mailed on Oct. 27, 2022, 4 pages.
Applicant-Initiated Interview Summary received for U.S. Appl. No. 17/485,086, mailed on Dec. 23, 2022, 2 pages.
Applicant-Initiated Interview Summary received for U.S. Appl. No. 17/900,734, mailed on Feb. 22, 2024, 2 pages.
Applicant-Initiated Interview Summary received for U.S. Appl. No. 17/900,734, mailed on Nov. 20, 2023, 4 pages.
August et al., "Mobile web searching", Bell Lab Technical Journal, vol. 6, No. 2, 2002, pp. 84-98.
"Cease", Dictionary.com, Merriam-Webster, 2022, 1 page.
Certificates of Examination received for Australian Patent Application No. 2021100511, mailed on Nove. 5, 2021, 2 pages.
Corrected Notice of Allowance received for U.S. Appl. No. 17/030,256, mailed on Nov. 9, 2022, 8 pages.
Corrected Notice of Allowance received for U.S. Appl. No. 17/030,257, mailed on Nov. 24, 2023, 2 pages.
Corrected Notice of Allowance received for U.S. Appl. No. 17/030,257, mailed on Sep. 12, 2023, 2 pages.
Corrected Notice of Allowance received for U.S. Appl. No. 17/030,259, mailed on Apr. 4, 2022, 2 pages.
Corrected Notice of Allowance received for U.S. Appl. No. 17/030,259, mailed on Jan. 5, 2022, 2 pages.
Corrected Notice of Allowance received for U.S. Appl. No. 17/077,820, mailed on Feb. 6, 2023, 2 pages.
Corrected Notice of Allowance received for U.S. Appl. No. 17/077,820, mailed on Jan. 19, 2023, 2 pages.
Corrected Notice of Allowance received for U.S. Appl. No. 17/077,820, mailed on Mar. 8, 2023, 2 pages.
Corrected Notice of Allowance received for U.S. Appl. No. 17/398,723, mailed on Nov. 15, 2023, 12 pages.
Corrected Notice of Allowance received for U.S. Appl. No. 17/484,306, mailed on Mar. 30, 2022, 4 pages.
Corrected Notice of Allowance received for U.S. Appl. No. 17/485,098, mailed on Oct. 13, 2022, 8 pages.
Corrected Notice of Allowance received for U.S. Appl. No. 18/128,775, mailed on Dec. 7, 2023, 2 pages.
Corrected Notice of Allowance received for U.S. Appl. No. 18/128,775, mailed on Jan. 8, 2024, 2 pages.
Corrected Notice of Allowance received for U.S. Appl. No. 18/128,775, mailed on Jun. 6, 2024, 2 pages.
Corrected Notice of Allowance received for U.S. Appl. No. 18/128,775, mailed on Nov. 17, 2023, 2 pages.
Dahan et al., "Increasing TeraGrid User Productivity through Integration of Information and Interactive Services", IEEE, 2008, 11 pages.
Decision To Grant received for Danish Patent Application No. PA202170032, mailed on Feb. 1, 2022, 2 pages.
Decision To Grant received for Danish Patent Application No. PA202170598, mailed on Jul. 11, 2023, 1 page.
Decision To Grant received for European Patent Application No. 21731662.9, mailed on Sep. 12, 2024, 4 pages.
Eminagaoglu et al., "A Two-Factor Authentication System with QR Codes for Web and Mobile Applications", 2014 Fifth International Conference on Emerging Security Technologies, 2014, pp. 105-112.
European Search Report received for European Patent Application No. 23165330.4, mailed on Jun. 28, 2023, 10 pages.
Extended European Search Report received for European Patent Application No. 23200887.0, mailed on Mar. 26, 2024, 9 pages.
European Search Report received for European Patent Application No. 23214955.9, mailed on Feb. 22, 2024, 10 pages.
Final Office Action received for U.S. Appl. No. 17/030,256, mailed on Mar. 14, 2022, 20 pages.
Final Office Action received for U.S. Appl. No. 17/030,257, mailed on Dec. 8, 2022, 29 pages.

(56) References Cited

OTHER PUBLICATIONS

Final Office Action received for U.S. Appl. No. 17/030,260, mailed on Mar. 9, 2022, 42 pages.
Final Office Action received for U.S. Appl. No. 17/030,260, mailed on Nov. 4, 2022. 39 pages.
Final Office Action received for U.S. Appl. No. 17/222,568, mailed on Dec. 14, 2023, 92 pages.
Final Office Action received for U.S. Appl. No. 17/222,568, mailed on Feb. 8, 2023, 68 pages.
Final Office Action received for U.S. Appl. No. 17/375,767, mailed on Dec. 29, 2022, 13 pages.
Final Office Action received for U.S. Appl. No. 17/375,767, mailed on Jun. 1, 2023, 15 pages.
Final Office Action received for U.S. Appl. No. 17/485,086, mailed on May 4, 2022, 21 pages.
Final Office Action received for U.S. Appl. No. 17/900,734, mailed on Jan. 19, 2024, 11 pages.
Intention to Grant received for Danish Patent Application No. PA202170032, mailed on Oct. 6, 2021, 2 pages.
Intention to Grant received for Danish Patent Application No. PA202170598, mailed on Apr. 24, 2023, 2 pages.
Intention to Grant received for Danish Patent Application No. PA202170598, mailed on Jan. 16, 2023, 2 pages.
Intention to Grant received for European Patent Application No. 21731662.9, mailed on May 3, 2024, 9 pages.
International Preliminary Report on Patentability received for PCT Patent Application No. PCT/US2021/015123, mailed on Aug. 11, 2022, 14 pages.
International Preliminary Report on Patentability received for PCT Patent Application No. PCT/US2021/033051, mailed on Dec. 8, 2022, 14 pages.
Intemational Preliminary Report on Patentability received for PCT Patent Application No. PCT/US2021/057325, mailed on May 19, 2023, 8 pages.
Intemational Preliminary Report on Patentability received for PCT Patent Application No. PCT/US2022/025365, mailed on Nov. 2, 2023, 11 pages.
International Preliminary Report on Patentability received for PCT Patent Application No. PCT/US2022/030567, mailed on Dec. 21, 2023, 18 pages.
International Preliminary Report on Patentability received for PCT Patent Application No. PCT/US2022/042978, mailed on Apr. 4, 2024, 12 pages.
International Search Report and Written Opinion received for PCT Patent Application No. PCT/US2021/015123, mailed on Aug. 9, 2021, 20 pages.
International Search Report and Written Opinion received for PCT Patent Application No. PCT/US2021/033051, mailed on Oct. 29, 2021, 20 pages.
Search Report and Written Opinion received for PCT Patent Application No. PCT/US2021/057325, mailed on Jan. 5, 2022, 14 pages.
International Search Report and Written Opinion received for PCT Patent Application No. PCT/US2022/025365, mailed on Sep. 27, 2022, 16 pages.
International Search Report and Written Opinion received for PCT Patent Application No. PCT/US2022/030567, mailed on Dec. 9, 2022, 24 pages.
International Search Report and Written Opinion received for PCT Patent Application No. PCT/US2022/042978, mailed on Nov. 29, 2022, 15 pages.
International Search Report and Written Opinion received for PCT Patent Application No. PCT/US2023/023766, mailed on Nov. 7, 2023, 20 pages.
Invitation to Pay Addition Fees received for PCT Patent Application No. PCT/US2021/015123, mailed on Jun. 16, 2021, 12 pages.
Invitation to Pay Additional Fees and Partial International Search Report received for PCT Patent Application No. PCT/US2022/030567, mailed on Sep. 13, 2022, 13 pages.
Invitation to Pay Additional Fees and Partial International Search Report received for PCT Patent Application No. PCT/US2023/023766, mailed on Sep. 14, 2023, 14 pages.
Invitation to Pay Additional Fees received for PCT Patent Application No. PCT/US2021/033051, mailed on Aug. 26, 2021, 10 pages.
Invitation to Pay Additional Fees received for PCT Patent Application No. PCT/US2022/025365, mailed on Aug. 4, 2022, 9 pages.
Juan, "Everything you can do with Wechat QR codes in 2019", Available online at: https://qpsoftware.net/blog/wechat-qr-code, Jul. 1, 2019, 13 pages.
Kormann et al., "Risks of the Passport Single Signon Protocol", IEEE Computer Networks, Jul. 2000, 12 pages.
Linelovers, "4 ways to add someone to your Line friends list", Available online at: http://line-lovers-world.com/2016/10/23/%E3%80%90line-app%E3%80%914-ways-to-add-someone-to-your-line-friends-list/, Oct. 23, 2016, 14 pages.
Lurey, C., "Keeper fortifies industry best security architecture with integrated two-factor codes", Online available at: <URL: https://www.keepersecurity.com/blog/2019/08/29/keeper-fortifies-industry-best-securityarchitecture- with-integrated-two-factor-codes/>, Aug. 29, 2019, 8 pages.
Mack, Brandon, "How Do Snapchat's Snapcodes Work?", Available online at: https://blackatlascreative.com/blog/how/do-snapchats-snapcodes-work/, Nov. 10, 2015, 10 pages.
"Meet Your Model 3", Available Online at: https://www.tesla.com/support/meet-your-tesla/model-3#keys, 2021, 3 pages.
Non-Final Office Action received for U.S. Appl. No. 17/030,256, mailed on Jan. 18, 2022, 20 pages.
Non-Final Office Action received for U.S. Appl. No. 17/030,257, mailed on Jun. 20, 2022, 27 pages.
Non-Final Office Action received for U.S. Appl. No. 17/030,259, mailed on Aug. 19, 2021, 20 pages.
Non-Final Office Action received for U.S. Appl. No. 17/030,260, mailed on Jul. 8, 2022, 36 pages.
Non-Final Office Action received for U.S. Appl. No. 17/030,260, mailed on Oct. 6, 2021, 43 pages.
Non-Final Office Action received for U.S. Appl. No. 17/077,820, mailed on Aug. 31, 2022, 10 pages.
Non-Final Office Action received for U.S. Appl. No. 17/222,568, mailed on May 25, 2023, 72 pages.
Non-Final Office Action received for U.S. Appl. No. 17/222,568, mailed on Sep. 16, 2022, 32 pages.
Non-Final Office Action received for U.S. Appl. No. 17/375,767, mailed on Aug. 31, 2023, 16 pages.
Non-Final Office Action received for U.S. Appl. No. 17/375,767, mailed on Feb. 16, 2023, 12 pages.
Non-Final Office Action received for U.S. Appl. No. 17/375,767, mailed on Nov. 28, 2023, 16 pages.
Non-Final Office Action received for U.S. Appl. No. 17/375,767, mailed on Sep. 29, 2022, 10 pages.
Non-Final Office Action received for U.S. Appl. No. 17/485,086, mailed on Jan. 24, 2022, 19 pages.
Non-Final Office Action received for U.S. Appl. No. 17/485,086, mailed on Nov. 14, 2022, 22 pages.
Non-Final Office Action received for U.S. Appl. No. 17/900,734, mailed on Oct. 24, 2023, 12 pages.
Non-Final Office Action received for U.S. Appl. No. 17/951,818, mailed on Sep. 9, 2024, 30 pages.
Non-Final received for U.S. Appl. No. 17/030,257, mailed on Dec. 24, 2021, 24 pages.
Notice of Acceptance received for Australian Patent Application No. 2021213717, mailed on Sep. 21, 2022, 3 pages.
Notice of Acceptance received for Australian Patent Application No. 2022235545, mailed on Jun. 27, 2023, 3 pages.
Notice of Acceptance received for Australian Patent Application No. 2023200021, mailed on Jul. 22, 2024, 3 pages.
Notice of Allowance received for Chinese Patent Application No. 202310033917.0, mailed on Nov. 26, 2023, 2 pages (1 page of English Translation and 1 page of Official Copy).
Notice of Allowance received for Chinese Patent Application No. 202310865934.0, mailed on May 8, 2024, 2 pages (1 page of English Translation and 1 page of Official Copy).

(56) References Cited

OTHER PUBLICATIONS

Notice of Allowance received for Chinese Patent Application No. 202311569957.3, mailed on Sep. 2, 2024, 5 pages (1 page of English Translation and 4 pages of Official Copy).
Notice of Allowance received for Japanese Patent Application No. 2022-520133, mailed on Jan. 27, 2023, 4 pages (1 page of English Translation and 3 pages of Official Copy).
Notice of Allowance received for Japanese Patent Application No. 2022-573404, mailed. On Dec. 11, 2023, 4 pages (1 page of English Translation and 3 pages of Official Copy).
Notice of Allowance received for Japanese Patent Application No. 2023-028792, mailed on Jun. 26, 2023, 4 pages (1 page of English Translation and 3 pages of Official Copy).
Notice of Allowance received for Japanese Patent Application No. 2023-168764, mailed on Jul. 26, 2024, 4 pages (1 page of English Translation and 3 pages of Official Copy).
Notice of Allowance received for Japanese Patent Application No. 2023-528157, mailed on Feb. 5, 2024, 4 pages (1 page of English Translation and 3 pages of Official Copy).
Notice of Allowance received for Korean Patent Application No. 10-2021-0151108, mailed on May 26, 2024, 7 pages (2 pages of English Translation and 5 pages of Official Copy).
Notice of Allowance received for Korean Patent Application No. 10-2021-0182662, mailed on Jun. 2, 2024, 6 pages (2 pages of English Translation and 4 pages of Official Copy).
Notice of Allowance received for Korean Patent Application No. 10-2021-7037387, mailed on Jan. 31, 2024, 7 pages (2 pages of English Translation and 5 pages of Official Copy).
Notice of Allowance received for Korean Patent Application No. 10-2021-0003867, mailed on Oct. 21, 2022, 7 pages (2 pages of English Translation and 5 pages of Official Copy).
Notice of Allowance received for Korean Patent Application No. 10-2022-7045895, mailed on Apr. 19, 2023, 7 pages (2 pages of English Translation and 5 pages of Official Copy).
Notice of Allowance received for Korean Patent Application No. 10-2023-7010480, mailed on Nov. 29, 2023, 7 pages (2 pages of English Translation and 5 pages of Official Copy).
Notice of Allowance received for Korean Patent Application No. 10-2023-7033718, mailed on Apr. 18, 2024, 7 pages (2 pages of English Translation and 5 pages of Official Copy).
Notice of Allowance received for U.S. Appl. No. 17/030,256, mailed on Jul. 20, 2022, 9 pages.
Notice of Allowance received for U.S. Appl. No. 17/030,257, mailed on Jul. 26, 2023, 14 pages.
Notice of Allowance received for U.S. Appl. No. 17/030,259, mailed on Dec. 14, 2021, 8 pages.
Notice of Allowance received for U.S. Appl. No. 17/030,260, mailed on Aug. 7, 2023, 11 pages.
Notice of Allowance received for U.S. Appl. No. 17/030,260, mailed on May 3, 2023, 14 pages.
Notice of Allowance received for U.S. Appl. No. 17/077,820, mailed on Jan. 6, 2023, 11 pages.
Notice of Allowance received for U.S. Appl. No. 17/180,509, mailed on Apr. 28, 2021, 16 pages.
Notice of Allowance received for U.S. Appl. No. 17/180,509, mailed on Aug. 23, 2021, 14 pages.
Notice of Allowance received for U.S. Appl. No. 17/375,767, mailed on Feb. 20, 2024, 6 pages.
Notice of Allowance received for U.S. Appl. No. 17/398,723, mailed on Feb. 23, 2023, 17 pages.
Notice of Allowance received for U.S. Appl. No. 17/398,723, mailed on Jan. 30, 2024, 15 pages.
Notice of Allowance received for U.S. Appl. No. 17/398,723, mailed on Jun. 15, 2023, 15 pages.
Notice of Allowance received for U.S. Appl. No. 17/398,723, mailed on Oct. 26, 2023, 15 pages.
Notice of Allowance received for U.S. Appl. No. 17/484,306, mailed on Nov. 26, 2021, 9 pages.
Notice of Allowance received for U.S. Appl. No. 17/485,086, mailed on Jan. 30, 2023, 9 pages.
Notice of Allowance received for U.S. Appl. No. 17/485,098, mailed on Aug. 5, 2022, 12 pages.
Notice of Allowance received for U.S. Appl. No. 18/128,775, mailed on Feb. 28, 2024, 11 pages.
Notice of Allowance received for U.S. Appl. No. 18/128,775, mailed on Nov. 2, 2023, 10 pages.
Office Action received for Australian Patent Application No. 2021100511, mailed on May 26, 2021, 5 pages.
Office Action received for Australian Patent Application No. 2021100511, mailed on Sep. 2, 2021, 3 pages.
Action received for Australian Patent Application No. 2021102823, mailed on Aug. 24, 2021, 8 pages.
Office Action received for Australian Patent Application No. 2021102823, mailed on Feb. 22, 2022, 5 pages.
Office Action received for Australian Patent Application No. 2021102823, mailed on Nov. 24, 2021, 7 pages.
Office Action received for Australian Patent Application No. 2021203367, mailed on May 23, 2022, 5 pages.
Office Action received for Australian Patent Application No. 2021213717, mailed on Feb. 10, 2022, 4 pages.
Office Action received for Australian Patent Application No. 2021213717, mailed on Jun. 17, 2022, 4 pages.
Office Action received for Australian Patent Application No. 2022235545, mailed on May 11. 2023, 3 pages.
Office Action received for Australian Patent Application No. 2023200021, mailed on Apr. 24, 2024, 4 pages.
Office Action received for Australian Patent Application No. 2023200021, mailed on Feb. 1, 2024, 4 pages.
Office Action received for Australian Patent Application No. 2023200021, mailed on Nov. 1, 2023, 3 pages.
Office Action received for Chinese Patent Application No. 202180005556.8, mailed on Feb. 8, 2024, 16 pages (9 pages of English Translation and 7 pages of Official Copy).
Office Action received for Chinese Patent Application No. 202310033917.0, mailed on Jun. 28, 2023, 19 pages (10 pages of English Translation and 9 pages of Official Copy).
Office Action received for Chinese Patent Application No. 202310865934.0, mailed on Jan. 16, 2024, 12 pages (6 pages of English Translation and 6 pages of Official Copy).
Office Action received for Danish Patent Application No. PA202170032, mailed on May 7, 2021, 7 pages.
Office Action received for Danish Patent Application No. PA202170598. mailed on Sep. 7, 2022, 4 pages.
Office Action received for Danish Patent Application No. PA202270438, mailed on Jul. 10, 2023, 4 pages.
Office Action received for European Patent Application No. 21707473.1, mailed on May 4, 2023, 5 pages.
Office Action received for European Patent Application No. 21707473.1, mailed on Oct. 27, 2023, 5 pages.
Office Action received for European Patent Application No. 21707473.1, mailed on Oct. 31, 2022, 7 pages.
Office Action received for European Patent Application No. 21731662.9, mailed on Oct. 12, 2023, 8 pages.
Office Action received for European Patent Application No. 22732745.9, mailed on Apr. 10, 2024, 7 pages.
Office Action received for European Patent Application No. 22785826.3, mailed on Aug. 1, 2024, 7 pages.
Office Action received for European Patent Application No. 23165330.4, mailed on Mar. 18, 2024, 4 pages.
Office Action received for Japanese Patent Application No. 2022-520133, mailed on Oct. 17, 2022, 4 pages (2 pages of English Translation and 2 pages of Official Copy).
Office Action received for Japanese Patent Application No. 2022-573404, mailed on Jul. 3, 2023, 12 pages (6 pages of English Translation and 6 pages of Official Copy).
Office Action received for Japanese Patent Application No. 2023-168764, mailed on Feb. 5, 2024, 5 pages (2 pages of English Translation and 3 pages of Official Copy).
Office Action received for Japanese Patent Application No. 2023-168764, mailed on May 17, 2024, 6 pages (3 pages of English Translation and 3 pages of Official Copy).

(56) References Cited

OTHER PUBLICATIONS

Office Action received for Japanese Patent Application No. 2023-200980, mailed on Apr. 22, 2024, 8 pages (4 pages of English Translation and 4 pages of Official Copy).
Office Action received for Japanese Patent Application No. 2023-200980, mailed on Aug. 2, 2024, 8 pages (4 pages of English Translation and 4 pages of Official Copy).
Office Action received for Japanese Patent Application No. 2023-528157, mailed on Dec. 8, 2023, 4 pages (2 pages of English Translation and 2 pages of Official Copy).
Office Action received for Korean Patent Application No. 10-2021-0151108, mailed on Jan. 13, 2023, 10 pages (5 pages of English Translation and 5 pages of Official Copy).
Office Action received for Korean Patent Application No. 10-2021-0151108, mailed on Sep. 21, 2023, 12 pages (6 pages of English Translation and 6 pages of Official Copy).
Office Action received for Korean Patent Application No. 10-2021-0182662, mailed on Oct. 26, 2023, 13 pages (6 pages of English Translation and 7 pages of Official Copy).
Office Action received for Korean Patent Application No. 10-2021-7037387, mailed on Oct. 12, 2023, 14 pages (6 pages of English Translation and 8 pages of Official Copy).
Office Action received for Korean Patent Application No. 10-2022-0003867, mailed on May 17, 2022, 19 pages (9 pages of English Translation and 10 pages of Official Copy).
Office Action received for Korean Patent Application No. 10-2023-7010480, mailed on Jul. 20, 2023, 14 pages (7 pages of English Translation and 7 pages of Official Copy).
Office Action received for Korean Patent Application No. 10-2023-7033718, mailed on Dec. 4, 2023, 5 pages (2 pages of English Translation and 3 pages of Official Copy).
Result of Consultation received for European Patent Application No. 21707473.1, mailed on Sep. 6, 2024, 3 pages.
Search Report and Opinion received for Danish Patent Application No. PA202170598, mailed on Feb. 15, 2022, 11 pages.
Search Report and Opinion received for Danish Patent Application No. PA202070438, mailed on Dec. 5, 2022, 9 pages.
Sibila, Alex, "Tesla App Full WalkThrough (Mar. 2020)", Available Online at: https://www.youtube.com/watch?v=RHMWPj_RXLU, Mar. 16, 2020, 3 pages.
Summons to Attend Oral Proceedings received for European Patent Application No. 21707473.1, mailed on Mar. 22, 2024, 9 pages.
Summons to Attend Oral Proceedings received for European Patent Application No. 22732745.9, mailed on Sep. 3, 2024, 11 pages.
"Use your iPhone or Apple Watch as a car key", Available Online at: https://support.apple.com/en-us/HT211234, Mar. 16, 2021, 5 pages.
"Volvo On Call app: Operating remote start of the car", Available Online at: https://www.volvocars.com/en-ca/support/topics/volvo-on-call/app/volvo-on-call-app-operating-remote-start-of-the-car-2, Nov. 5, 2020, 4 pages.
Decision to Grant received for European Patent Application No. 23165330.4, mailed on Nov. 20, 2025, 2 pages.
Extended European Search Report received for European Patent Application No. 25176097.1, mailed on Nov. 18, 2025, 5 pages.
International Search Report and Written Opinion received for PCT Patent Application No. PCT/US2025/029289, mailed on Nov. 12, 2025, 20 pages.
Office Action received for Chinese Patent Application No. 202510359797.2, mailed on Sep. 22, 2025, 14 pages (7 pages of English Translation and 7 pages of Official Copy).
Applicant-Initiated Interview Summary received for U.S. Appl. No. 17/222,568, mailed on Apr. 16, 2025, 3 pages.
Applicant-Initiated Interview Summary received for U.S. Appl. No. 17/949,042, mailed on Apr. 2, 2025, 2 pages.
Applicant-Initiated Interview Summary received for U.S. Appl. No. 17/951,818, mailed on Jun. 30, 2025, 4 pages.
Applicant-Initiated Interview Summary received for U.S. Appl. No. 17/971,407, mailed on Apr. 1, 2025, 2 pages.
Corrected Notice of Allowance received for U.S. Appl. No. 17/222,568, mailed on Apr. 24, 2025, 2 pages.
Corrected Notice of Allowance received for U.S. Appl. No. 17/971,407, mailed on Jun. 17, 2025, 2 pages.
Corrected Notice of Allowance received for U.S. Appl. No. 17/971,407, mailed on May 20, 2025, 2 pages.
Decision to Grant received for European Patent Application No. 22732745.9, mailed on May 22, 2025, 4 pages.
Decision to Grant received for European Patent Application No. 23200887.0, mailed on May 22, 2025, 4 pages.
Decision to Grant received for European Patent Application No. 23214955.9, mailed on Apr. 10, 2025, 4 pages.
Extended European Search Report received for European Patent Application No. 25175055.0, mailed on Jul. 17, 2025, 9 pages.
Final Office Action received for U.S. Appl. No. 17/951,818, mailed on Sep. 4, 2025, 33 pages.
Final Office Action received for U.S. Appl. No. 18/375,932, mailed on Aug. 12, 2025, 34 pages.
Intention to Grant received for European Patent Application No. 23165330.4, mailed on Jul. 17, 2025, 7 pages.
Invitation to Pay Additional Fees and Partial International Search Report received for PCT Patent Application No. PCT/US2025/029289, mailed on Sep. 22, 2025, 16 pages.
Non-Final Office Action received for U.S. Appl. No. 17/951,818, mailed on May 15, 2025, 32 pages.
Notice of Allowance received for Japanese Patent Application No. 2024-211628, mailed on Jul. 4, 2025, 4 pages (1 page of English Translation and 3 pages of Official Copy).
Notice of Allowance received for Korean Patent Application No. 10-2023-7018460, mailed on Aug. 27, 2025, 7 pages (2 pages of English Translation and 5 pages of Official Copy).
Notice of Allowance received for U.S. Appl. No. 17/222,568, mailed on Mar. 27, 2025, 15 pages.
Notice of Allowance received for U.S. Appl. No. 17/949,042, mailed on Jul. 1, 2025, 6 pages.
Notice of Allowance received for U.S. Appl. No. 17/971,407, mailed on Apr. 16, 2025, 7 pages.
Notice of Hearing received for Indian Patent Application No. 202217048935, mailed on May 26, 2025, 3 pages.
Office Action received for Australian Patent Application No. 2023233133, mailed on May 23, 2025, 5 pages.
Office Action received for Australian Patent Application No. 2024220018, mailed on Sep. 24, 2025, 3 pages.
Office Action received for Chinese Patent Application No. 202410869730.9, mailed on May 28, 2025, 11 pages (6 pages of English Translation and 5 pages of Official Copy).
Office Action received for European Patent Application No. 21707473.1, mailed on May 9, 2025, 7 pages.
Office Action received for European Patent Application No. 22723512.4, mailed on Jun. 18, 2025, 5 pages.
Office Action received for European Patent Application No. 22785826.3, mailed on May 8, 2025, 7 pages.
Office Action received for Japanese Patent Application No. 2024-032427, mailed on Apr. 21, 2025, 11 pages (5 pages of English Translation and 6 pages of Official Copy).
Office Action received for Japanese Patent Application No. 2024-211628, mailed on Feb. 25, 2025, 12 pages (6 pages of English Translation and 6 pages of Official Copy).
Office Action received for Korean Patent Application No. 10-2023-7024663, mailed on Jul. 15, 2025, 12 pages (5 pages of English Translation and 7 pages of Official Copy).
Applicant-Initiated Interview Summary received for U.S. Appl. No. 17/900,734, mailed on Feb. 3, 2025, 4 pages.
Applicant-Initiated Interview Summary received for U.S. Appl. No. 17/951,818, mailed on Mar. 3, 2025, 5 pages.
Applicant-Initiated Interview Summary received for U.S. Appl. No. 17/951,818, mailed on Nov. 4, 2024, 5 pages.
Applicant-Initiated Interview Summary received for U.S. Appl. No. 18/295,238, mailed on Oct. 25, 2024, 2 pages.
Corrected Notice of Allowance received for U.S. Appl. No. 17/900,734, mailed on Mar. 10, 2025, 3 pages.
Corrected Notice of Allowance received for U.S. Appl. No. 17/900,734, mailed on Mar. 17, 2025, 2 pages.

(56) References Cited

OTHER PUBLICATIONS

Corrected Notice of Allowance received for U.S. Appl. No. 18/595,238, mailed on Dec. 10, 2024, 2 pages.
Final Office Action received for U.S. Appl. No. 17/951,818, mailed on Jan. 27, 2025, 31 pages.
Intention to Grant received for European Patent Application No. 22732745.9, mailed on Feb. 7, 2025, 14 pages.
Intention to Grant received for European Patent Application No. 23165330.4, mailed on Feb. 19, 2025, 8 pages.
Intention to Grant received for European Patent Application No. 23200887.0, mailed on Jan. 7, 2025, 8 pages.
Intention to Grant received for European Patent Application No. 23214955.9, mailed on Dec. 3, 2024, 8 pages.
International Preliminary Report on Patentability for PCT Patent Application No. PCT/US20223/023766, mailed on Dec. 19, 2024, 15 pages.
Invitation to Pay Search Fees received for European Patent Application No. 22723512.4, mailed on Nov. 11, 2024, 3 pages.
Non-Final Office Action received for U.S. Appl. No. 17/900,734, mailed on Jan. 16, 2025, 7 pages.
Non-Final Office Action received for U.S. Appl. No. 17/949,042, mailed on Mar. 13, 2025, 12 pages.
Non-Final Office Action received for U.S. Appl. No. 17/971,407, mailed on Feb. 27, 2025, 9 pages.
Non-Final Office Action received for U.S. Appl. No. 18/375,932, mailed on Jan. 29, 2025, 39 pages.
Non-Final Office Action received for U.S. Appl. No. 18/595,238, mailed on Sep. 26, 2024, 8 pages.
Notice of Allowance received for Chinese Patent Application No. 202311323829.0, mailed on Nov. 29, 2024, 4 pages (1 page of English Translation and 3 pages of Official Copy).
Notice of Allowance received for Japanese Patent Application No. 2023-200980, mailed on Nov. 5, 2024, 4 pages (1 page of English Translation and 3 pages of Official Copy).
Notice of Allowance received for Korean Patent Application No. 10-2024-0100836, mailed on Oct. 14, 2024, 7 pages (2 pages of English Translation and 5 pages of Official Copy).
Notice of Allowance received for U.S. Appl. No. 17/222,568, mailed on Dec. 11, 2024, 14 pages.
Notice of Allowance received for U.S. Appl. No. 17/900,734, mailed on Feb. 26, 2025, 8 pages.
Notice of Allowance received for U.S. Appl. No. 18/404,058, mailed on Oct. 9, 2024, 12 pages.
Notice of Allowance received for U.S. Appl. No. 18/595,238, mailed on Nov. 20, 2024, 9 pages.
Office Action received for Chinese Patent Application No. 202311323829.0, mailed on Sep. 5, 2024, 11 pages (6 pages of English Translation and 5 pages of Official Copy).
Office Action received for European Patent Application No. 21707473.1, mailed on Feb. 11, 2025, 9 pages.
Office Action received for European Patent Application No. 22723512.4, mailed on Feb. 10, 2025, 9 pages.
Office Action received for European Patent Application No. 22785826.3, mailed on Jan. 9, 2025, 9 pages.
Office Action received for Indian Patent Application No. 202217048935, mailed on Oct. 29, 2024, 9 pages.
Result of Consultation received for European Patent Application No. 22732745.9, mailed on Jan. 15, 2025, 13 pages.
Result of Consultation received for European Patent Application No. 22732745.9, mailed on Jan. 23, 2025, 4 pages,.
Emilio Di Paolom. , "CES 2021: Wearable Device with Biometric Authentication". Available online at: https://www.eetimes.eu/ces-2021-wearable-device-with-biometric-authentication/, EE Times Europe, Jan. 11, 2021, 6 pages.
Khedekar et al., "Strength of QR Code over Design and Implementation of Authentication System", International Conference on Communication and Signal Processing, Online available at: https://ieeexplore.ieee.org/document/7754571, Apr. 6-8, 2016, pp. 2190-2193.

* cited by examiner

USER INTERFACES FOR MANAGING CAR KEY CREDENTIALS

CROSS-REFERENCE TO RELATED APPLICATIONS

This application claims priority to U.S. Provisional Patent Application Ser. No. 63/656,979, entitled "USER INTERFACES FOR MANAGING CAR KEY CREDENTIALS," filed on Jun. 6, 2024, the content of which is hereby incorporated by reference in its entirety.

FIELD

The present disclosure relates generally to computer user interfaces, and more specifically to techniques for managing car key credentials.

BACKGROUND

Vehicles, including cars, often require keys to access certain features of the vehicle, such as unlocking the vehicle and/or driving the vehicle. Some computer system store credentials that enable access to the features of the vehicle.

BRIEF SUMMARY

Some techniques for managing car key credentials using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing car key credentials. Such methods and interfaces optionally complement or replace other methods for managing car key credentials. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method comprises: during a setup process of the computer system: receiving, via the one or more input devices, a request to provision the computer system with a secure credential that is configured to provide authorization to use one or more functions of a vehicle; and in response to receiving the request to provision the computer system with a secure credential that is configured to provide authorization to use one or more functions of the vehicle, initiating a process to provision the computer system with a secure credential that is configured to provide authorization to use one or more functions of the vehicle, wherein as part of the process a second computer system, different from the computer system, that is provisioned with a secure credential that is configured to provide authorization to use one or more functions of the vehicle, prompts for authorization to provide credential information corresponding to the vehicle to the computer system; receiving, as part of the process to provision the computer system with a secure credential that is configured to provide authorization to use one or more functions of the vehicle, credential information from the second computer system based on the second computer system receiving authorization to provide the credential information to the computer system; and provisioning, using the credential information, the computer system with a secure credential that is configured to provide authorization to use one or more functions of the vehicle.

In accordance with some embodiments, a non-transitory computer-readable storage medium is described. The non-transitory computer-readable storage medium stores one or more programs configured to be executed by one or more processors of a computer system that is in communication with one or more input devices, the one or more programs including instructions for: during a setup process of the computer system: receiving, via the one or more input devices, a request to provision the computer system with a secure credential that is configured to provide authorization to use one or more functions of a vehicle; and in response to receiving the request to provision the computer system with a secure credential that is configured to provide authorization to use one or more functions of the vehicle, initiating a process to provision the computer system with a secure credential that is configured to provide authorization to use one or more functions of the vehicle, wherein as part of the process a second computer system, different from the computer system, that is provisioned with a secure credential that is configured to provide authorization to use one or more functions of the vehicle, prompts for authorization to provide credential information corresponding to the vehicle to the computer system; receiving, as part of the process to provision the computer system with a secure credential that is configured to provide authorization to use one or more functions of the vehicle, credential information from the second computer system based on the second computer system receiving authorization to provide the credential information to the computer system; and provisioning, using the credential information, the computer system with a secure credential that is configured to provide authorization to use one or more functions of the vehicle.

In accordance with some embodiments, a transitory computer-readable storage medium is described. The transitory computer-readable storage medium stores one or more programs configured to be executed by one or more processors of a computer system that is in communication with one or more input devices, the one or more programs including instructions for: during a setup process of the computer system: receiving, via the one or more input devices, a request to provision the computer system with a secure credential that is configured to provide authorization to use one or more functions of a vehicle; and in response to receiving the request to provision the computer system with a secure credential that is configured to provide authorization to use one or more functions of the vehicle, initiating a process to provision the computer system with a secure credential that is configured to provide authorization to use one or more functions of the vehicle, wherein as part of the process a second computer system, different from the computer system, that is provisioned with a secure credential that is configured to provide authorization to use one or more functions of the vehicle, prompts for authorization to provide credential information corresponding to the vehicle to the computer system; receiving, as part of the process to provision the computer system with a secure credential that is configured to provide authorization to use one or more functions of the vehicle, credential information from the second computer system based on the second computer system receiving authorization to provide the credential information to the computer system; and provisioning, using the credential information, the computer system with a secure credential that is configured to provide authorization to use one or more functions of the vehicle.

In accordance with some embodiments, a computer system is described. the computer system is configured to communicate with one or more input devices and comprises: one or more processors; and memory storing one or more programs configured to be executed by the one or more processors, the one or more programs including instructions for: during a setup process of the computer system: receiving, via the one or more input devices, a request to provision the computer system with a secure credential that is configured to provide authorization to use one or more functions of a vehicle; and in response to receiving the request to provision the computer system with a secure credential that is configured to provide authorization to use one or more functions of the vehicle, initiating a process to provision the computer system with a secure credential that is configured to provide authorization to use one or more functions of the vehicle, wherein as part of the process a second computer system, different from the computer system, that is provisioned with a secure credential that is configured to provide authorization to use one or more functions of the vehicle, prompts for authorization to provide credential information corresponding to the vehicle to the computer system; receiving, as part of the process to provision the computer system with a secure credential that is configured to provide authorization to use one or more functions of the vehicle, credential information from the second computer system based on the second computer system receiving authorization to provide the credential information to the computer system; and provisioning, using the credential information, the computer system with a secure credential that is configured to provide authorization to use one or more functions of the vehicle.

In accordance with some embodiments, a computer system is described. The computer system is configured to communicate with one or more input devices and comprises: means, during a setup process of the computer system, for: receiving, via the one or more input devices, a request to provision the computer system with a secure credential that is configured to provide authorization to use one or more functions of a vehicle; and in response to receiving the request to provision the computer system with a secure credential that is configured to provide authorization to use one or more functions of the vehicle, initiating a process to provision the computer system with a secure credential that is configured to provide authorization to use one or more functions of the vehicle, wherein as part of the process a second computer system, different from the computer system, that is provisioned with a secure credential that is configured to provide authorization to use one or more functions of the vehicle, prompts for authorization to provide credential information corresponding to the vehicle to the computer system; means for receiving, as part of the process to provision the computer system with a secure credential that is configured to provide authorization to use one or more functions of the vehicle, credential information from the second computer system based on the second computer system receiving authorization to provide the credential information to the computer system; and means for provisioning, using the credential information, the computer system with a secure credential that is configured to provide authorization to use one or more functions of the vehicle.

In accordance with some embodiments, a computer program product is described. The computer program product comprises one or more programs configured to be executed by one or more processors of a computer system that is in communication with one or more input devices, the one or more programs including instructions for: during a setup process of the computer system: receiving, via the one or more input devices, a request to provision the computer system with a secure credential that is configured to provide authorization to use one or more functions of a vehicle; and in response to receiving the request to provision the computer system with a secure credential that is configured to provide authorization to use one or more functions of the vehicle, initiating a process to provision the computer system with a secure credential that is configured to provide authorization to use one or more functions of the vehicle, wherein as part of the process a second computer system, different from the computer system, that is provisioned with a secure credential that is configured to provide authorization to use one or more functions of the vehicle, prompts for authorization to provide credential information corresponding to the vehicle to the computer system; receiving, as part of the process to provision the computer system with a secure credential that is configured to provide authorization to use one or more functions of the vehicle, credential information from the second computer system based on the second computer system receiving authorization to provide the credential information to the computer system; and provisioning, using the credential information, the computer system with a secure credential that is configured to provide authorization to use one or more functions of the vehicle.

In accordance with some embodiments, a method is described. The method comprises: at a computer system that is in communication with one or more display generation components and one or more input devices: receiving, via the one or more input devices, a request to display available roles for sharing a first credential that is configured to provide authorization to use one or more functions of a first vehicle; in response to receiving the request to display available roles for sharing the first credential, displaying, via the one or more display generation components, available roles for sharing the first credential, including displaying: a representation of a first role that corresponds to authorization to use a first set of one or more functions of a vehicle, and a representation of a second role, different from the first role, that corresponds to authorization to use a second set of one or more functions, different from the first set of one or more functions, of a vehicle; receiving, via the one or more input devices, a request to create a new role for sharing the first credential; in response to receiving the request to create a new role for sharing the first credential, initiating a process to create a new role for sharing the credential; during the process to create the role for sharing the credential: receiving, via the one or more input devices, user input that includes selection of a third set of one or more functions, different from the first set of one or more functions and the second set of one or more functions, of a vehicle; creating, based on the user input that includes selection of the third set of one or more functions, a third role that corresponds to the third set of one or more functions and that is different from the first role and the second role; subsequent to creating the third role that corresponds to the third set of one or more functions of a vehicle, receiving, via the one or more input devices, a request to share the first credential with a remote user using the third role; and in response to receiving the request to share the first credential with the remote user using the third role, initiating a process to share the first credential with the remote user using the third role, wherein the process includes providing the remote user with authorization to use the third set of one or more functions of the first vehicle.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: receiving, via the one or more input devices, a request to display available roles for sharing a first credential that is configured to provide authorization to use one or more functions of a first vehicle; in response to receiving the request to display available roles for sharing the first credential, displaying, via the one or more display generation components, available roles for sharing the first credential, including displaying: a representation of a first role that corresponds to authorization to use a first set of one or more functions of a vehicle, and a representation of a second role, different from the first role, that corresponds to authorization to use a second set of one or more functions, different from the first set of one or more functions, of a vehicle; receiving, via the one or more input devices, a request to create a new role for sharing the first credential; in response to receiving the request to create a new role for sharing the first credential, initiating a process to create a new role for sharing the credential; during the process to create the role for sharing the credential: receiving, via the one or more input devices, user input that includes selection of a third set of one or more functions, different from the first set of one or more functions and the second set of one or more functions, of a vehicle; creating, based on the user input that includes selection of the third set of one or more functions, a third role that corresponds to the third set of one or more functions and that is different from the first role and the second role; subsequent to creating the third role that corresponds to the third set of one or more functions of a vehicle, receiving, via the one or more input devices, a request to share the first credential with a remote user using the third role; and in response to receiving the request to share the first credential with the remote user using the third role, initiating a process to share the first credential with the remote user using the third role, wherein the process includes providing the remote user with authorization to use the third set of one or more functions of the first vehicle.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: receiving, via the one or more input devices, a request to display available roles for sharing a first credential that is configured to provide authorization to use one or more functions of a first vehicle; in response to receiving the request to display available roles for sharing the first credential, displaying, via the one or more display generation components, available roles for sharing the first credential, including displaying: a representation of a first role that corresponds to authorization to use a first set of one or more functions of a vehicle, and a representation of a second role, different from the first role, that corresponds to authorization to use a second set of one or more functions, different from the first set of one or more functions, of a vehicle; receiving, via the one or more input devices, a request to create a new role for sharing the first credential; in response to receiving the request to create a new role for sharing the first credential, initiating a process to create a new role for sharing the credential; during the process to create the role for sharing the credential: receiving, via the one or more input devices, user input that includes selection of a third set of one or more functions, different from the first set of one or more functions and the second set of one or more functions, of a vehicle; creating, based on the user input that includes selection of the third set of one or more functions, a third role that corresponds to the third set of one or more functions and that is different from the first role and the second role; subsequent to creating the third role that corresponds to the third set of one or more functions of a vehicle, receiving, via the one or more input devices, a request to share the first credential with a remote user using the third role; and in response to receiving the request to share the first credential with the remote user using the third role, initiating a process to share the first credential with the remote user using the third role, wherein the process includes providing the remote user with authorization to use the third set of one or more functions of the first vehicle.

In accordance with some embodiments, a computer system is described. The computer system is configured to communicate with one or more display generation components and one or more input devices and comprises: one or more processors; and memory storing one or more programs configured to be executed by the one or more processors, the one or more programs including instructions for: receiving, via the one or more input devices, a request to display available roles for sharing a first credential that is configured to provide authorization to use one or more functions of a first vehicle; in response to receiving the request to display available roles for sharing the first credential, displaying, via the one or more display generation components, available roles for sharing the first credential, including displaying: a representation of a first role that corresponds to authorization to use a first set of one or more functions of a vehicle, and a representation of a second role, different from the first role, that corresponds to authorization to use a second set of one or more functions, different from the first set of one or more functions, of a vehicle; receiving, via the one or more input devices, a request to create a new role for sharing the first credential; in response to receiving the request to create a new role for sharing the first credential, initiating a process to create a new role for sharing the credential; during the process to create the role for sharing the credential: receiving, via the one or more input devices, user input that includes selection of a third set of one or more functions, different from the first set of one or more functions and the second set of one or more functions, of a vehicle; creating, based on the user input that includes selection of the third set of one or more functions, a third role that corresponds to the third set of one or more functions and that is different from the first role and the second role; subsequent to creating the third role that corresponds to the third set of one or more functions of a vehicle, receiving, via the one or more input devices, a request to share the first credential with a remote user using the third role; and in response to receiving the request to share the first credential with the remote user using the third role, initiating a process to share the first credential with the remote user using the third role, wherein the process includes providing the remote user with authorization to use the third set of one or more functions of the first vehicle.

In accordance with some embodiments, a computer system is described. The computer system is configured to communicate with one or more display generation components and one or more input devices and comprises: means for receiving, via the one or more input devices, a request to display available roles for sharing a first credential that is configured to provide authorization to use one or more functions of a first vehicle; means, responsive to receiving the request to display available roles for sharing the first credential, for displaying, via the one or more display generation components, available roles for sharing the first credential, including displaying: a representation of a first role that corresponds to authorization to use a first set of one or more functions of a vehicle, and a representation of a second role, different from the first role, that corresponds to authorization to use a second set of one or more functions, different from the first set of one or more functions, of a vehicle; means for receiving, via the one or more input devices, a request to create a new role for sharing the first credential; means, responsive to receiving the request to create a new role for sharing the first credential, for initiating a process to create a new role for sharing the credential; means, during the process to create the role for sharing the credential, for: receiving, via the one or more input devices, user input that includes selection of a third set of one or more functions, different from the first set of one or more functions and the second set of one or more functions, of a vehicle; creating, based on the user input that includes selection of the third set of one or more functions, a third role that corresponds to the third set of one or more functions and that is different from the first role and the second role; means, subsequent to creating the third role that corresponds to the third set of one or more functions of a vehicle, for receiving, via the one or more input devices, a request to share the first credential with a remote user using the third role; and means, responsive to receiving the request to share the first credential with the remote user using the third role, for initiating a process to share the first credential with the remote user using the third role, wherein the process includes providing the remote user with authorization to use the third set of one or more functions of the first vehicle.

In accordance with some embodiments, a computer program product is described. The computer program product comprises one or more programs configured to be executed by one or more processors of a computer system that is in communication with one or more display generation components and one or more input devices, the one or more programs including instructions for: In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: receiving, via the one or more input devices, a request to display available roles for sharing a first credential that is configured to provide authorization to use one or more functions of a first vehicle; in response to receiving the request to display available roles for sharing the first credential, displaying, via the one or more display generation components, available roles for sharing the first credential, including displaying: a representation of a first role that corresponds to authorization to use a first set of one or more functions of a vehicle, and a representation of a second role, different from the first role, that corresponds to authorization to use a second set of one or more functions, different from the first set of one or more functions, of a vehicle; receiving, via the one or more input devices, a request to create a new role for sharing the first credential; in response to receiving the request to create a new role for sharing the first credential, initiating a process to create a new role for sharing the credential; during the process to create the role for sharing the credential: receiving, via the one or more input devices, user input that includes selection of a third set of one or more functions, different from the first set of one or more functions and the second set of one or more functions, of a vehicle; creating, based on the user input that includes selection of the third set of one or more functions, a third role that corresponds to the third set of one or more functions and that is different from the first role and the second role; subsequent to creating the third role that corresponds to the third set of one or more functions of a vehicle, receiving, via the one or more input devices, a request to share the first credential with a remote user using the third role; and in response to receiving the request to share the first credential with the remote user using the third role, initiating a process to share the first credential with the remote user using the third role, wherein the process includes providing the remote user with authorization to use the third set of one or more functions of the first vehicle.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing car key credentials, thereby increasing the effectiveness, efficiency, and user satisfaction with such devices. Such methods and interfaces may complement or replace other methods for managing car key credentials.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing car key credentials. Such techniques can reduce the cognitive burden on a user who accesses car keys using credentials stored at electronic devices, thereby enhancing productivity. Further, such techniques can reduce processor and battery power otherwise wasted on redundant user inputs.

Figure 6A:
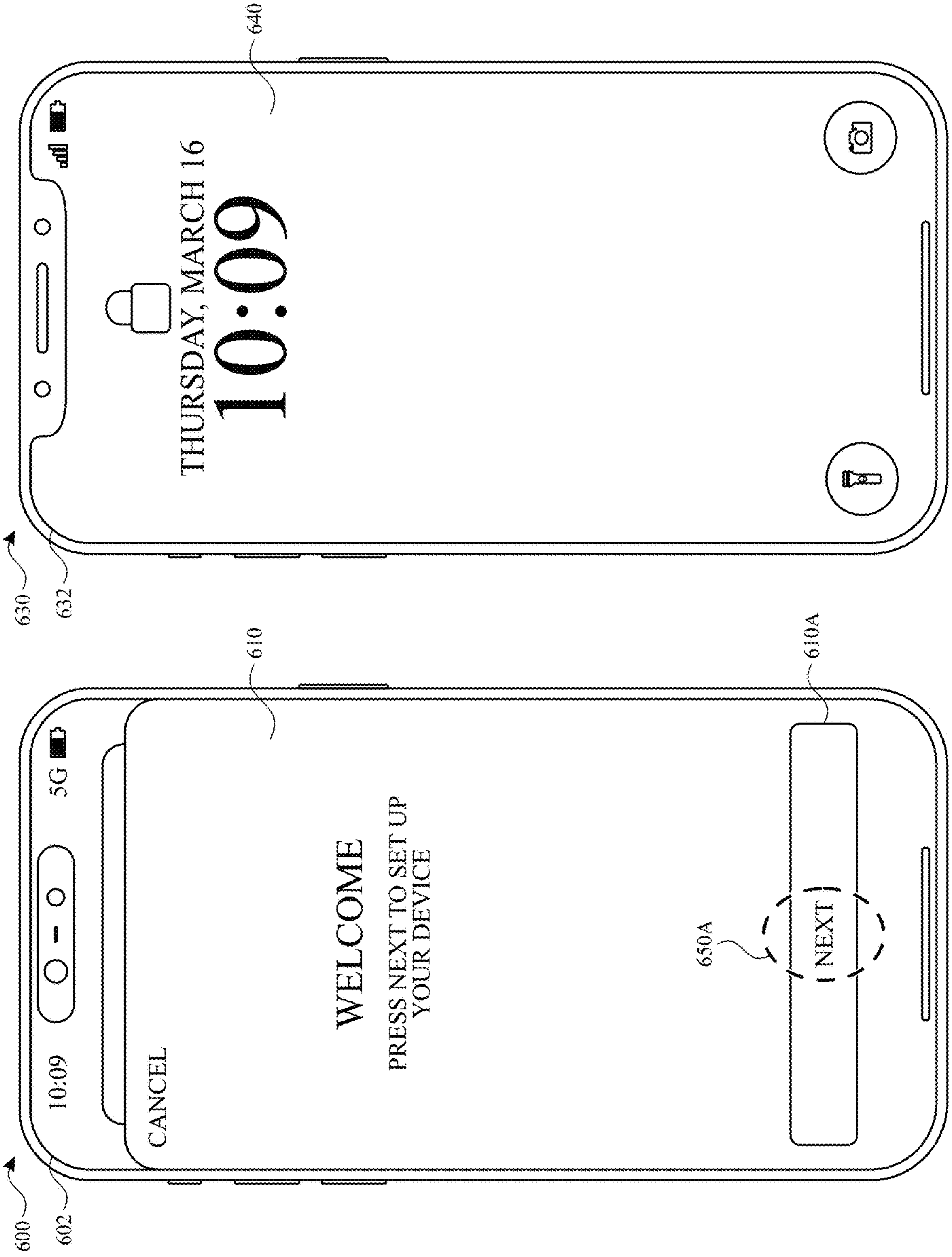
FIGS. 6A-6Y illustrate exemplary user interfaces for managing car key credentials, in accordance with some embodiments.
Figure 6Y:
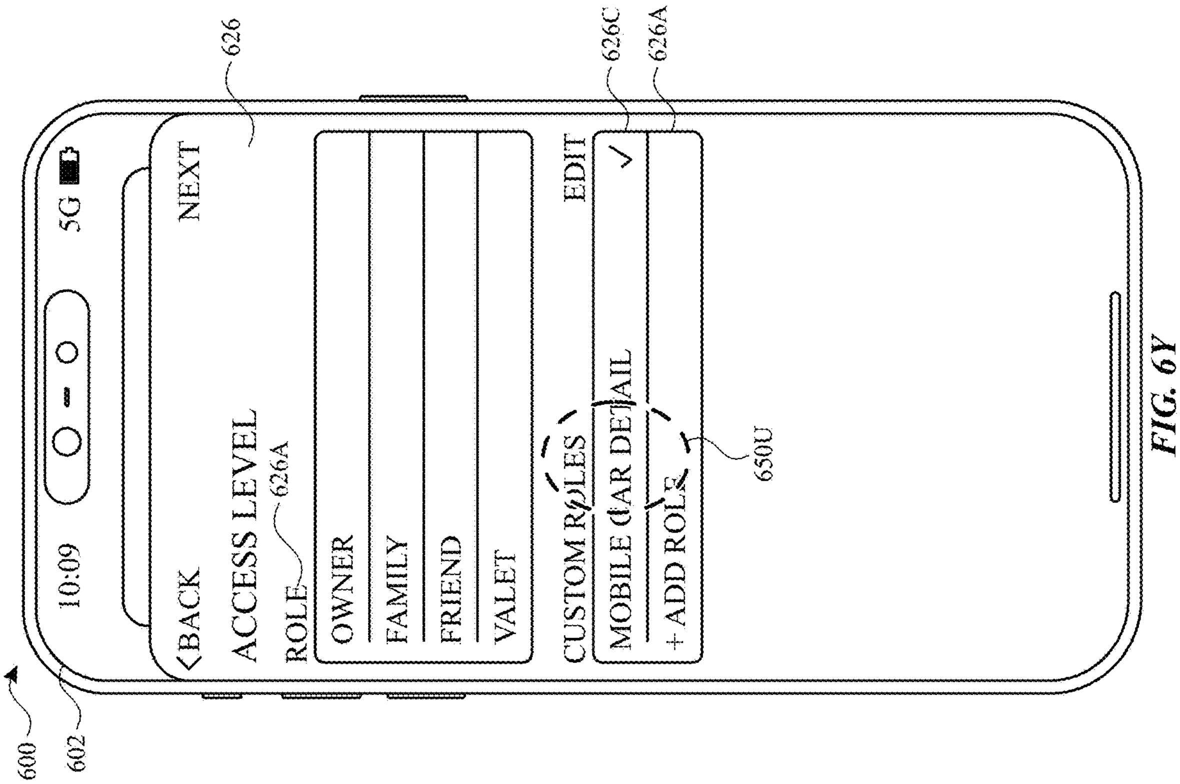
Figure 7:
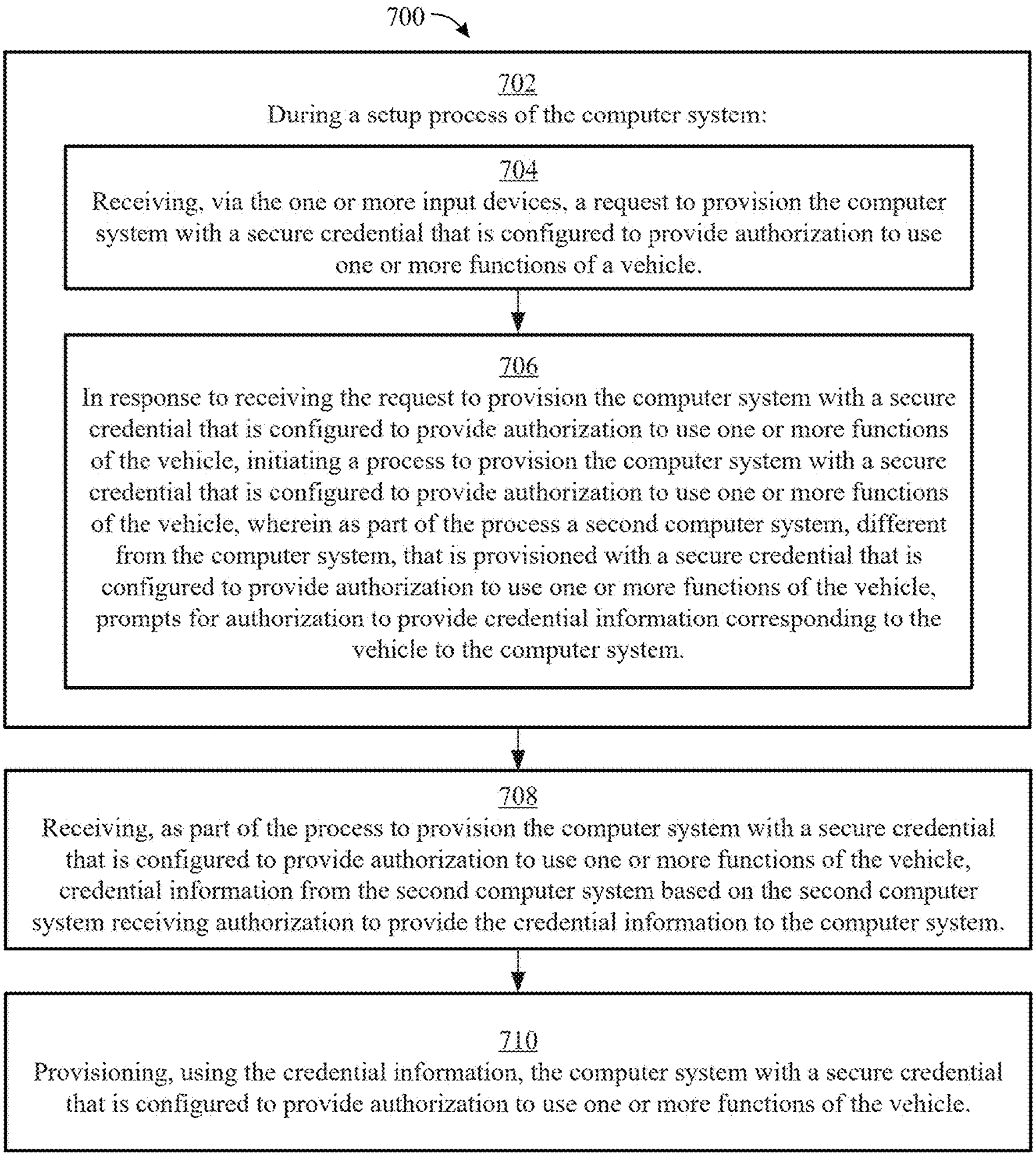
FIG. 7 is a flow diagram illustrating a method for managing car key credentials using a computer system, in accordance with some embodiments.
Figure 8A:
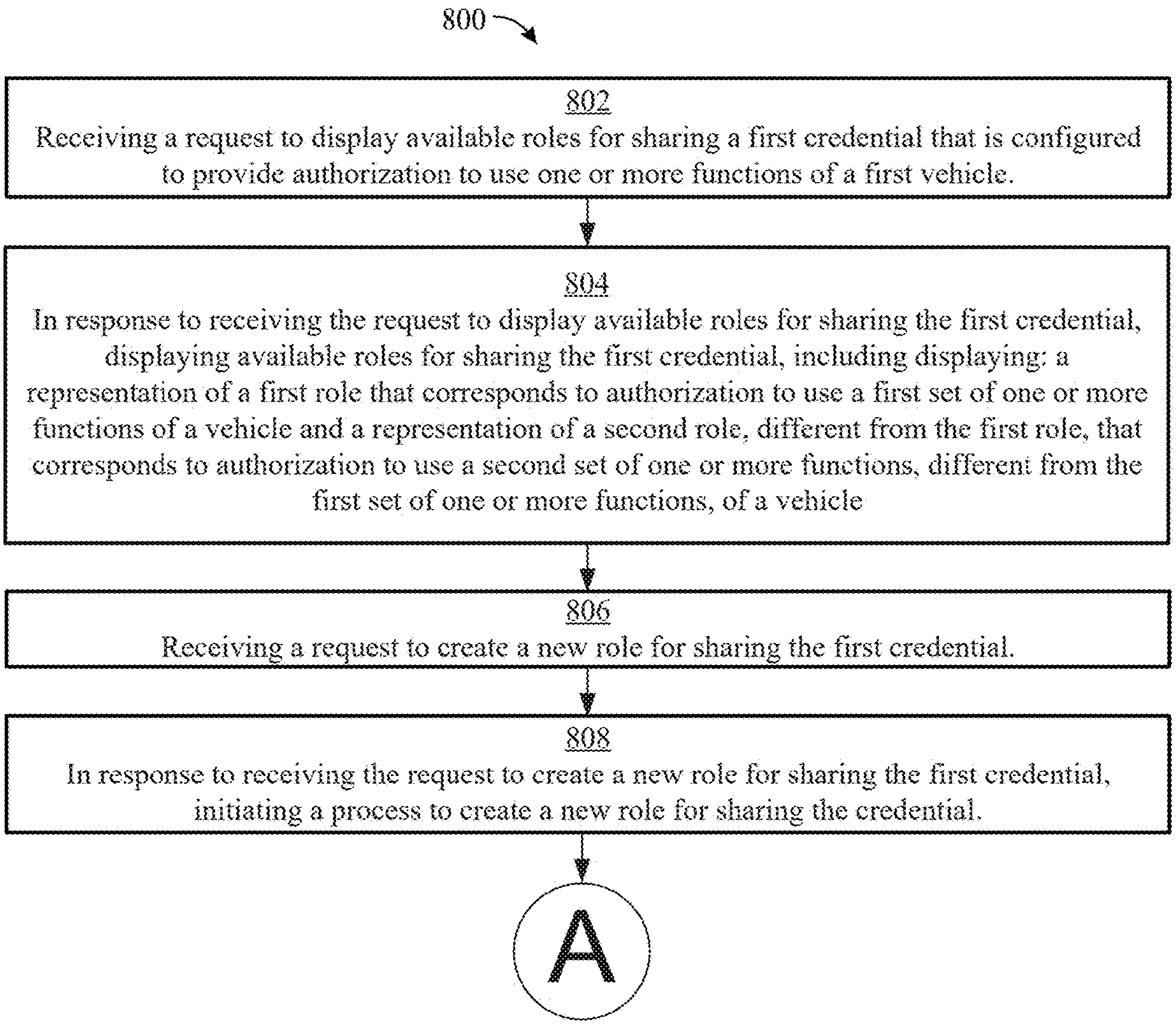
FIGS. 8A-8B are a flow diagram illustrating a method for managing car key credentials using a computer system, in accordance with some embodiments.
Figure 8B:
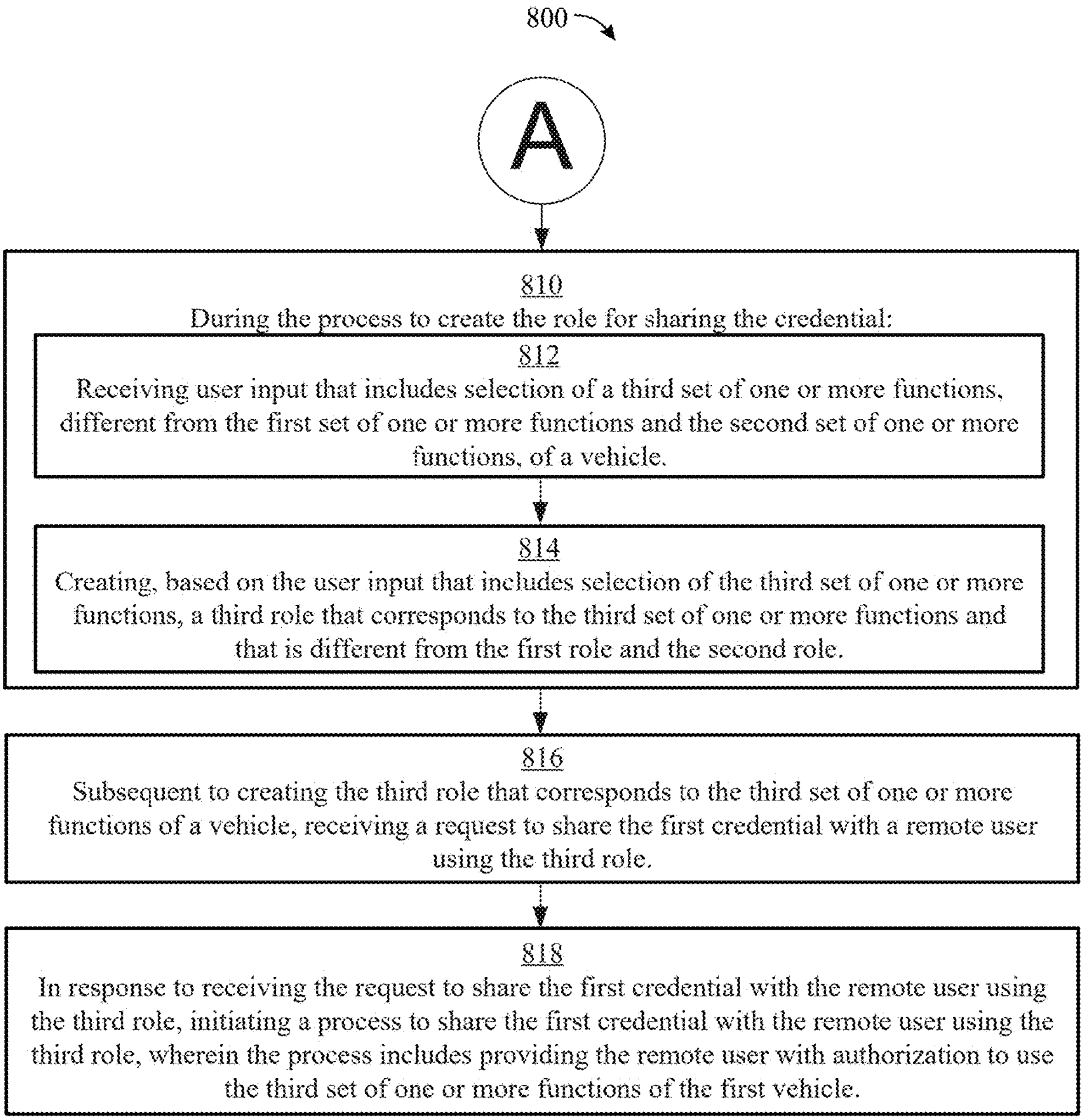

Below, FIGS. 1A-1B, 2, 3A-3G, 4A-4B, and 5A-5C provide a description of exemplary devices for performing the techniques for managing car key credentials. FIGS. 6A-6Y illustrate exemplary user interfaces for managing car key credentials, in accordance with some embodiments. FIG. 7 is a flow diagram illustrating a method for managing car key credentials using a computer system, in accordance with some embodiments. FIGS. 8A-8B are a flow diagram illustrating a method for managing car key credentials using a computer system, in accordance with some embodiments. The user interfaces in FIGS. 6A-6Y are used to illustrate the processes described below, including the processes in FIGS. 7 and 8A-8B.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component (e.g., a display device such as a head-mounted display (HMD), a display, a projector, a touch-sensitive display, or other device or component that presents visual content to a user, for example on or in the display generation component itself or produced from the display generation component and visible elsewhere). The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
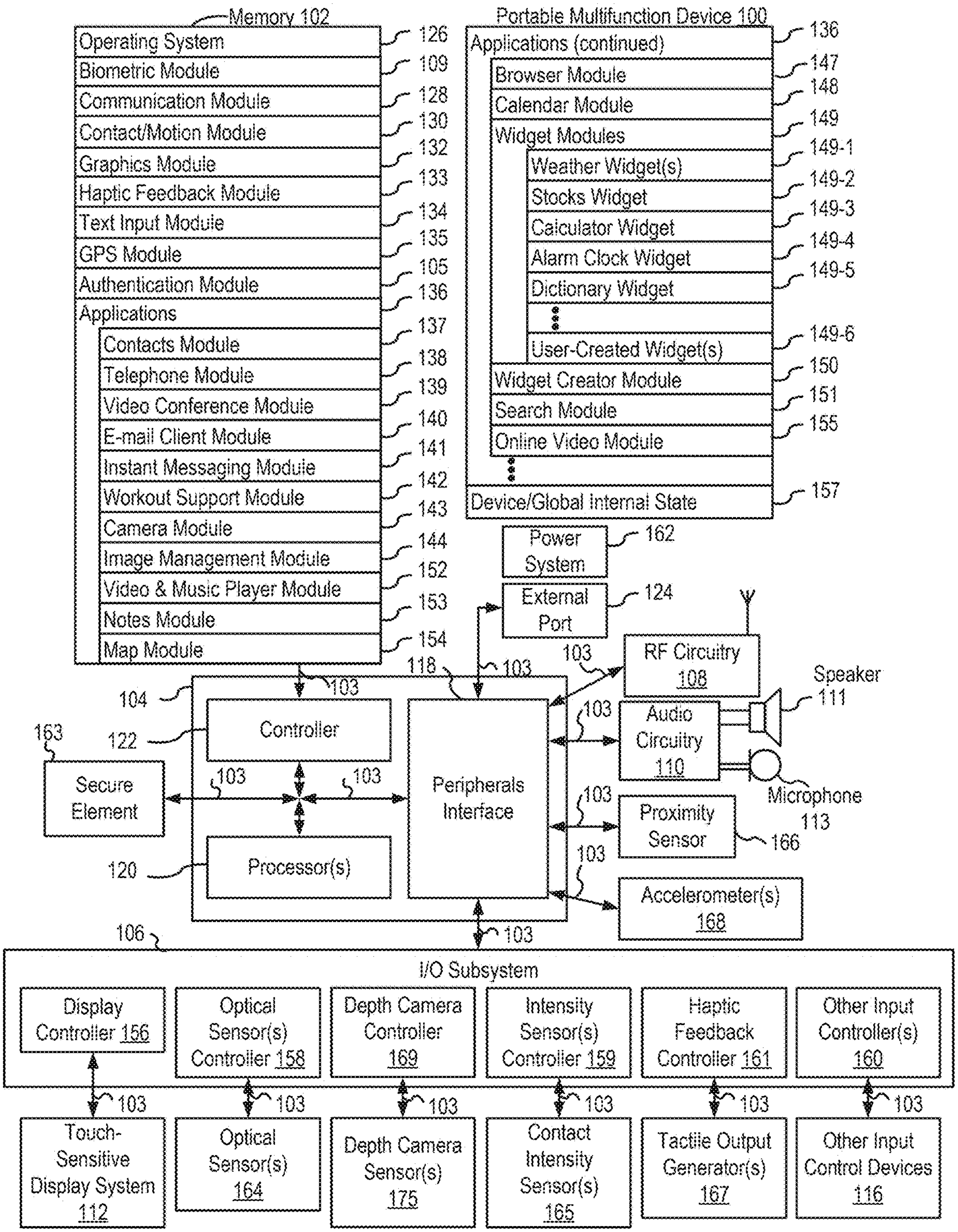
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes secure element 163 for securely storing information. In some embodiments, secure element 163 is a hardware component (e.g., a secure microcontroller chip) configured to securely store data or an algorithm. In some embodiments, secure element 163 provides (e.g., releases) secure information (e.g., payment information (e.g., an account number and/or a transaction-specific dynamic security code), identification information (e.g., credentials of a state-approved digital identification), and/or authentication information (e.g., data generated using a cryptography engine and/or by performing asymmetric cryptography operations)). In some embodiments, secure element 163 provides (or releases) the secure information in response to device 100 receiving authorization, such as a user authentication (e.g., fingerprint authentication; passcode authentication; detecting double-press of a hardware button when device 100 is in an unlocked state, and optionally, while device 100 has been continuously on a user's wrist since device 100 was unlocked by providing authentication credentials to device 100, where the continuous presence of device 100 on the user's wrist is determined by periodically checking that the device is in contact with the user's skin). For example, device 100 detects a fingerprint at a fingerprint sensor (e.g., a fingerprint sensor integrated into a button) of device 100. Device 100 determines whether the detected fingerprint is consistent with an enrolled fingerprint. In accordance with a determination that the fingerprint is consistent with the enrolled fingerprint, secure element 163 provides (e.g., releases) the secure information. In accordance with a determination that the fingerprint is not consistent with the enrolled fingerprint, secure element 163 forgoes providing (e.g., releasing) the secure information.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3A:
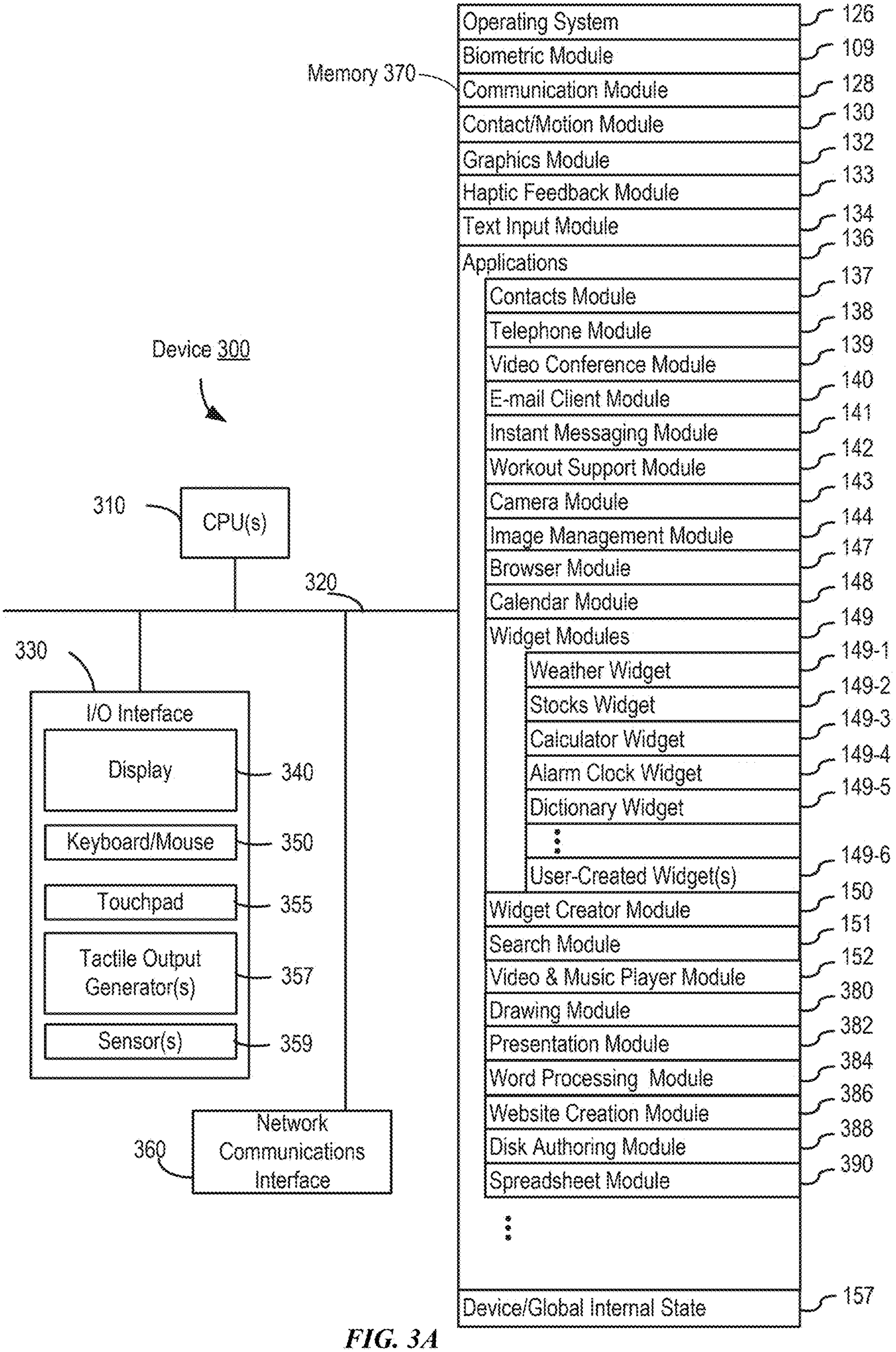
FIG. 3A is a block diagram of an exemplary multifunction device with a display and a touch-sensitive surface in accordance with some embodiments.

In some embodiments, the software components stored in memory 102 include operating system 126, biometric module 109, communication module (or set of instructions) 128, contact/motion module (or set of instructions) 130, graphics module (or set of instructions) 132, text input module (or set of instructions) 134, Global Positioning System (GPS) module (or set of instructions) 135, authentication module 105, and applications (or sets of instructions) 136. Furthermore, in some embodiments, memory 102 (FIG. 1A) or 370 (FIG. 3A) stores device/global internal state 157, as shown in FIGS. 1A and 3A. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Biometric module 109 optionally stores information about one or more enrolled biometric features (e.g., fingerprint feature information, facial recognition feature information, eye and/or iris feature information) for use to verify whether received biometric information matches the enrolled biometric features. In some embodiments, the information stored about the one or more enrolled biometric features includes data that enables the comparison between the stored information and received biometric information without including enough information to reproduce the enrolled biometric features. In some embodiments, biometric module 109 stores the information about the enrolled biometric features in association with a user account of device 100. In some embodiments, biometric module 109 compares the received biometric information to an enrolled biometric feature to determine whether the received biometric information matches the enrolled biometric feature.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Authentication module 105 determines whether a requested operation (e.g., requested by an application of applications 136) is authorized to be performed. In some embodiments, authentication module 105 receives for an operation to be perform that optionally requires authentication. Authentication module 105 determines whether the operation is authorized to be performed, such as based on a series of factors, including the lock status of device 100, the location of device 100, whether a security delay has elapsed, whether received biometric information matches enrolled biometric features, and/or other factors. Once authentication module 105 determines that the operation is authorized to be performed, authentication module 105 triggers performance of the operation.

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
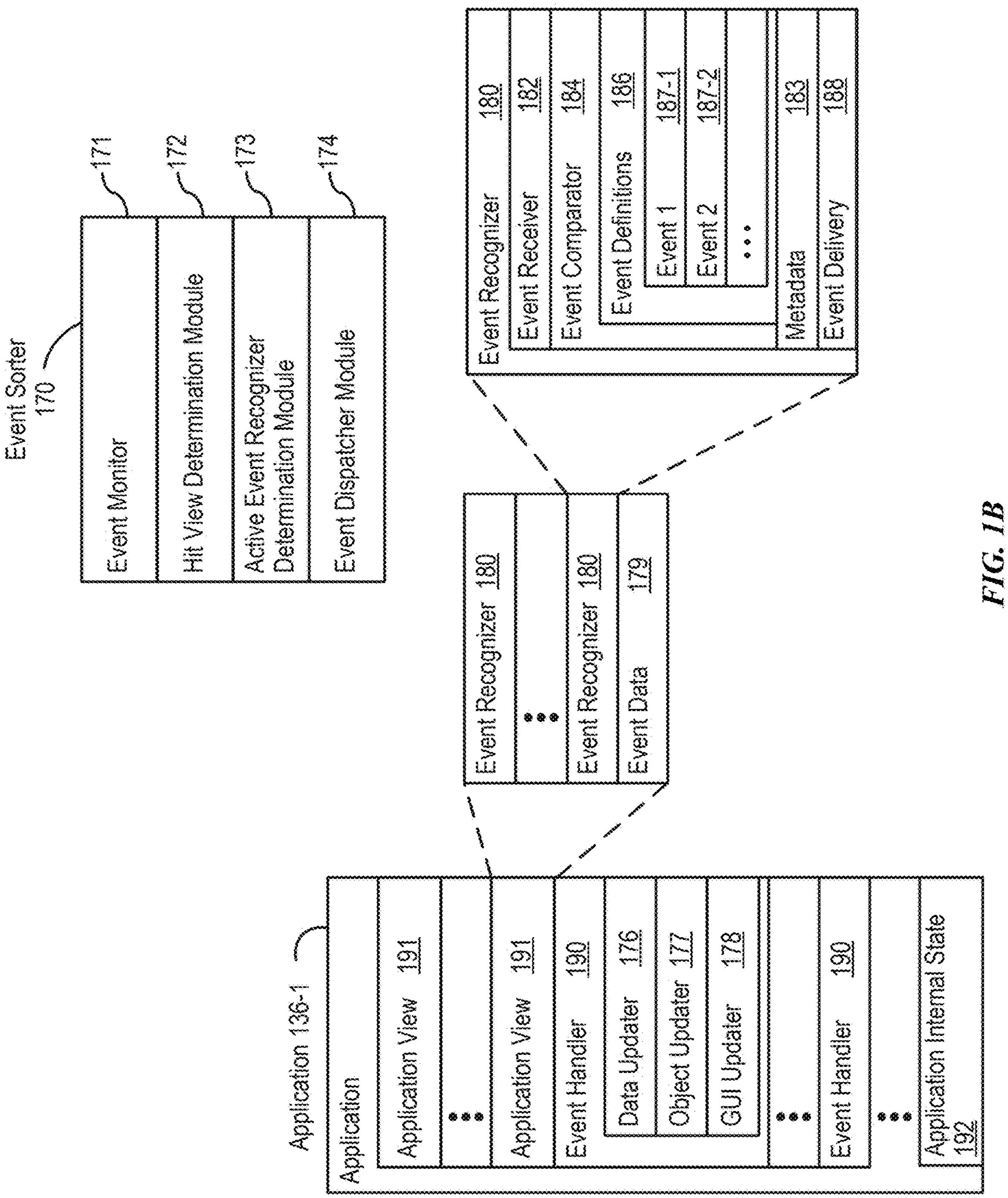
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3A) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
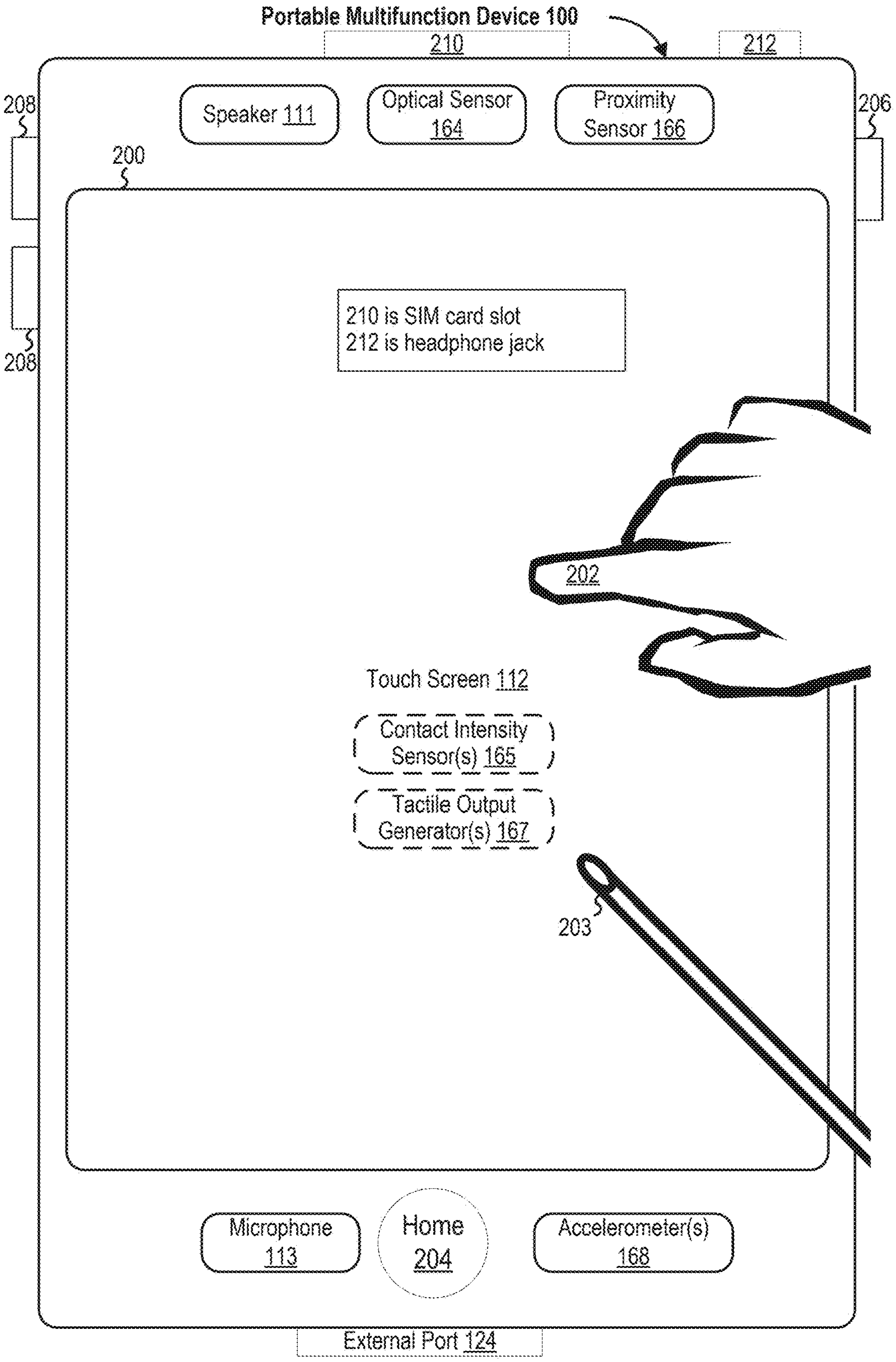
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as “home” or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3A is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child’s learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3A is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Implementations within the scope of the present disclosure can be partially or entirely realized using a tangible computer-readable storage medium (or multiple tangible computer-readable storage media of one or more types) encoding one or more computer-readable instructions. It should be recognized that computer-readable instructions can be organized in any format, including applications, widgets, processes, software, and/or components.

Figure 3B:
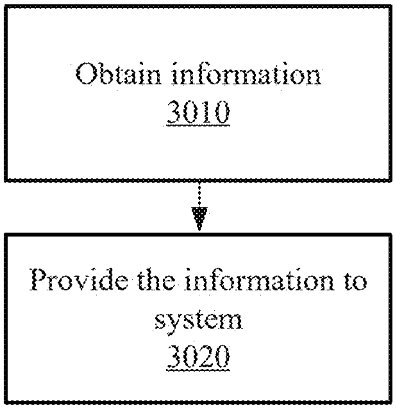
FIGS. 3B-3G illustrate the use of Application Programming Interfaces (APIs) to perform operations.
Figure 3C:
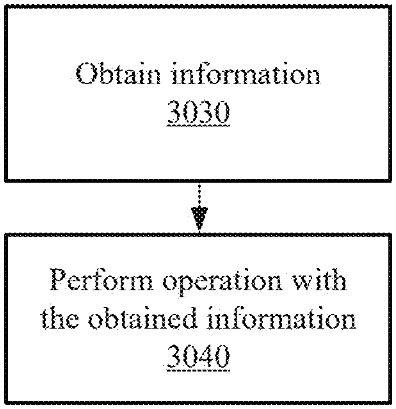

Implementations within the scope of the present disclosure include a computer-readable storage medium that encodes instructions organized as an application (e.g., application 3160) that, when executed by one or more processing units, control an electronic device (e.g., device 3150) to perform the method of FIG. 3B, the method of FIG. 3C, and/or one or more other processes and/or methods described herein.

It should be recognized that application 3160 (shown in FIG. 3D) can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application. In some embodiments, application 3160 is an application that is pre-installed on device 3150 at purchase (e.g., a first-party application). In some embodiments, application 3160 is an application that is provided to device 3150 via an operating system update file (e.g., a first-party application or a second-party application). In some embodiments, application 3160 is an application that is provided via an application store. In some embodiments, the application store can be an application store that is pre-installed on device 3150 at purchase (e.g., a first-party application store). In some embodiments, the application store is a third-party application store (e.g., an application store that is provided by another application store, downloaded via a network, and/or read from a storage device).

Figure 3D:
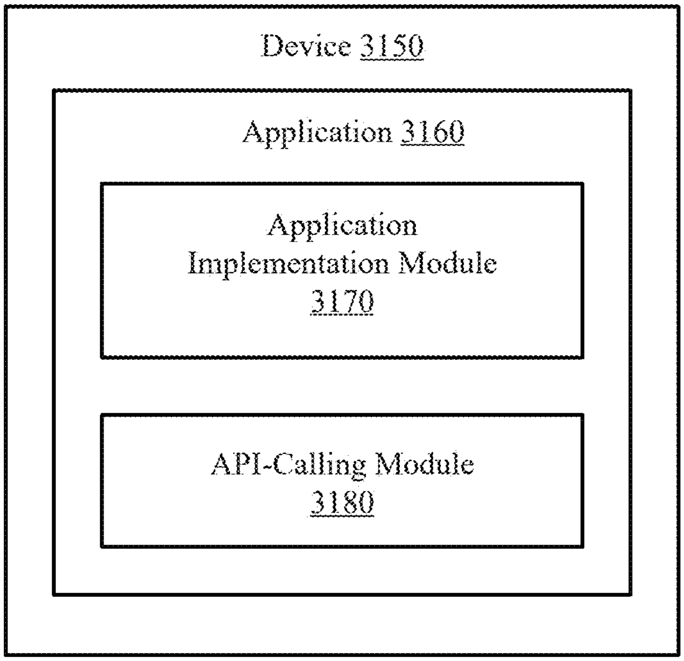
Figure 3E:
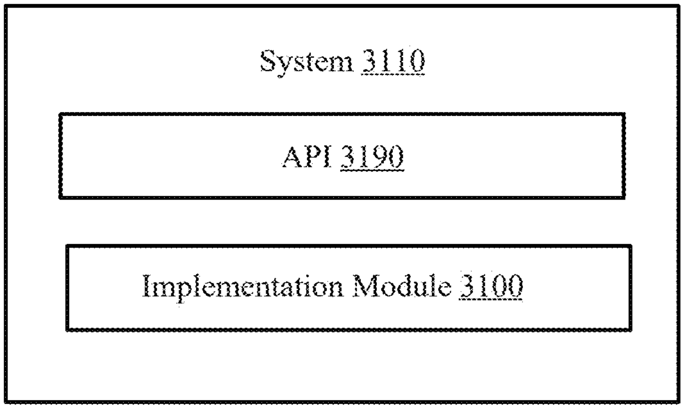
Figure 3F:
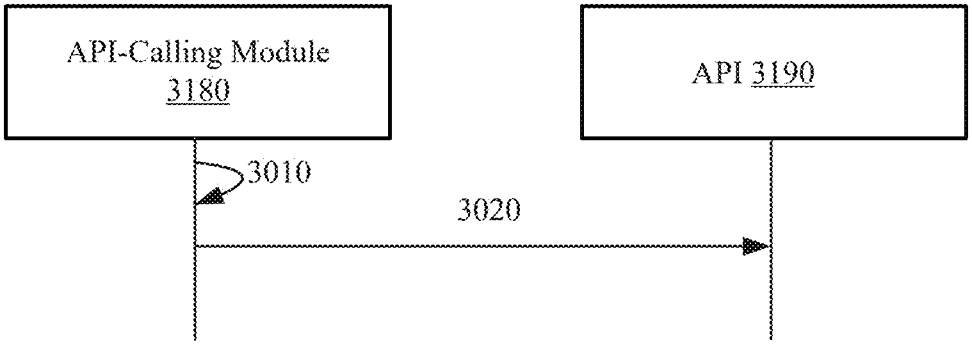

Referring to FIG. 3B and FIG. 3F, application 3160 obtains information (e.g., 3010). In some embodiments, at 3010, information is obtained from at least one hardware component of device 3150. In some embodiments, at 3010, information is obtained from at least one software module of device 3150. In some embodiments, at 3010, information is obtained from at least one hardware component external to device 3150 (e.g., a peripheral device, an accessory device, and/or a server). In some embodiments, the information obtained at 3010 includes positional information, time information, notification information, user information, environment information, electronic device state information, weather information, media information, historical information, event information, hardware information, and/or motion information. In some embodiments, in response to and/or after obtaining the information at 3010, application 3160 provides the information to a system (e.g., 3020).

In some embodiments, the system (e.g., 3110 shown in FIG. 3E) is an operating system hosted on device 3150. In some embodiments, the system (e.g., 3110 shown in FIG. 3E) is an external device (e.g., a server, a peripheral device, an accessory, and/or a personal computing device) that includes an operating system.

Figure 3G:
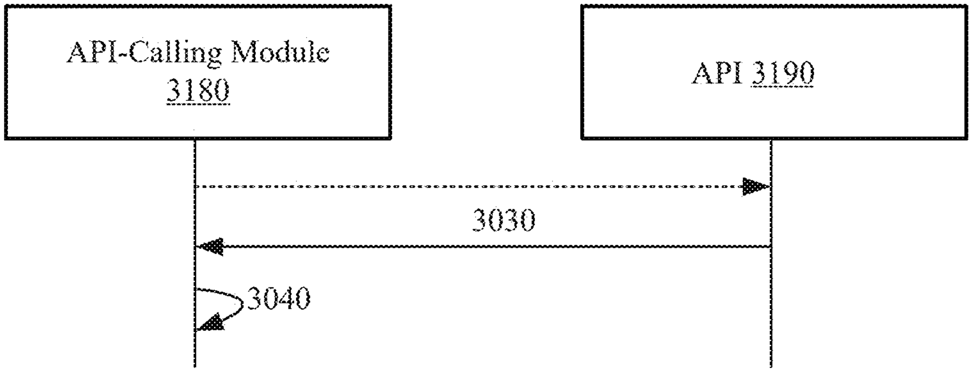

Referring to FIG. 3C and FIG. 3G, application 3160 obtains information (e.g., 3030). In some embodiments, the information obtained at 3030 includes positional information, time information, notification information, user information, environment information electronic device state information, weather information, media information, historical information, event information, hardware information, and/or motion information. In response to and/or after obtaining the information at 3030, application 3160 performs an operation with the information (e.g., 3040). In some embodiments, the operation performed at 3040 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 3110 based on the information.

In some embodiments, one or more steps of the method of FIG. 3B and/or the method of FIG. 3C is performed in response to a trigger. In some embodiments, the trigger includes detection of an event, a notification received from system 3110, a user input, and/or a response to a call to an API provided by system 3110.

In some embodiments, the instructions of application 3160, when executed, control device 3150 to perform the method of FIG. 3B and/or the method of FIG. 3C by calling an application programming interface (API) (e.g., API 3190) provided by system 3110. In some embodiments, application 3160 performs at least a portion of the method of FIG. 3B and/or the method of FIG. 3C without calling API 3190.

In some embodiments, one or more steps of the method of FIG. 3B and/or the method of FIG. 3C includes calling an API (e.g., API 3190) using one or more parameters defined by the API. In some embodiments, the one or more parameters include a constant, a key, a data structure, an object, an object class, a variable, a data type, a pointer, an array, a list or a pointer to a function or method, and/or another way to reference a data or other item to be passed via the API.

Referring to FIG. 3D, device 3150 is illustrated. In some embodiments, device 3150 is a personal computing device, a smart phone, a smart watch, a fitness tracker, a head mounted display (HMD) device, a media device, a communal device, a speaker, a television, and/or a tablet. As illustrated in FIG. 3D, device 3150 includes application 3160 and an operating system (e.g., system 3110 shown in FIG. 3E). Application 3160 includes application implementation module 3170 and API-calling module 3180. System 3110 includes API 3190 and implementation module 3100. It should be recognized that device 3150, application 3160, and/or system 3110 can include more, fewer, and/or different components than illustrated in FIGS. 3D and 3E.

In some embodiments, application implementation module 3170 includes a set of one or more instructions corresponding to one or more operations performed by application 3160. For example, when application 3160 is a messaging application, application implementation module 3170 can include operations to receive and send messages. In some embodiments, application implementation module 3170 communicates with API-calling module 3180 to communicate with system 3110 via API 3190 (shown in FIG. 3E).

In some embodiments, API 3190 is a software module (e.g., a collection of computer-readable instructions) that provides an interface that allows a different module (e.g., API-calling module 3180) to access and/or use one or more functions, methods, procedures, data structures, classes, and/or other services provided by implementation module 3100 of system 3110. For example, API-calling module 3180 can access a feature of implementation module 3100 through one or more API calls or invocations (e.g., embodied by a function or a method call) exposed by API 3190 (e.g., a software and/or hardware module that can receive API calls, respond to API calls, and/or send API calls) and can pass data and/or control information using one or more parameters via the API calls or invocations. In some embodiments, API 3190 allows application 3160 to use a service provided by a Software Development Kit (SDK) library. In some embodiments, application 3160 incorporates a call to a function or method provided by the SDK library and provided by API 3190 or uses data types or objects defined in the SDK library and provided by API 3190. In some embodiments, API-calling module 3180 makes an API call via API 3190 to access and use a feature of implementation module 3100 that is specified by API 3190. In such embodiments, implementation module 3100 can return a value via API 3190 to API-calling module 3180 in response to the API call. The value can report to application 3160 the capabilities or state of a hardware component of device 3150, including those related to aspects such as input capabilities and state, output capabilities and state, processing capability, power state, storage capacity and state, and/or communications capability. In some embodiments, API 3190 is implemented in part by firmware, microcode, or other low level logic that executes in part on the hardware component.

In some embodiments, API 3190 allows a developer of API-calling module 3180 (which can be a third-party developer) to leverage a feature provided by implementation module 3100. In such embodiments, there can be one or more API-calling modules (e.g., including API-calling module 3180) that communicate with implementation module 3100. In some embodiments, API 3190 allows multiple API-calling modules written in different programming languages to communicate with implementation module 3100 (e.g., API 3190 can include features for translating calls and returns between implementation module 3100 and API-calling module 3180) while API 3190 is implemented in terms of a specific programming language. In some embodiments, API-calling module 3180 calls APIs from different providers such as a set of APIs from an OS provider, another set of APIs from a plug-in provider, and/or another set of APIs from another provider (e.g., the provider of a software library) or creator of the another set of APIs.

Examples of API 3190 can include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API. In some embodiments, the sensor API is an API for accessing data associated with a sensor of device 3150. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor, and/or biometric sensor.

In some embodiments, implementation module 3100 is a system (e.g., operating system and/or server system) software module (e.g., a collection of computer-readable instructions) that is constructed to perform an operation in response to receiving an API call via API 3190. In some embodiments, implementation module 3100 is constructed to provide an API response (via API 3190) as a result of processing an API call. By way of example, implementation module 3100 and API-calling module 3180 can each be any one of an operating system, a library, a device driver, an API, an application program, or other module. It should be understood that implementation module 3100 and API-calling module 3180 can be the same or different type of module from each other. In some embodiments, implementation module 3100 is embodied at least in part in firmware, microcode, or hardware logic.

In some embodiments, implementation module 3100 returns a value through API 3190 in response to an API call from API-calling module 3180. While API 3190 defines the syntax and result of an API call (e.g., how to invoke the API call and what the API call does), API 3190 might not reveal how implementation module 3100 accomplishes the function specified by the API call. Various API calls are transferred via the one or more application programming interfaces between API-calling module 3180 and implementation module 3100. Transferring the API calls can include issuing, initiating, invoking, calling, receiving, returning, and/or responding to the function calls or messages. In other words, transferring can describe actions by either of API-calling module 3180 or implementation module 3100. In some embodiments, a function call or other invocation of API 3190 sends and/or receives one or more parameters through a parameter list or other structure.

In some embodiments, implementation module 3100 provides more than one API, each providing a different view of or with different aspects of functionality implemented by implementation module 3100. For example, one API of implementation module 3100 can provide a first set of functions and can be exposed to third-party developers, and another API of implementation module 3100 can be hidden (e.g., not exposed) and provide a subset of the first set of functions and also provide another set of functions, such as testing or debugging functions which are not in the first set of functions. In some embodiments, implementation module 3100 calls one or more other components via an underlying API and thus is both an API-calling module and an implementation module. It should be recognized that implementation module 3100 can include additional functions, methods, classes, data structures, and/or other features that are not specified through API 3190 and are not available to API-calling module 3180. It should also be recognized that API-calling module 3180 can be on the same system as implementation module 3100 or can be located remotely and access implementation module 3100 using API 3190 over a network. In some embodiments, implementation module 3100, API 3190, and/or API-calling module 3180 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

An application programming interface (API) is an interface between a first software process and a second software process that specifies a format for communication between the first software process and the second software process. Limited APIs (e.g., private APIs or partner APIs) are APIs that are accessible to a limited set of software processes (e.g., only software processes within an operating system or only software processes that are approved to access the limited APIs). Public APIs that are accessible to a wider set of software processes. Some APIs enable software processes to communicate about or set a state of one or more input devices (e.g., one or more touch sensors, proximity sensors, visual sensors, motion/orientation sensors, pressure sensors, intensity sensors, sound sensors, wireless proximity sensors, biometric sensors, buttons, switches, rotatable elements, and/or external controllers). Some APIs enable software processes to communicate about and/or set a state of one or more output generation components (e.g., one or more audio output generation components, one or more display generation components, and/or one or more tactile output generation components). Some APIs enable particular capabilities (e.g., scrolling, handwriting, text entry, image editing, and/or image creation) to be accessed, performed, and/or used by a software process (e.g., generating outputs for use by a software process based on input from the software process). Some APIs enable content from a software process to be inserted into a template and displayed in a user interface that has a layout and/or behaviors that are specified by the template.

Many software platforms include a set of frameworks that provides the core objects and core behaviors that a software developer needs to build software applications that can be used on the software platform. Software developers use these objects to display content onscreen, to interact with that content, and to manage interactions with the software platform. Software applications rely on the set of frameworks for their basic behavior, and the set of frameworks provides many ways for the software developer to customize the behavior of the application to match the specific needs of the software application. Many of these core objects and core behaviors are accessed via an API. An API will typically specify a format for communication between software processes, including specifying and grouping available variables, functions, and protocols. An API call (sometimes referred to as an API request) will typically be sent from a sending software process to a receiving software process as a way to accomplish one or more of the following: the sending software process requesting information from the receiving software process (e.g., for the sending software process to take action on), the sending software process providing information to the receiving software process (e.g., for the receiving software process to take action on), the sending software process requesting action by the receiving software process, or the sending software process providing information to the receiving software process about action taken by the sending software process. Interaction with a device (e.g., using a user interface) will in some circumstances include the transfer and/or receipt of one or more API calls (e.g., multiple API calls) between multiple different software processes (e.g., different portions of an operating system, an application and an operating system, or different applications) via one or more APIs (e.g., via multiple different APIs). For example, when an input is detected the direct sensor data is frequently processed into one or more input events that are provided (e.g., via an API) to a receiving software process that makes some determination based on the input events, and then sends (e.g., via an API) information to a software process to perform an operation (e.g., change a device state and/or user interface) based on the determination. While a determination and an operation performed in response could be made by the same software process, alternatively the determination could be made in a first software process and relayed (e.g., via an API) to a second software process, that is different from the first software process, that causes the operation to be performed by the second software process. Alternatively, the second software process could relay instructions (e.g., via an API) to a third software process that is different from the first software process and/or the second software process to perform the operation. It should be understood that some or all user interactions with a computer system could involve one or more API calls within a step of interacting with the computer system (e.g., between different software components of the computer system or between a software component of the computer system and a software component of one or more remote computer systems). It should be understood that some or all user interactions with a computer system could involve one or more API calls between steps of interacting with the computer system (e.g., between different software components of the computer system or between a software component of the computer system and a software component of one or more remote computer systems).

In some embodiments, the application can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application.

In some embodiments, the application is an application that is pre-installed on the first computer system at purchase (e.g., a first-party application). In some embodiments, the application is an application that is provided to the first computer system via an operating system update file (e.g., a first-party application). In some embodiments, the application is an application that is provided via an application store. In some embodiments, the application store is pre-installed on the first computer system at purchase (e.g., a first-party application store) and allows download of one or more applications. In some embodiments, the application store is a third-party application store (e.g., an application store that is provided by another device, downloaded via a network, and/or read from a storage device). In some embodiments, the application is a third-party application (e.g., an app that is provided by an application store, downloaded via a network, and/or read from a storage device). In some embodiments, the application controls the first computer system to perform methods 700 and 800 (FIGS. 7 and/or 8A-8B) by calling an application programming interface (API) provided by the system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, a photos API, a camera API, and/or an image processing API.

In some embodiments, at least one API is a software module (e.g., a collection of computer-readable instructions) that provides an interface that allows a different module (e.g., API-calling module 3180) to access and use one or more functions, methods, procedures, data structures, classes, and/or other services provided by an implementation module of the system process. The API can define one or more parameters that are passed between the API-calling module and the implementation module. In some embodiments, API 3190 defines a first API call that can be provided by API-calling module 3180. The implementation module is a system software module (e.g., a collection of computer-readable instructions) that is constructed to perform an operation in response to receiving an API call via the API. In some embodiments, the implementation module is constructed to provide an API response (via the API) as a result of processing an API call. In some embodiments, the implementation module is included in the device (e.g., 3150) that runs the application. In some embodiments, the implementation module is included in an electronic device that is separate from the device that runs the application.

Attention is now directed towards embodiments of user interfaces that are, optionally, implemented on, for example, portable multifunction device 100.

Figure 4A:
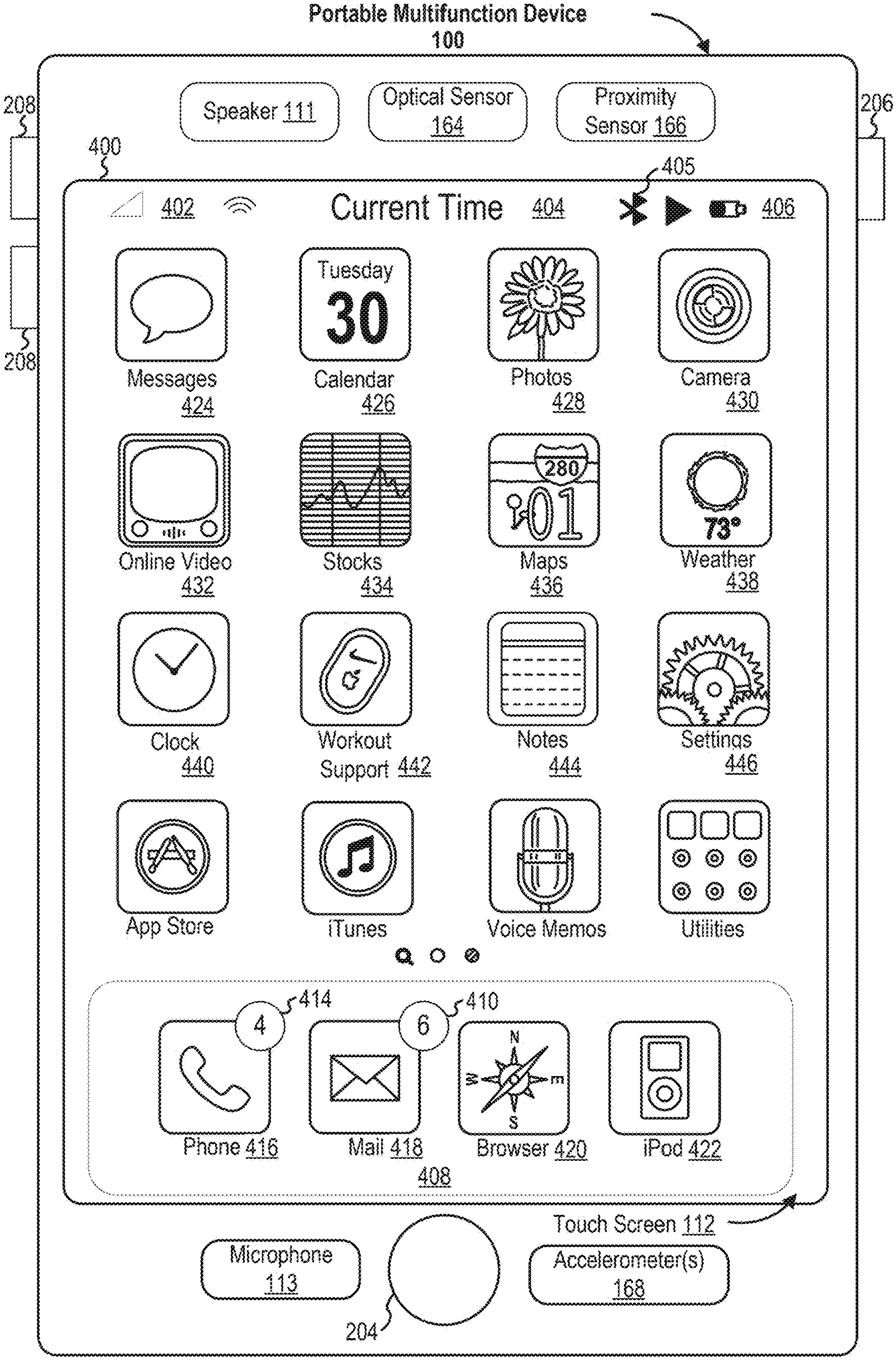
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
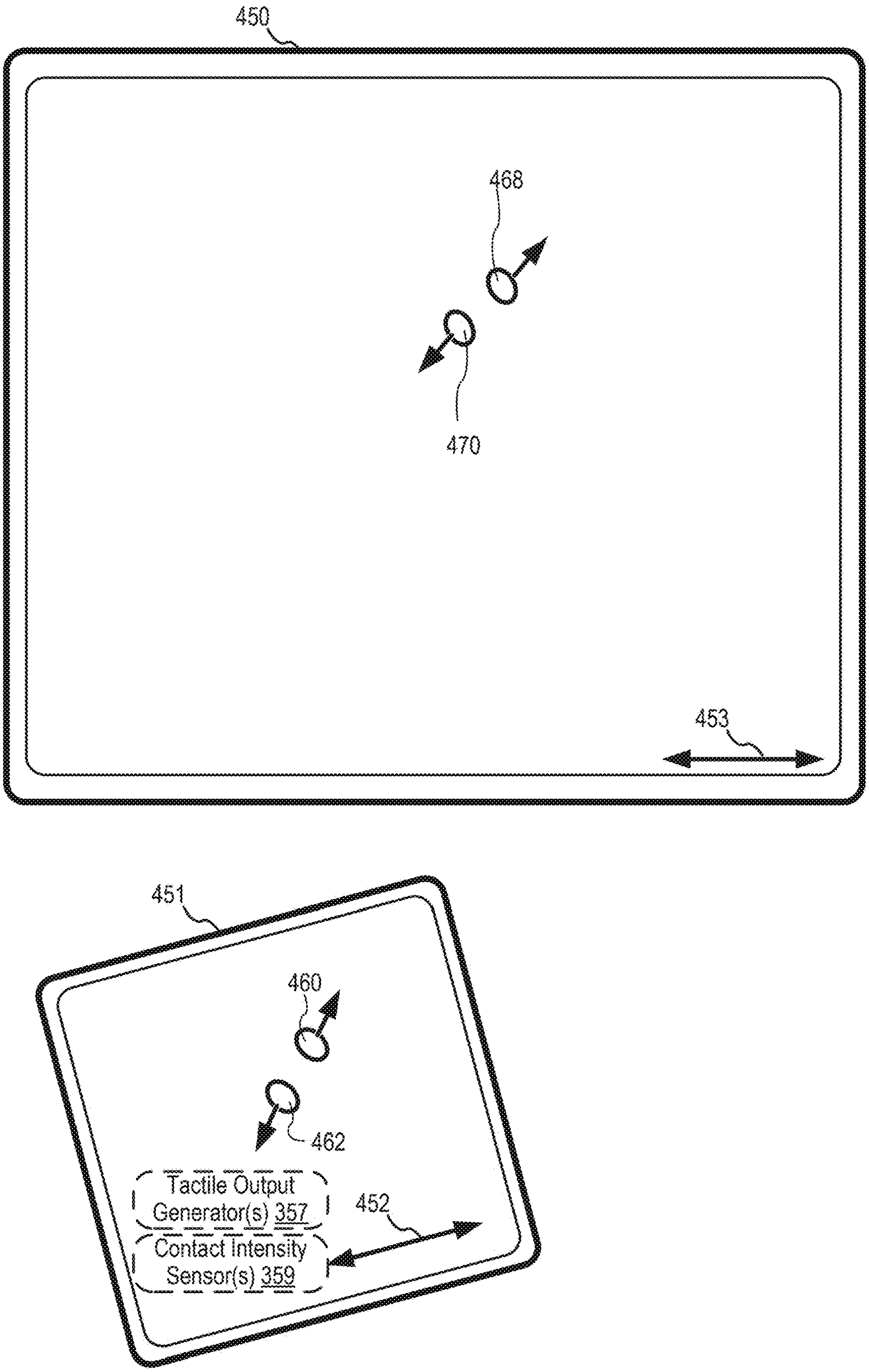
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3A) with a touch-sensitive surface 451 (e.g., a tablet or touchpad 355, FIG. 3A) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
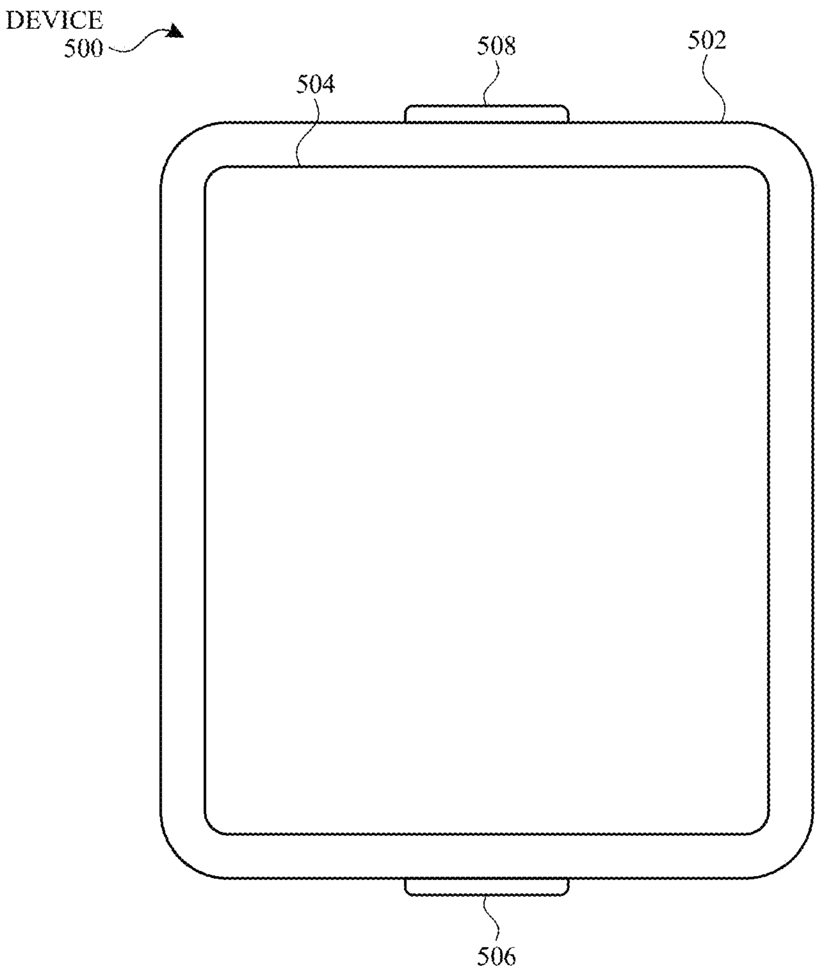
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen

504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
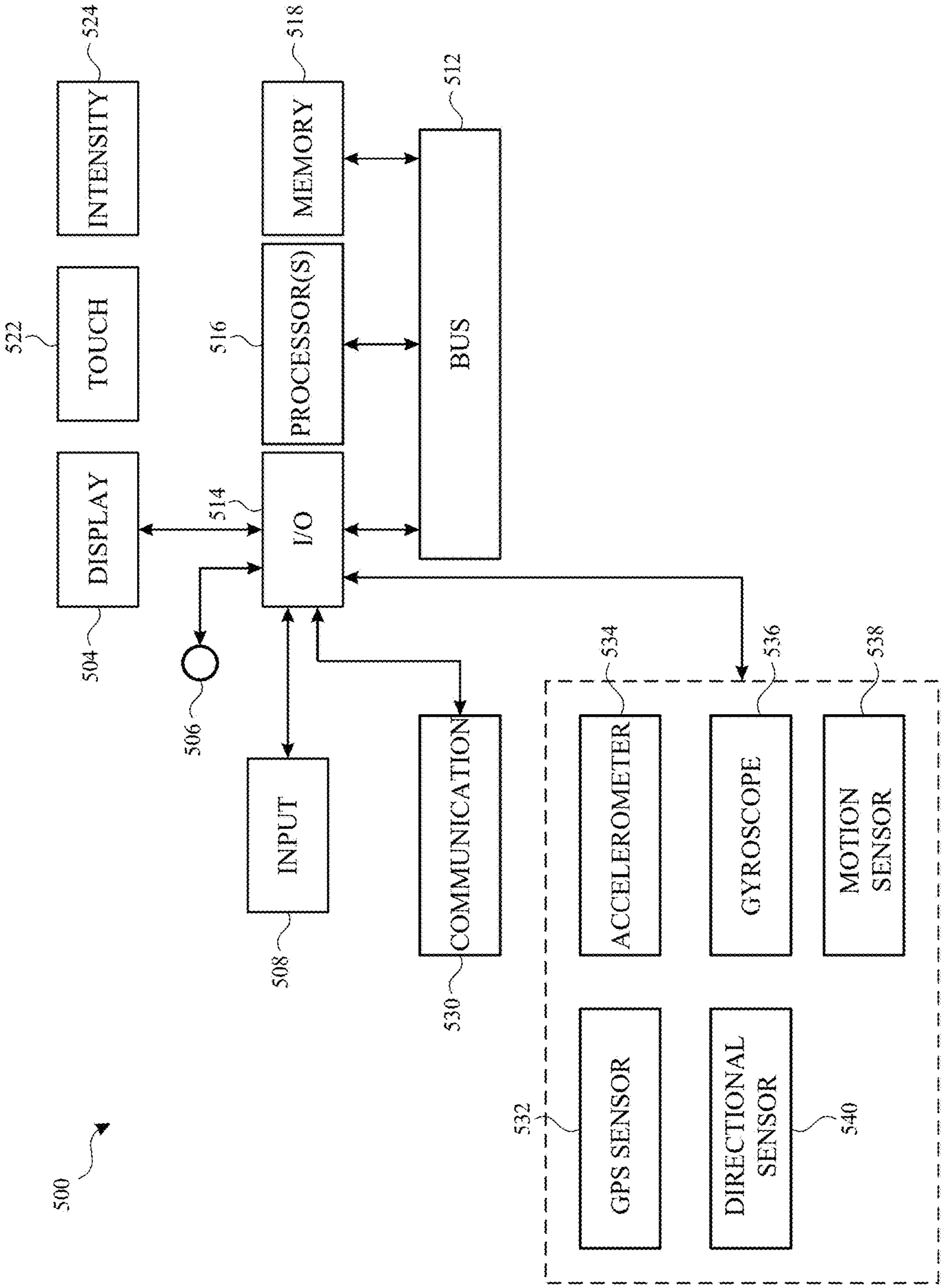
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3A. Device 500 has bus 512 that operatively couples I/O section 514 with one or more computer processors 516 and memory 518. I/O section 514 can be connected to display screen 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700-800 (FIGS. 7-8B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3A, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3A or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
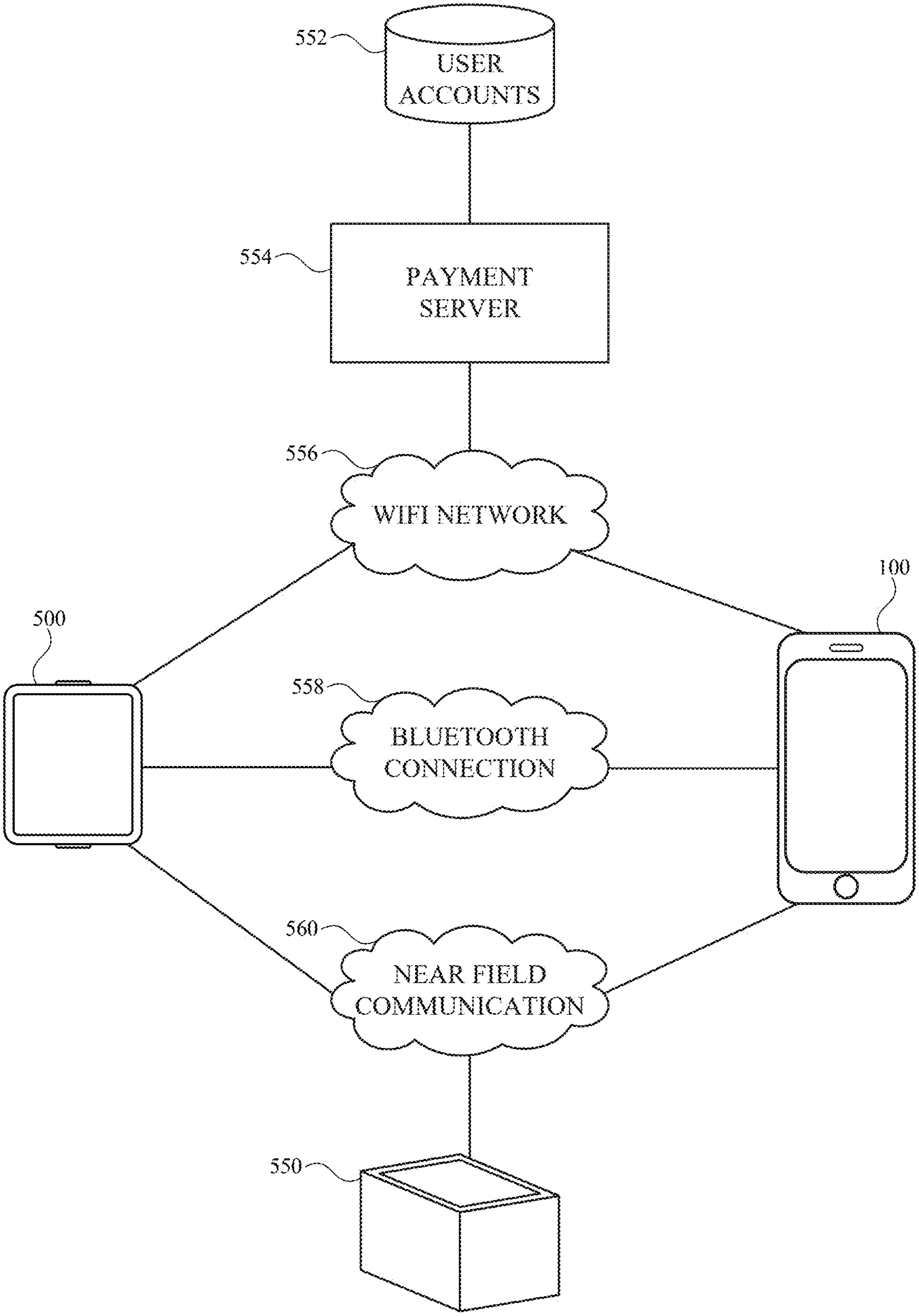
FIG. 5C illustrates exemplary devices connected via one or more communication channels, in accordance with some embodiments.

FIG. 5C illustrates exemplary devices connected via one or more communication channels to participate in a transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some embodiments, payment account information includes include an image, such as a picture of a payment card (e.g., taken by the device and/or received at the device). In some embodiments, the electronic devices receive user input including at least some payment account information (e.g., receiving user-entered credit, debit, account, or gift card number and expiration date). In some embodiments, the electronic devices detect at least some payment account information from an image (e.g., of a payment card captured by a camera sensor of the device). In some embodiments, the electronic devices receive at least some payment account information from another device (e.g., another user device or a server). In some embodiments, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device (e.g., on secure element 163). In some embodiments, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto a secure element (e.g., secure element 163).

In some embodiments, communication among electronic devices 100, 300, and 500 facilitates transactions (e.g., generally or specific transactions). For example, a first electronic device (e.g., 100) can serve as a provisioning or managing device, and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each other over any of a variety of networks. For example, the devices communicate using a Bluetooth connection 558 (e.g., which includes a traditional Bluetooth connection or a Bluetooth Low Energy connection) or using a WiFi network 556. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 550, which is optionally NFC-enabled. The communication optionally occurs using a variety of communication channels and/or technologies. In some embodiments, electronic device (e.g., 100, 300, 500) communicates with payment terminal 550 using an NFC channel 560. In some embodiments, payment terminal 550 communicates with an electronic device (e.g., 100, 300, 500) using a peer-to-peer NFC mode. Electronic device (e.g., 100, 300, 500) is optionally configured transmit a signal to payment terminal 550 that includes payment information for a payment account (e.g., a default account or an account selected for the particular transaction).

In some embodiments, proceeding with a transaction includes transmitting a signal that includes payment information for an account, such as a payment account. In some embodiments, proceeding with the transaction includes reconfiguring the electronic device (e.g., 100, 300, 500) to respond as a contactless payment card, such as an NFC-enabled contactless payment card, and then transmitting credentials of the account via NFC, such as to payment terminal 550. In some embodiments, subsequent to transmitting credentials of the account via NFC, the electronic device reconfigures to not respond as a contactless payment card (e.g., requiring authorization before again reconfigured to respond as a contactless payment card via NFC).

In some embodiments, generation of and/or transmission of the signal is controlled by a secure element (e.g., 163) in the electronic device (e.g., 100, 300, 500). The secure element (e.g., 163) optionally requires a particular user input prior to releasing payment information. For example, the secure element (e.g., 163) optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some embodiments, if a communication channel (e.g., an NFC communication channel) with another device (e.g., payment terminal 550) is established within a defined time period from detection of the input, the secure element (e.g., 163) releases payment information to be transmitted to the other device (e.g., payment terminal 550). In some embodiments, the secure element (e.g., 163) is a hardware component that controls release of secure information. In some embodiments, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some embodiments, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 550 optionally uses the payment information to generate a signal to transmit to a payment server 554 to determine whether the payment is authorized. Payment server 554 optionally includes any device or system configured to receive payment information associated with a payment account and to determine whether a proposed purchase is authorized. In some embodiments, payment server 554 includes a server of an issuing bank. Payment terminal 550 communicates with payment server 554 directly or indirectly via one or more other devices or systems (e.g., a server of an acquiring bank and/or a server of a card network).

Payment server 554 optionally uses at least some of the payment information to identify a user account from among a database of user accounts (e.g., 552). For example, each user account includes payment information. An account is, optionally, located by locating an account with particular payment information matching that from the POS communication. In some embodiments, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some embodiments, the payment server (e.g., 554) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 554 responds to POS payment terminal 550 with an indication as to whether a proposed purchase is authorized or denied. In some embodiments, POS payment terminal 550 transmits a signal to the electronic device (e.g., 100, 300, 500) to identify the result. For example, POS payment terminal 550 sends a receipt to the electronic device (e.g., 100, 300, 500) when a purchase is authorized (e.g., via a transaction-coordination server that manages a transaction app on the user device). In some instances, POS payment terminal 550 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of POS payment terminal 550. For example, upon detecting that a mechanical input has been received, a secure element (e.g., 163) in the electronic device (e.g., 100, 300, 500) releases payment information to allow an application on the electronic device to access the information (e.g., and to transmit the information to a server associated with the application).

In some embodiments, the computer system is in a locked state or an unlocked state. In the locked state, the computer system is powered on and operational but is prevented from performing a predefined set of operations in response to user input. The predefined set of operations optionally includes navigation between user interfaces, activation or deactivation of a predefined set of functions, and activation or deactivation of certain applications. The locked state can be used to prevent unintentional or unauthorized use of some functionality of the computer system or activation or deactivation of some functions on the computer system. In some embodiments, in the unlocked state, the computer system is powered on and operational and is not prevented from performing at least a portion of the predefined set of operations that cannot be performed while in the locked state. When the computer system is in the locked state, the computer system is said to be locked. When the computer system is in the unlocked state, the computer is said to be unlocked. In some embodiments, the computer system in the locked state optionally responds to a limited set of user inputs, including input that corresponds to an attempt to transition the computer system to the unlocked state or input that corresponds to powering the computer system off.

Attention is now directed towards embodiments of user interfaces ("UI") and associated processes that are implemented on an electronic device, such as portable multifunction device 100, device 300, or device 500.

FIGS. 6A-6Y illustrate exemplary user interfaces for managing car key credentials, in accordance with some embodiments. The user interfaces in these figures are used to illustrate the processes described below, including the processes in FIGS. 7, 8A, and 8B.

FIG. 6A illustrates two computer system, computer system 600 and second computer system 630. In some embodiments, computer system 600 and/or second computer system 630 include some or all of the features described with respective to devices 100, 300, and/or 500. Computer system 600 is a newly purchased and/or newly reset device and is displaying, via display 602, welcome user interface 610 of a device setup process. Welcome user interface 610 includes next option 610A. Because computer system 600 is not configured for a particular user, computer system 600 is not currently provisioned with any car keys (e.g., a secure element of computer system 600 is not storing credentials configured to provide access to a vehicle). Second computer system 630 is a previously configured device that is optionally logged into a service (e.g., an online service and/or a cloud service) using a first account. Second computer system 630 is displaying, via display 632, lock screen user interface 640. Second computer system 630 was previously provisioned with a car key for a first vehicle (e.g., a secure element of second computer system 630 is storing credentials of a car key for the first vehicle (e.g., the credentials are configured to provide access to the first vehicle)). At FIG. 6A, computer system 600 receives input 650A (e.g., a tap input, a touch input, and/or an air gesture) directed to next option 610A to proceed with the device setup. In some embodiments, computer system 600 and second computer system 630 communicate directly during the device setup process. In some embodiments, computer system 600 does not communicate with the first vehicle during the device setup process. For example, because computer system 600 communicates with second computer system 630, which is provisioned with a key for the first vehicle, computer system 600 is provisioned with a key for the first vehicle during the decide setup process without computer system 600 communicating with the first vehicle.

Figure 6B:
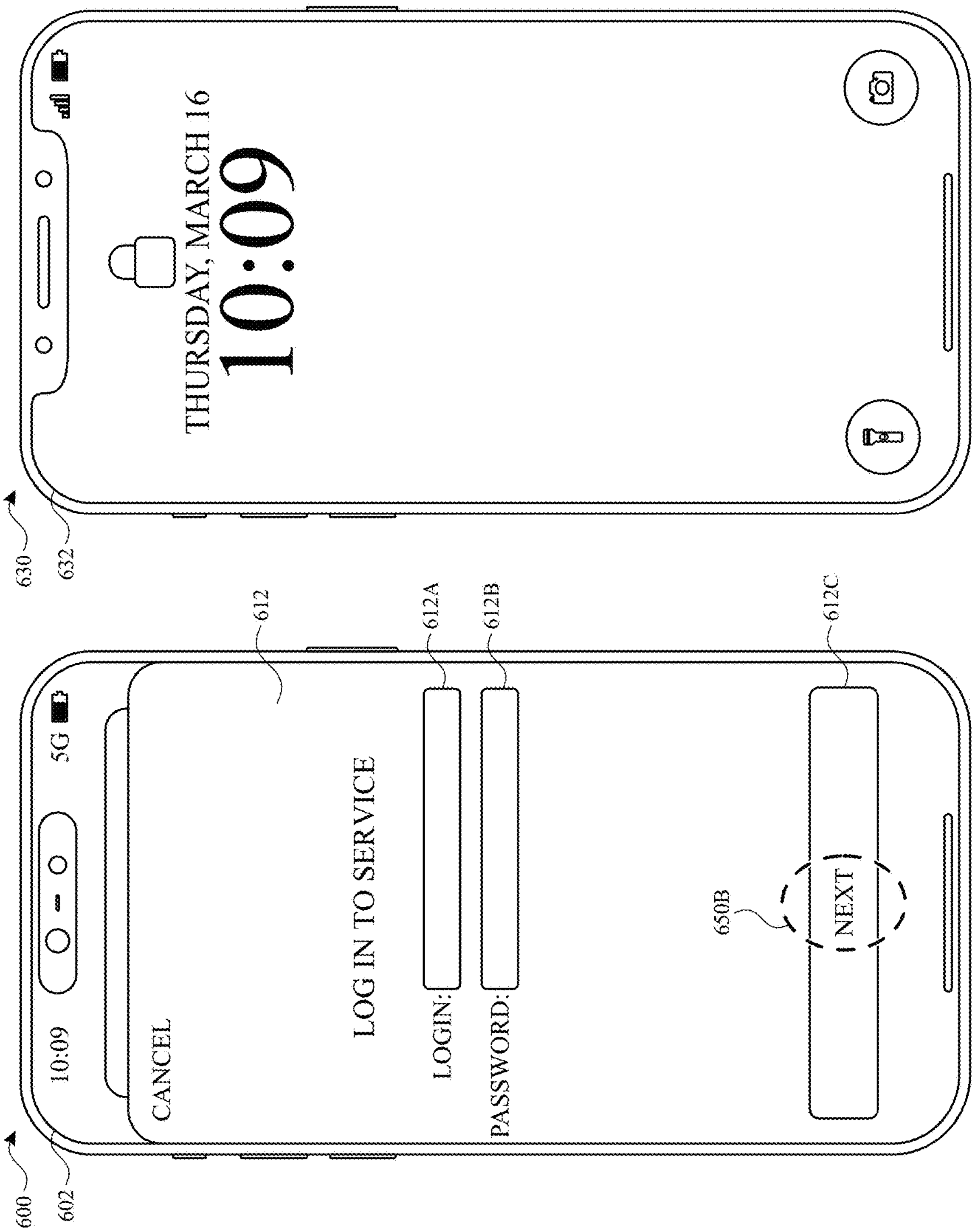

At FIG. 6B, in response to receiving input 650A directed to next option 610A, computer system 600 proceeds with the device setup process. For example, computer system 600 displays login user interface 612 for logging into the service (e.g., the same service that second computer system 630 is logged into). At FIG. 6B, computer system 600 receives user inputs for logging into the service, such as receiving (e.g., via touch inputs and/or voice inputs) a username that is entered into username field 612A and/or a password that is entered into password field 612B. Subsequent the username and/or password being entered, computer system 600 receives input 650B (e.g., a tap input, a touch input, and/or an air gesture) directed to next option 612C.

Figure 6C:
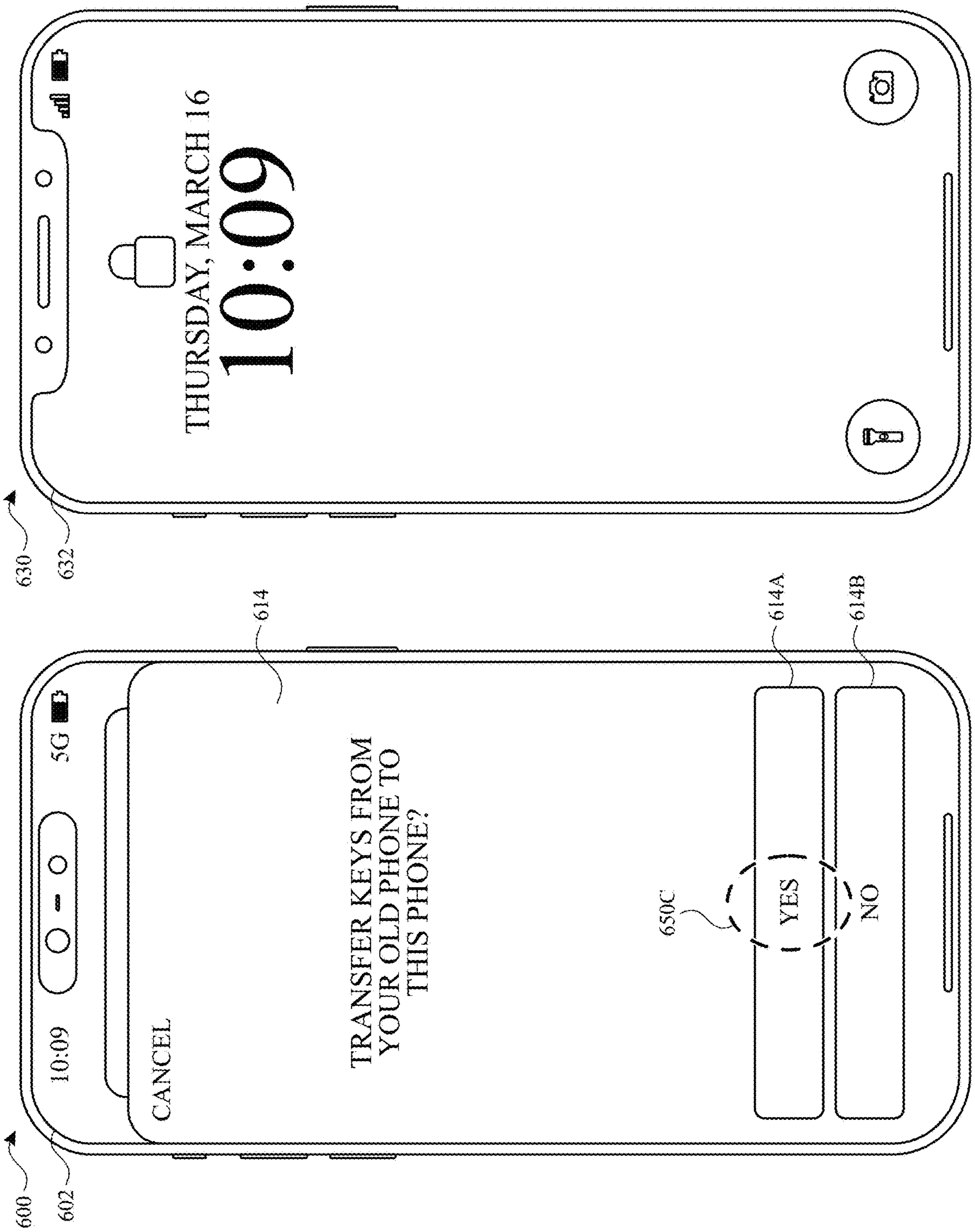

At FIG. 6B, in response to receiving input 650B directed to next option 612C, computer system 600 proceeds with the device setup process, such as by logging into an account (e.g., the same account second computer system 630 is logged into at the service) at the service using the username and/or password. In some embodiments, as shown in FIG. 6C, in response to receiving input 650B directed to next option 612C and/or in response to successfully logging into the account at the service, computer system 600 proceeds with the setup process and displays key transfer user interface 614. In some embodiments, computer system 600 does not log into the service and proceeds to display key transfer user interface 614. Key transfer user interface 614 includes first option 614A to transfer credential information (e.g., information used to provision credentials) of a car key from another device (e.g., second computer system 630) to computer system 600 and second option 614B to proceed with the setup process without transferring credential information of a car key from another device to computer system 600. At FIG. 6C, computer system 600 receives input 650C (e.g., a tap input, a touch input, and/or an air gesture) directed to first option 614A.

Figure 6D:
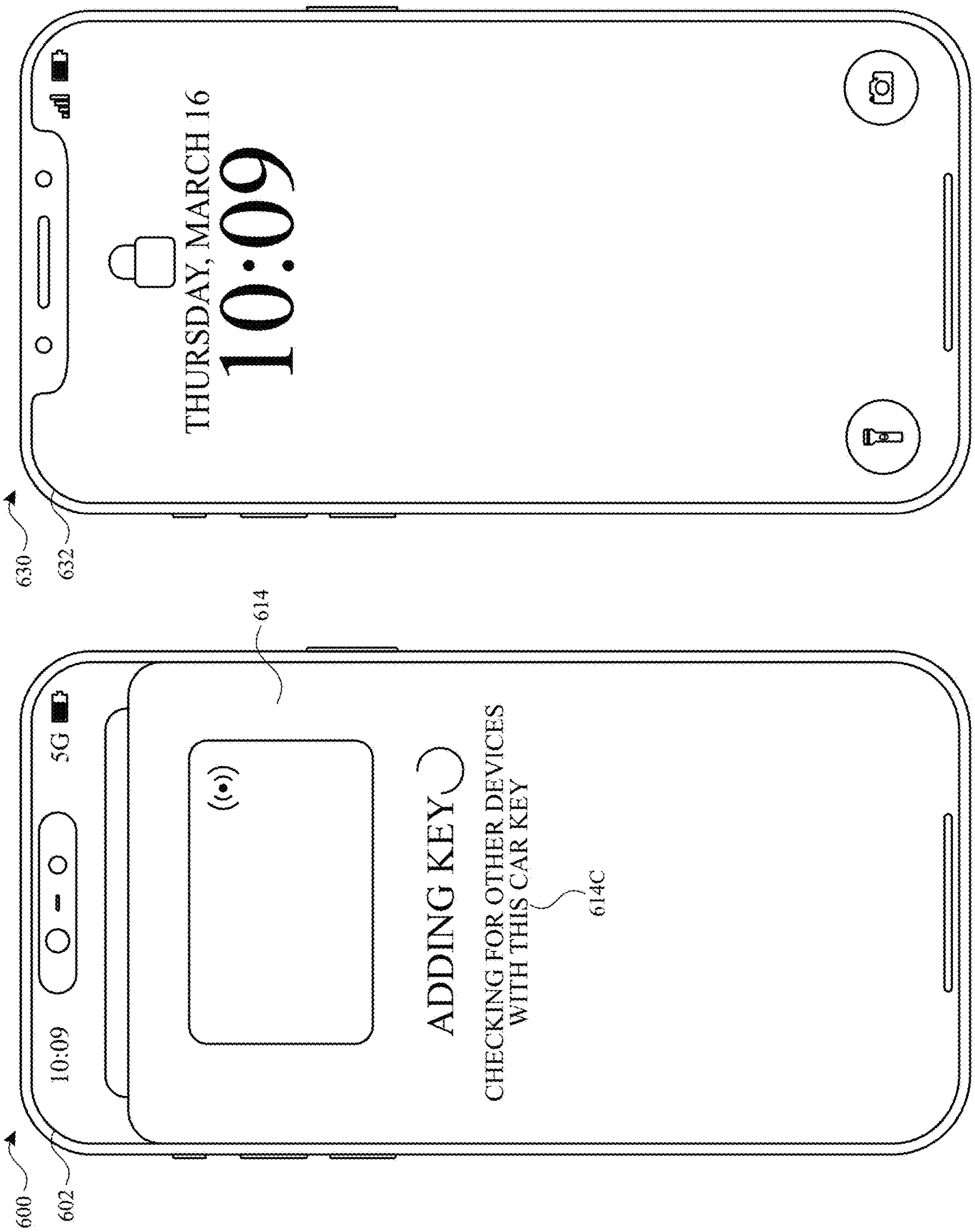

At FIG. 6D, in response to receiving input 650C directed to first option 614A, computer system 600 proceeds with a process to transfer credential information of a car key from another device to computer system 600. At FIG. 6D, computer system 600 displays indication 614C that computer system 600 and/or the service is checking whether other devices (e.g., second computer system 630) (e.g., that are logged into the service with the same account and/or are within communication range (e.g., Bluetooth communication range, BLE communication range, NFC communication range, and/or WiFi communication range) are provisioned with credentials for one or more car keys.

Figure 6E:
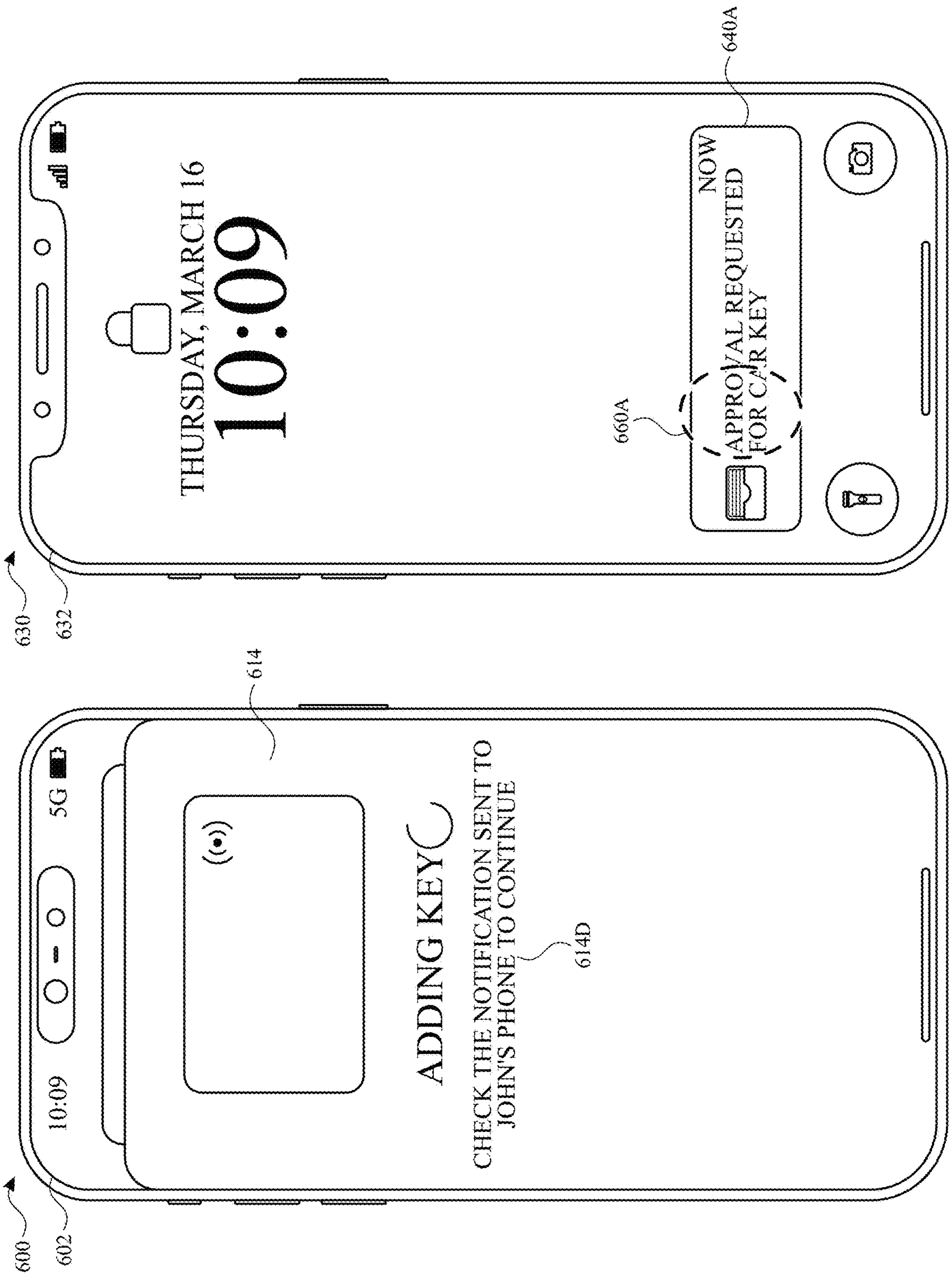

At FIG. 6E, in accordance with a determination (e.g., as determined by computer system 600 and/or the service) that second computer system 630 is provisioned with credentials of a car key for the first vehicle and/or in response to a user input (e.g., a touch input, an air gesture, and/or a voice input) received at computer system 600 requesting to transfer credential information of the car key for the first vehicle from second computer system 630, computer system 600 displays indication 614D that a request for authorization has been sent to second computer system 630. In some embodiments, indication 614D identifies second computer system 630 by a name previously assigned to second computer system 630 (e.g., "John's Phone"). In some embodiments, indication 614D identifies second computer system 630 by a make and/or model of the device. Accordingly, indication 614D optionally provides the user with feedback about which device the request was sent to and, therefore, which device the user should check to proceed with the transfer. As shown in FIG. 6E, second computer system 630 receives an alert requesting approval to transfer credential information of the first vehicle and, in response, displays notification 640A on lock screen 640. In some embodiments, notification 640A identifies (e.g., via a previously configured name) the vehicle (e.g., "Vehicle 1") for which transfer of credentials are requested. In some embodiments, notification 640A identifies (e.g., via a name previously assigned to computer system 600 and/or via a make and/or model of computer system 600) the device that is requesting the credential information (e.g., computer system 600). At FIG. 6E, second computer system 630 receives input 660A (e.g., a tap input, a touch input, and/or an air gesture) directed to notification 640A.

Figure 6F:
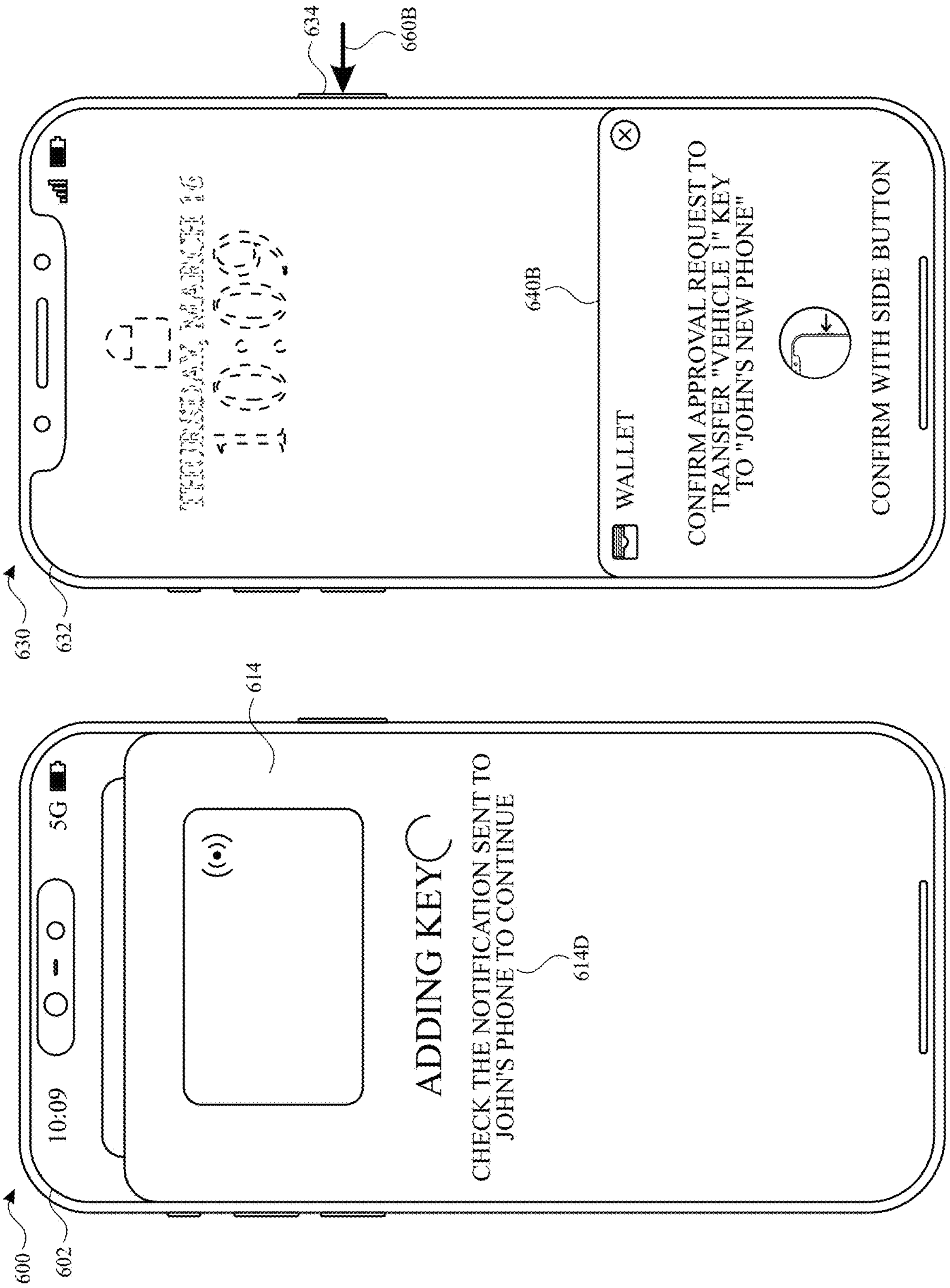

At FIG. 6F, in response to receiving input 660A, second computer system 630 prompts (e.g., via user interface 640B) the user to authorize transfer of credential information of the car key for the first vehicle from second computer system 630 to computer system 600 to enable provisioning of computer system 600 with credentials of the car key of the first vehicle. In some embodiments, authorization requires second computer system 630 to authenticate the user via password, passcode, and/or biometric authentication (e.g., facial authentication, fingerprint authentication, and/or iris authentication). At FIG. 6F, second computer system 630 receives input 660B (e.g., touch input, press, double-press, and/or swipe) at hardware button 634 as part of the authorization process.

Figure 6G:
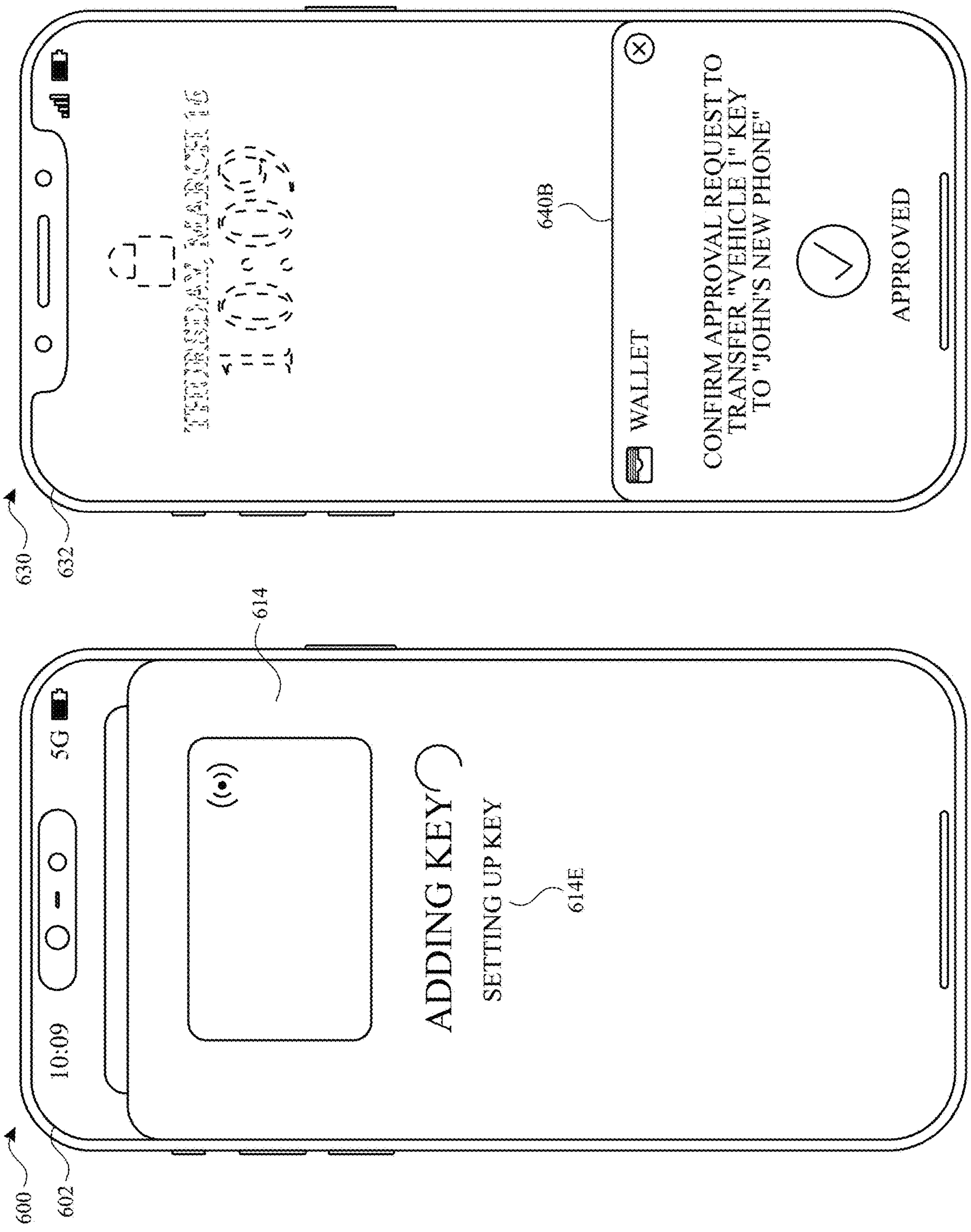

At FIG. 6G, in response to receiving input 660B, second computer system 630 performs user authentication as part of the authorization process and, once authenticated (e.g., password and/or biometric matches a registered password and/or biometric), proceeds to transfer credential information to computer system 600 (e.g., directly and/or via a third-party, such as via the service). Second computer system 630 also updates user interface 640B to indicate that the request was authorized and/or that the credential information of the car key for the first vehicle is bring transferred to computer system 600, as shown in FIG. 6H.

Figure 6H:
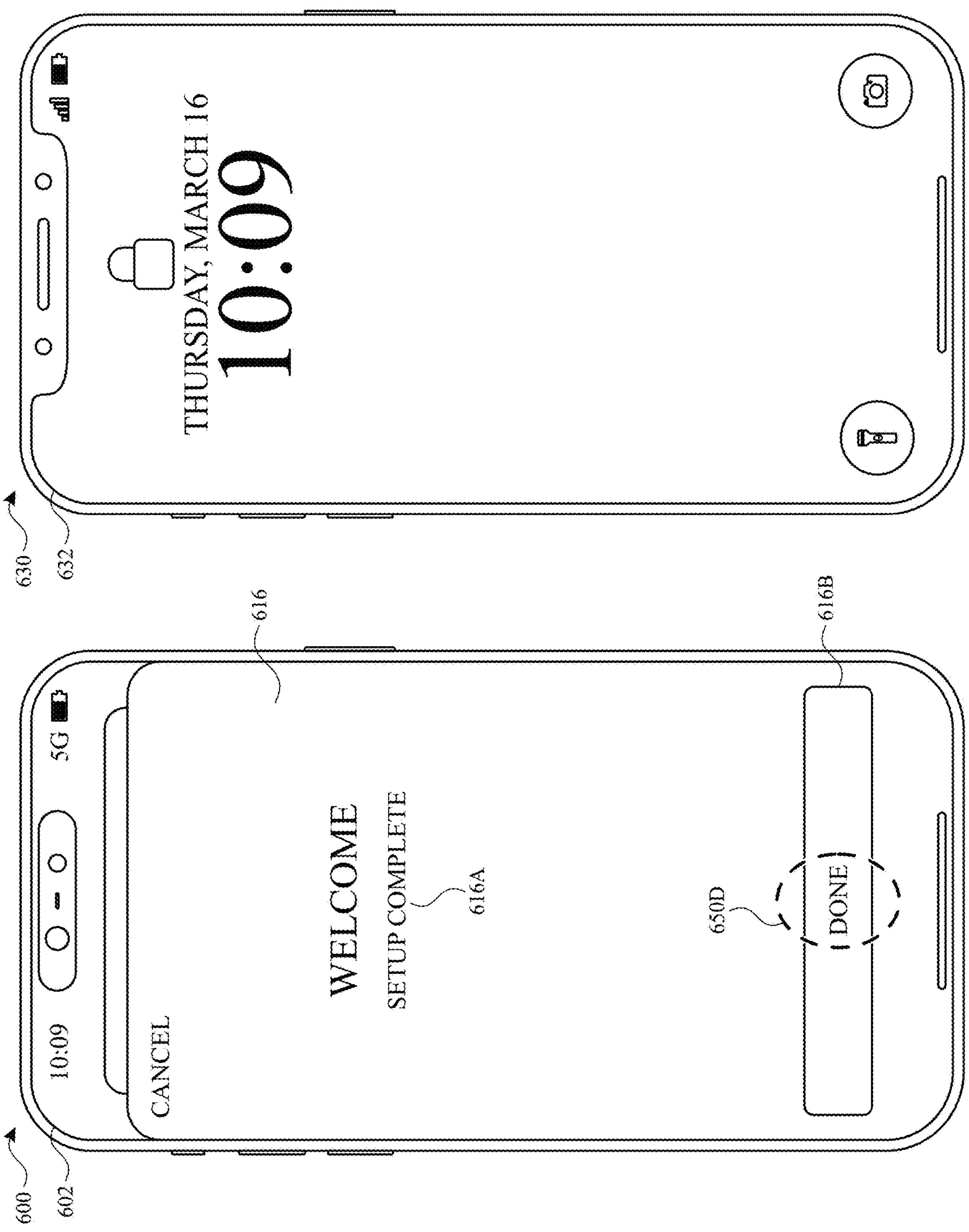
Figure 6J:
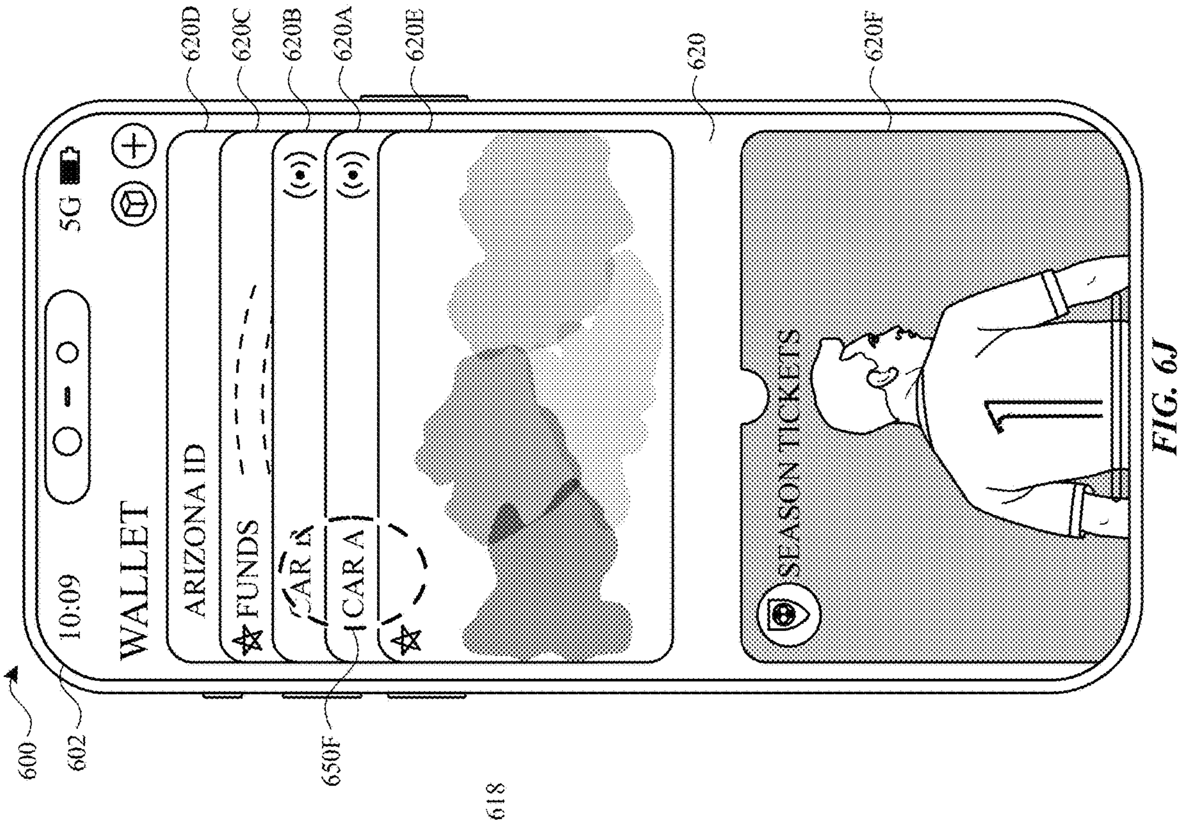

At FIG. 6H, in response to receiving the credential information of the car key for the first vehicle, computer system 600 proceeds to use the credential information to provision computer system 600 with the car key for the first vehicle (e.g., generates and/or stores (e.g., in a secure element of computer system 600 and/or in an electronic wallet of computer system 600) credentials configured to provide access to the first vehicle), as indicated by computer system 600 displaying indication 614E as part of key transfer user interface 614. In some embodiments, once computer system 600 has been provisioned with the car key for the first vehicle (and, optionally, other steps of the device setup have been completed), computer system 600 displays indication 616A, as part of completion user interface 616, indicating that setup is complete, as shown in FIG. 6H. Completion user interface 616 includes done option 616B. In some embodiments, second computer system 630 is no longer provisioned with a car key for the first vehicle as a result of computer system 600 being provisioned with a car key for the first vehicle (e.g., the credentials for the car key are moved from second computer system 630 to computer system 600). In some embodiments, second computer system 630 is no longer provisioned with a car key for the first vehicle as a result of second computer system 630 transmitting the credential information about the car key for the first vehicle to computer system 600 (e.g., the credentials for the car key are moved from second computer system 630 to computer system 600). In some embodiments, computer system 600 and second computer system 630 are both concurrently provisioned with respective car keys for the first vehicle, enabling both computer systems to provide the user with access to the first vehicle. At FIG. 6H, computer system 600 receives input 650D (e.g., a tap input, a touch input, and/or an air gesture) directed to done option 616B.

Figure 6I:
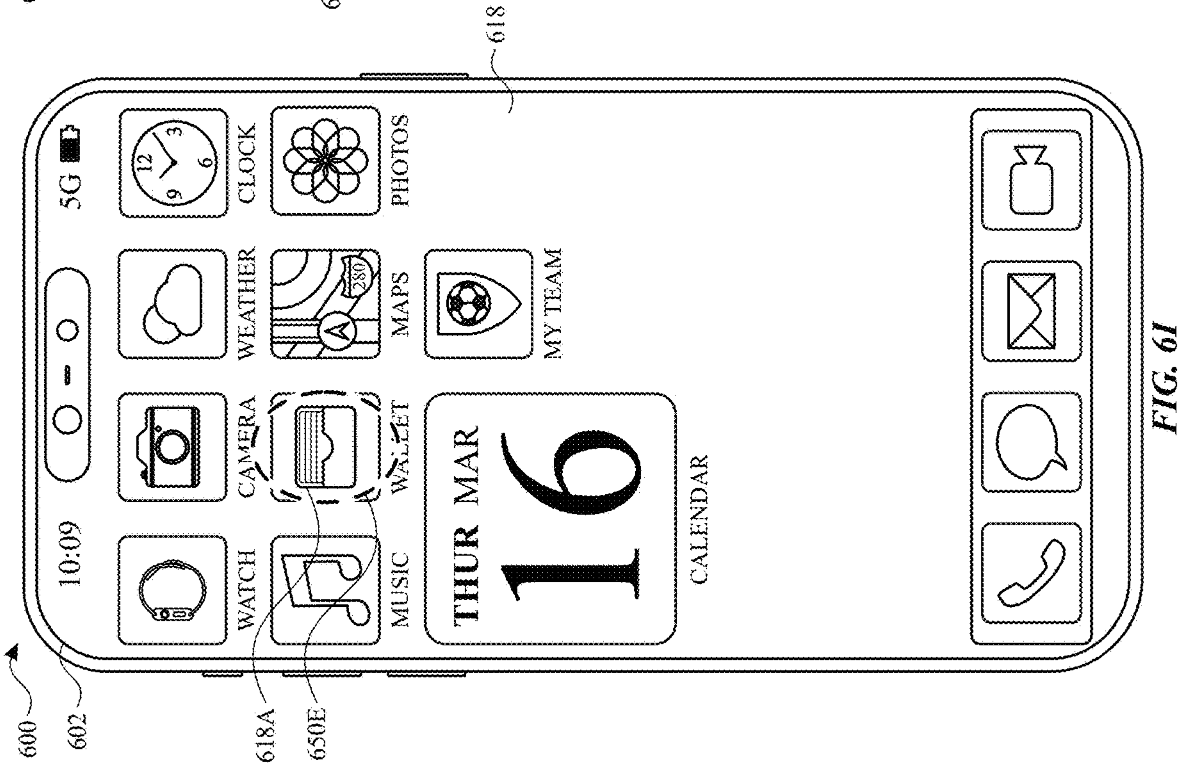
Figure 6L:
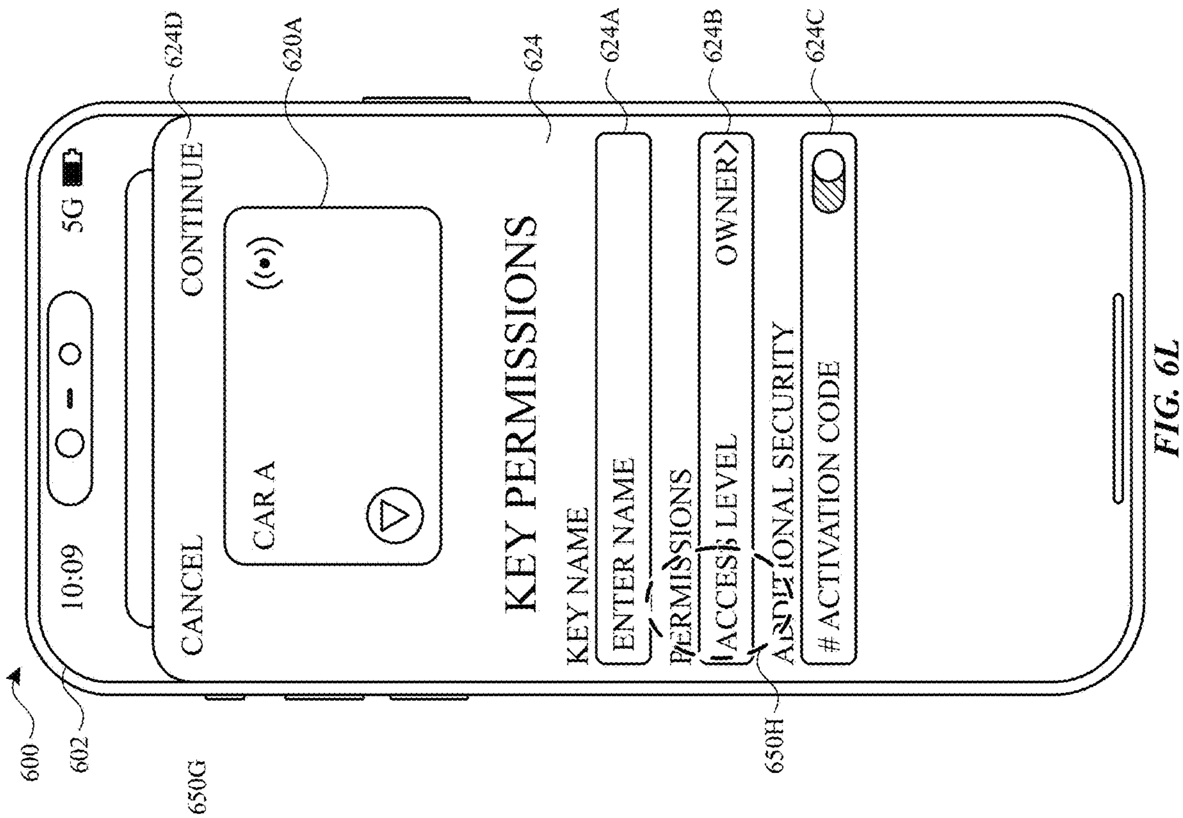

At FIG. 6I, computer system 600 has completed the setup process and is displaying home screen 618. In some embodiments, home screen 618 is displayed in response to computer system 600 receiving input 650D. Home screen 618 includes a plurality of icon objects. In response to receiving activation of (e.g., an input directed to) a respective icon object, computer system 600 displays a user interface of a respective application corresponding to the respective icon object. At FIG. 6I, computer system 600 receives input 650E (e.g., a tap input, a touch input, and/or an air gesture) directed to wallet icon object 618A.

At FIG. 6J, in response to receiving input 650E, computer system 600 displays wallet user interface 620. Wallet user interface 620 includes representations of one or more accounts provisioned onto computer system 600. As shown in FIG. 6J, the one or more accounts include car keys, an identification card, one or more bank cards, one or more loyalty cards, and/or one or more digital passes for live events. For example, wallet user interface 620 includes indication 620A of a car key that is provisioned onto computer system 600. In some embodiments, credentials of the car key are stored in a secure element of computer system 600 and provide access to a plurality of features of the first vehicle. For example, the credentials of the car key corresponding to indication 620A enable computer system 600 to unlock the first vehicle, start the first vehicle, monitor settings of the first vehicle, and/or open windows of the first vehicle. As shown in FIG. 6J, wallet user interface 620 also includes indication 620B of a second car key that is provisioned onto computer system 600, indications 620C and/or 620E of one or more banking and/or payment cards that are provisioned onto computer system 600, indication 620D of an identification card that is provisioned onto computer system 600, and indication 620F of a digital pass for a live event. At FIG. 6J, computer system 600 receives input 650F (e.g., a tap input, a touch input, and/or an air gesture) directed to indication 620A of the car key.

Figure 6K:
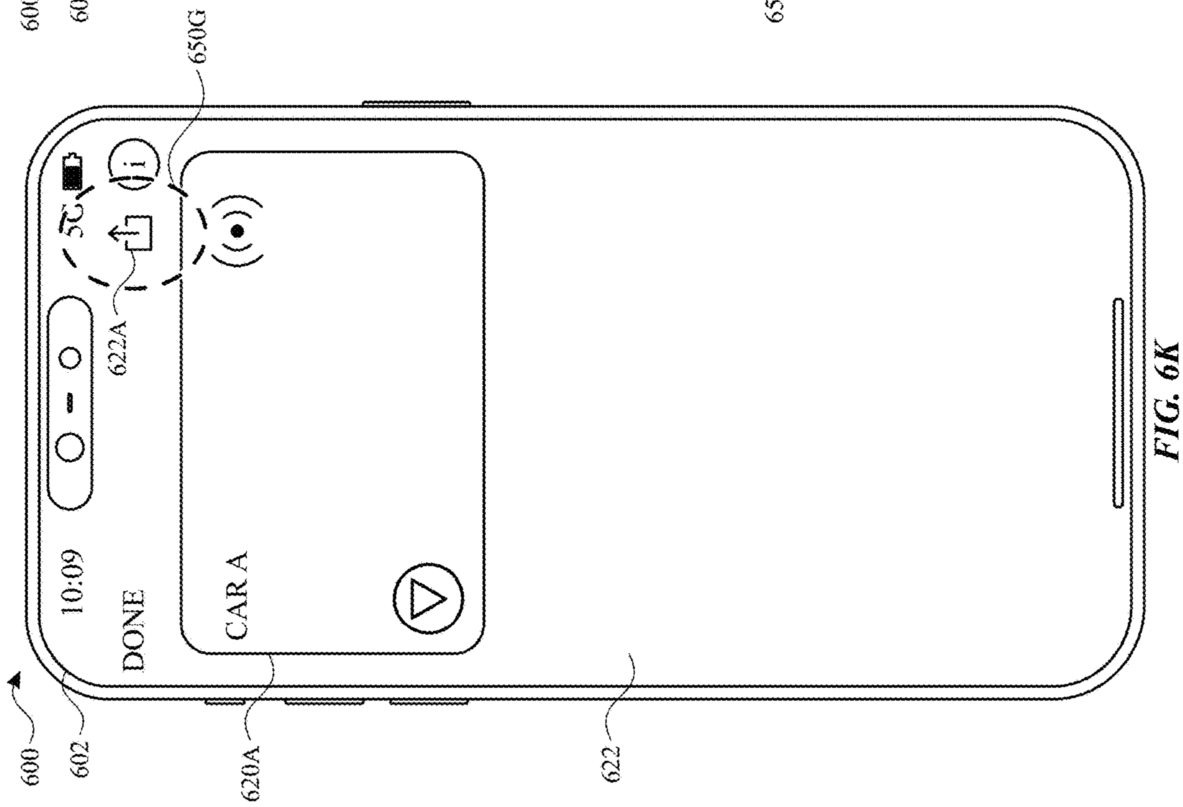
Figure 6N:
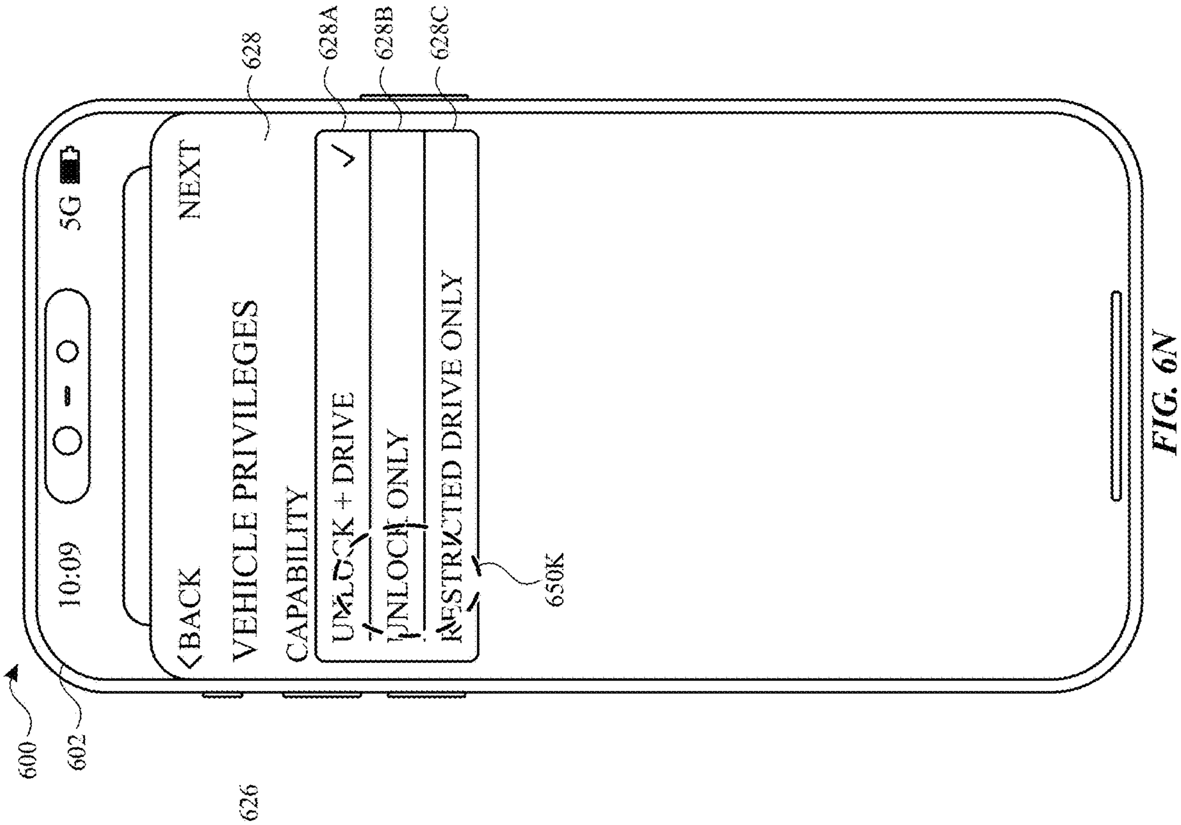

At FIG. 6K, in response to receiving input 650E, computer system 600 displays indication 620A of the car key (e.g., without displaying indications of other accounts provisioned onto computer system 600) along with share option 622A as part of car key user interface 622. In some embodiments, car key user interface 622 provides additional information about the car key (e.g., previous usage of the car key, types of vehicle access that are enabled, other users with which the car key is shared, and/or information about the first vehicle for which the car key is configured to provide access). At FIG. 6K, computer system 600 receives input 650G (e.g., a tap input, a touch input, and/or an air gesture) directed to share option 622A.

At FIG. 6L, in response to receiving input 650G, computer system 600 initiates a process to share the car key of the first vehicle with another device and/or user, including displaying share user interface 624. Sharing user interface 624 includes name field 624A for receiving user input of a name of the shared key, permissions field 624B for receiving user input selecting an access level that should be provided to the first vehicle, and activation code option 624C for toggling an activation code option that requires the recipient of the shared key to enter an activation code for additional security. At FIG. 6L, computer system 600 receives input 650H (e.g., a tap input, a touch input, and/or an air gesture) directed to permissions field 624B.

Figure 6M:
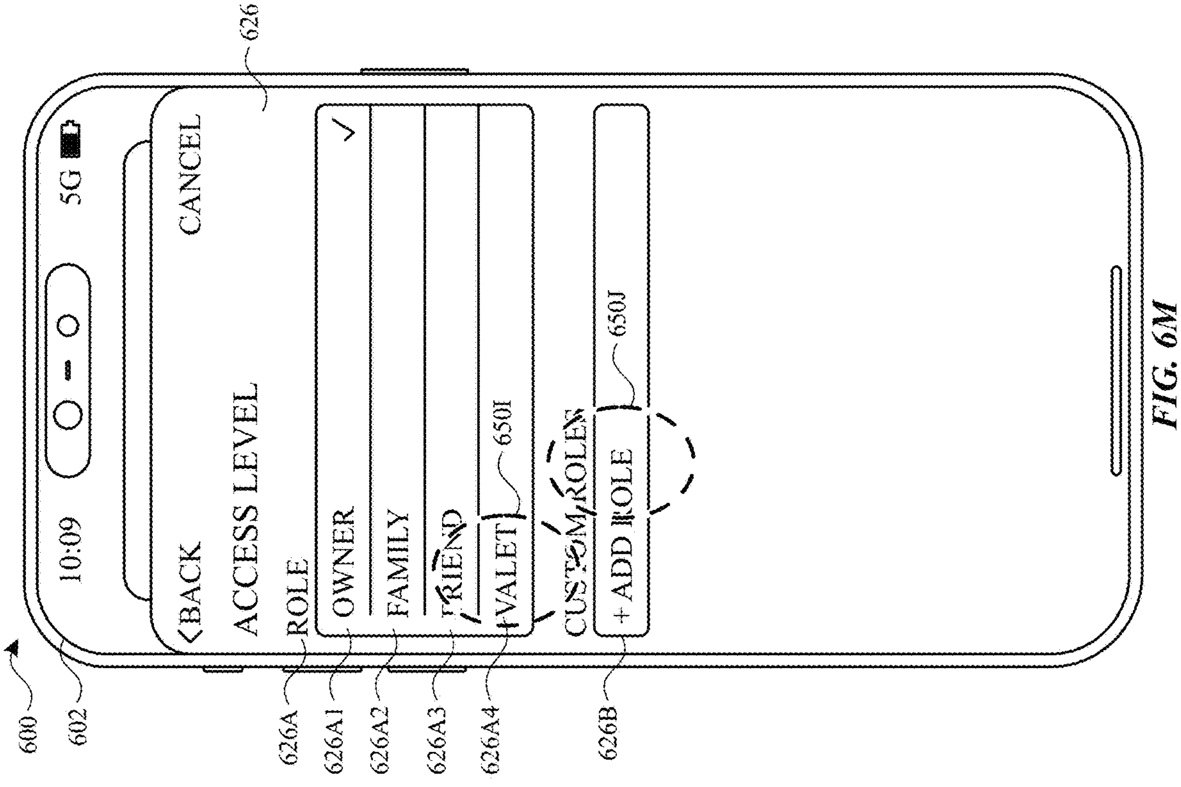

At FIG. 6M, in response to receiving input 650H, computer system 600 displays access user interface 626. Access user interface 626 enables computer system 600 to receive user inputs to specify the level of access the shared key should provide to the device and/or user with which the car key is shared. Access user interface 626 includes a plurality defined roles 626A, including owner role option 626A1, family role option 626A2, friend role option 626A3, and valet role option 626A4. In some embodiments, each of the defined roles includes different levels of access. For example, friend role option 626A3 provides more access to the vehicle than valet role option 626A4. For example, friend role option 626A3 enables both unlocking the vehicle and driving the vehicle, without any driving restrictions, whereas valet role option 626A4 enables unlocking the vehicle and driving the vehicle, with some restrictions (e.g., cannot exceed a threshold speed). In some embodiments, computer system 600 receives input 650I (e.g., a tap input, a touch input, and/or an air gesture) directed to valet role option 626A4 and, in response, proceeds with the process to share the car key of the first vehicle with another device and/or user using the value role. In some embodiments (e.g., alternatively to receiving input 650I), computer system 600 receives input 650J (e.g., a tap input, a touch input, and/or an air gesture) directed to add custom role option 626B, which enables computer system 600 to receive user inputs to define a new role.

Figure 6O:
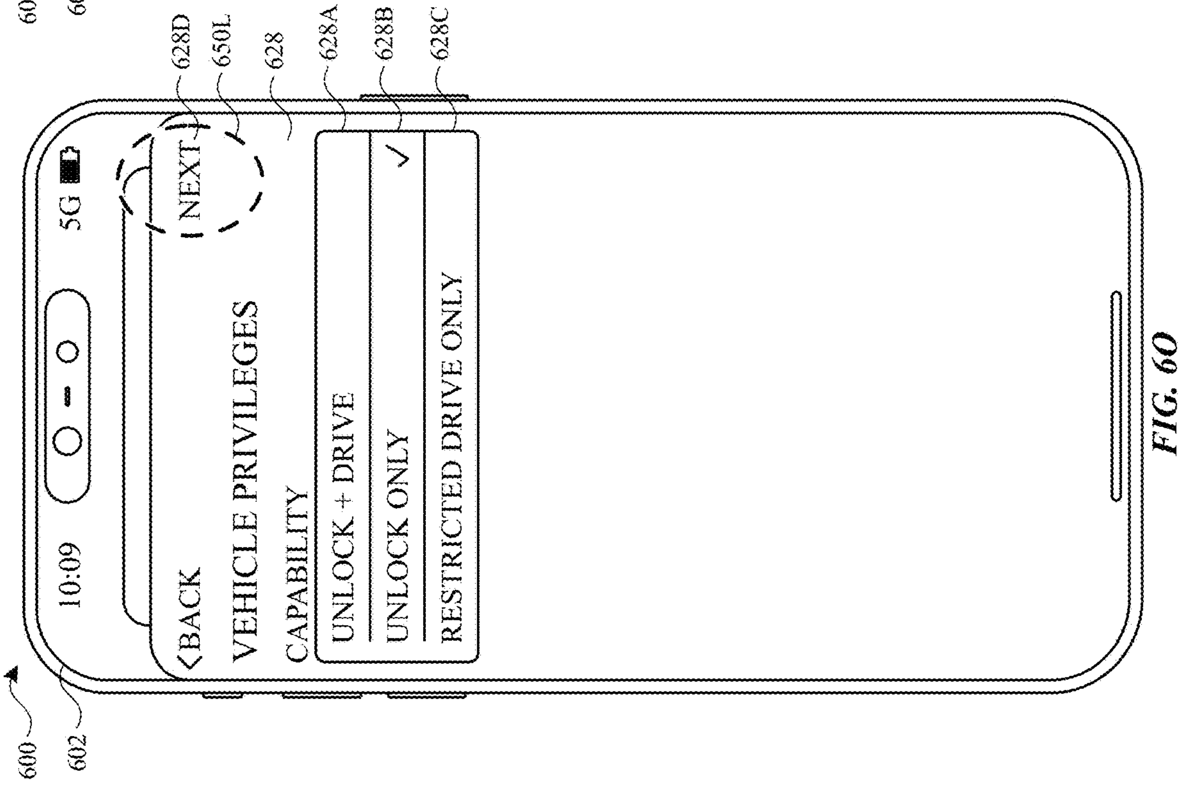

At FIG. 6N, in response to receiving input 650J, computer system 600 displays privileges user interface 628 for selecting which privileges the new role will have. Privileges user interface 628 includes unlock and drive option 628A (e.g., currently selected as indicated by the checkmark), unlock only option 628B, and restrictive drive only option 628C. At FIGS. 6N and 6O, computer system 600 receives input 650K directed to unlock only option 628B (e.g., indicated in FIG. 6O as selected by the checkmark) followed by input 650L directed to next option 628D to proceed with the process to define the new role.

Figure 6P:
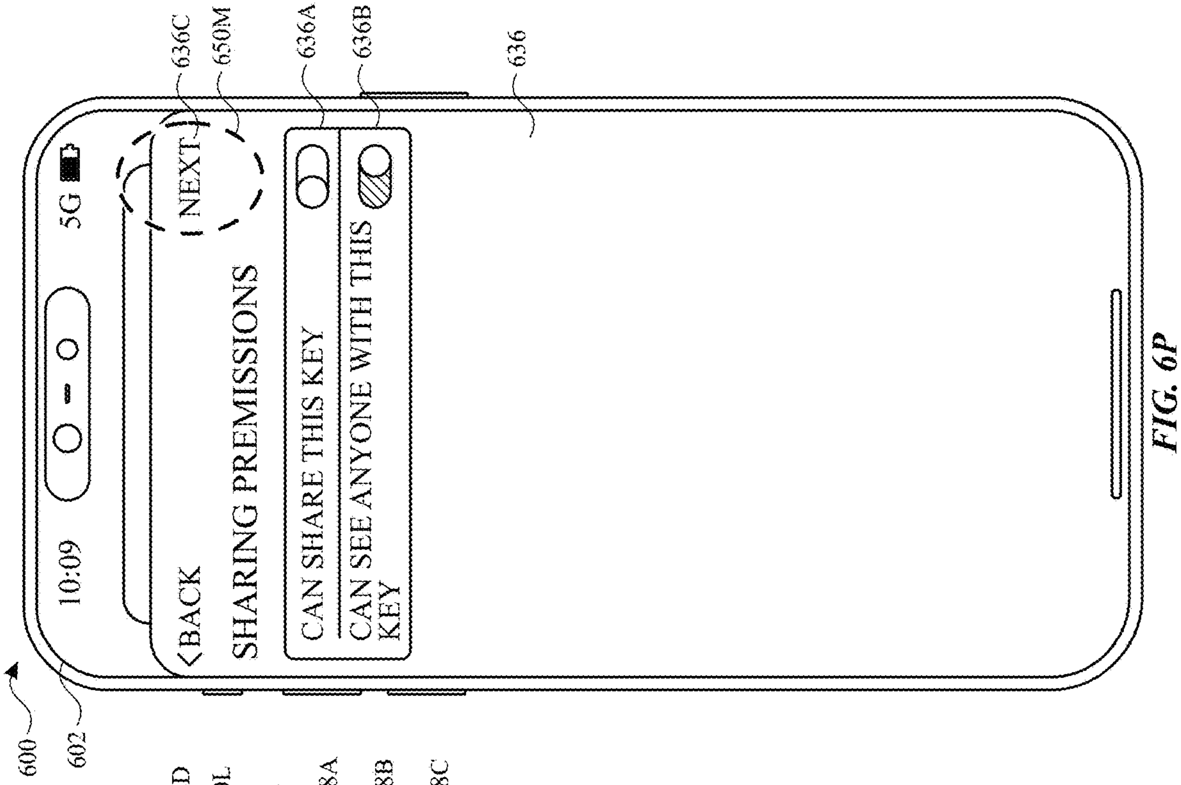

At FIG. 6P, in response to receiving input 650L, computer system 600 displays sharing permissions user interface 636 for selecting which sharing abilities the device and/or user with which the car key is shared will have. At FIG. 6P, sharing permissions user interface 636 includes first toggle 636A for enabling/disabling an ability of the recipient of the shared key to share the shared key with others and second toggle 636B for enabling/disabling an ability of the recipient of the shared key to access (e.g., view) information about other devices and/or users with which the car key has been shared (e.g., to enable the recipient to see who else has access to the first vehicle). Thus, the user interfaces in FIGS. 6N-6Q enable computer system 600 to define a new role and to save that role (e.g., at computer system 600, such as for use when sharing the same key with a different person and/or a different key with the same person). At FIG. 6P, computer system 600 receives input 650M (e.g., a tap input, a touch input, and/or an air gesture) directed to next option 636C.

Figure 6Q:
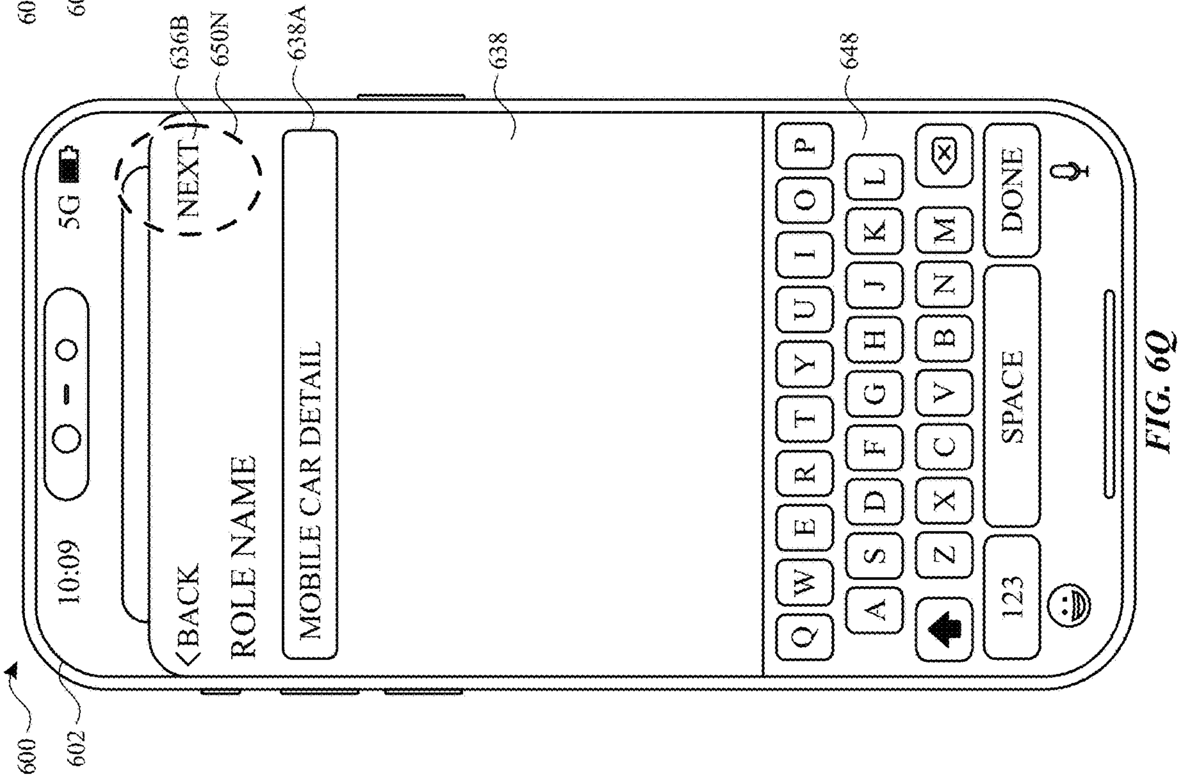

At FIG. 6Q, in response to receiving input 650M, computer system 600 displays role name user interface 638, which includes role name field 638A. Computer system 600 receives alphanumeric input at keyboard 648 and, in response, enters the name into role name field 638A. Subsequently, computer system 600 receives input 650N (e.g., a tap input, a touch input, and/or an air gesture) directed to next option 636B.

Figure 6R:
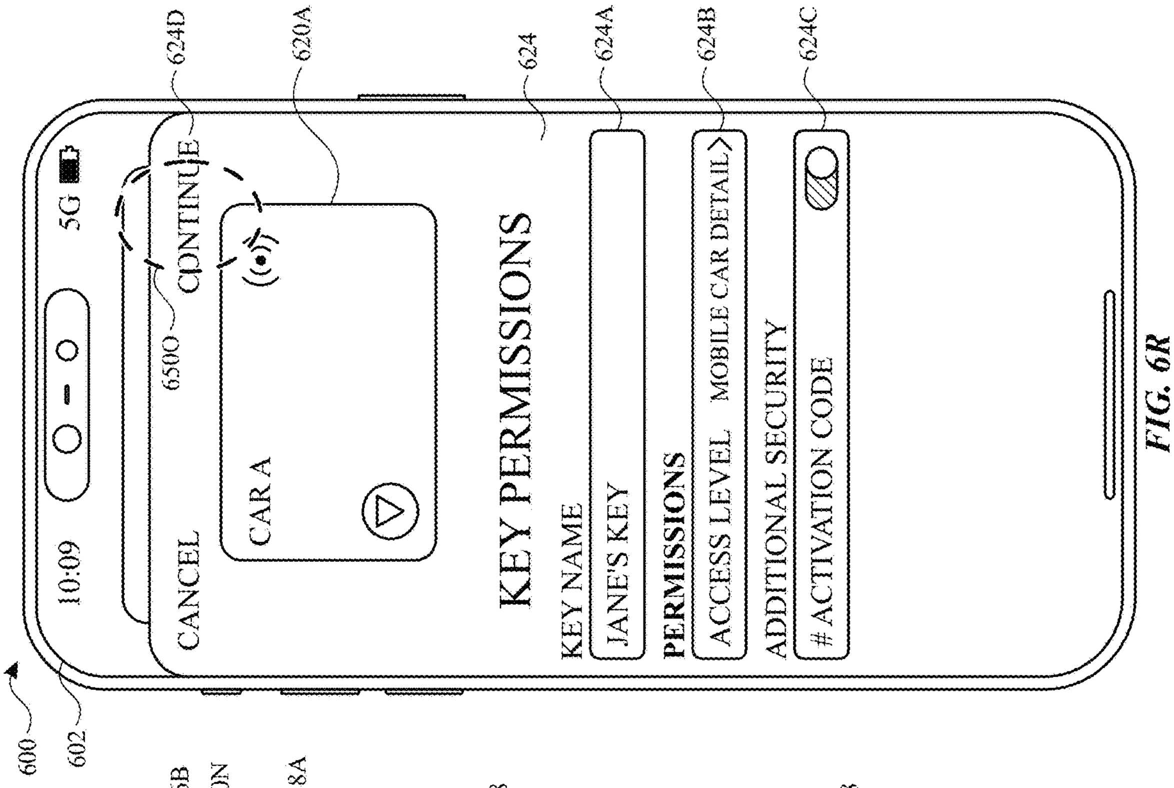

At FIG. 6R, in response to receiving input 650N, computer system 600 returns to displaying sharing user interface 624, with name field 624A updated (e.g., to Jane's Key, based on input at FIG. 6L) and permissions field 624B reflecting the newly created role of "Mobile Car Detail" (e.g., based on input at FIGS. 6N-6Q). At FIG. 6R, computer system 600 receives input 650O (e.g., a tap input, a touch input, and/or an air gesture) directed to continue option 624D.

Figure 6T:
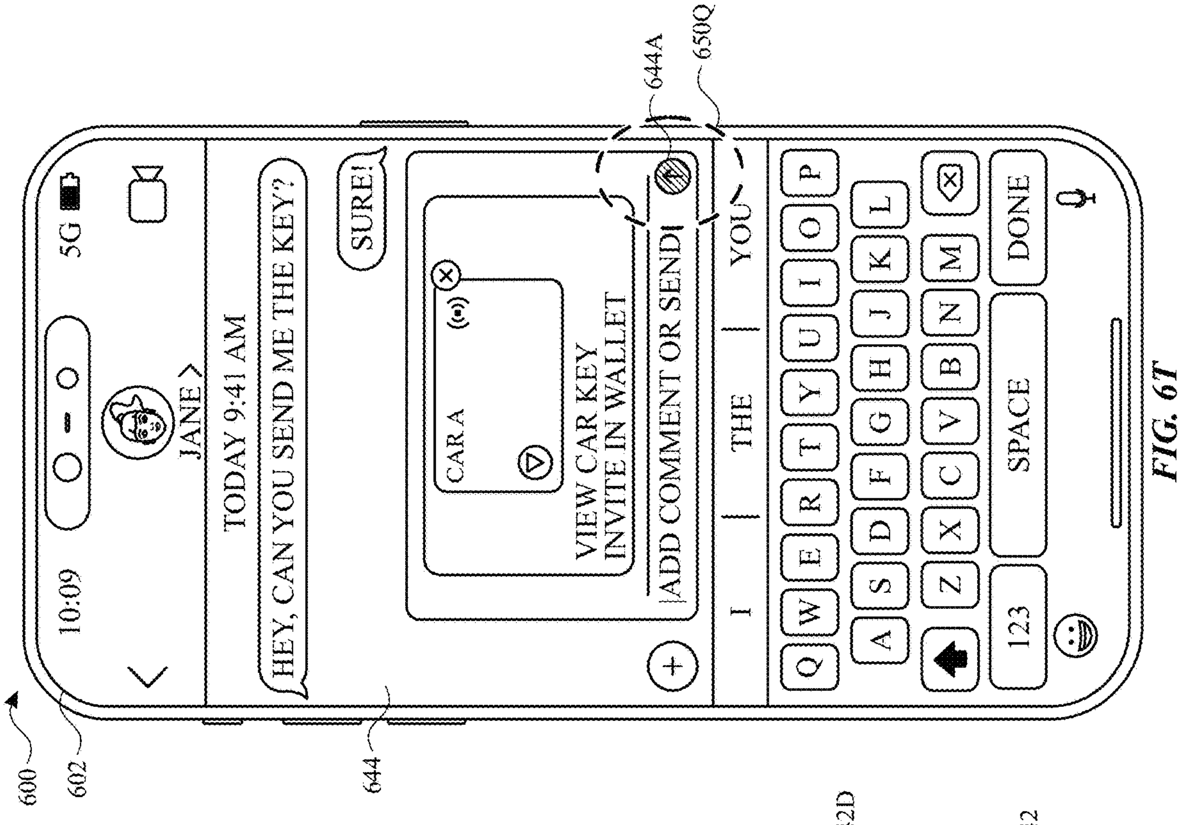
Figure 6S:
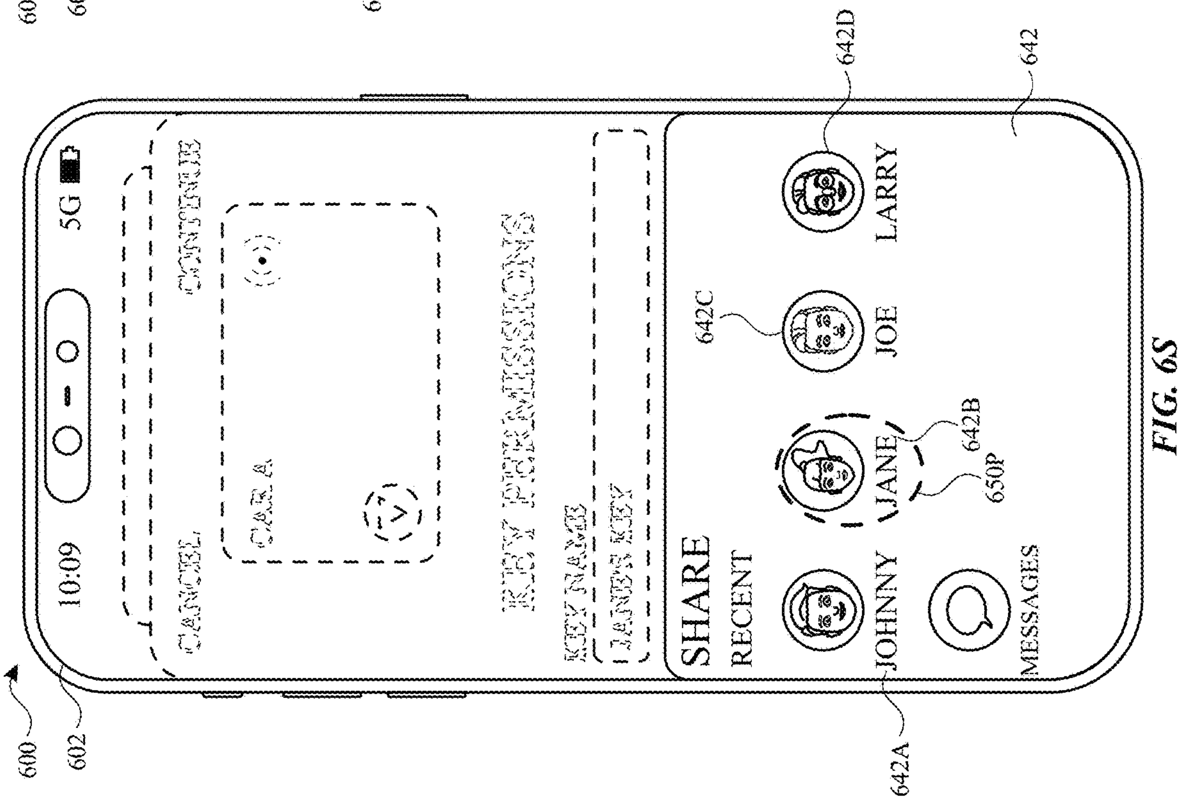

At FIG. 6S, in response to receiving input 650O, computer system 600 displays user interface 642, which includes options 642A-642D for selecting a recipient of the car key. At FIG. 6S, computer system 600 receives input 650P directed to option 642B corresponding to user Jane. At FIG. 6T, computer system 600 displays a message that includes the credential information corresponding to the car key for the first vehicle to be sent to Jane, as part of messaging conversation 644. At FIG. 6T, computer system 600 receives input 650Q (e.g., a tap input, a touch input, and/or an air gesture) directed to send option 644A and, in response, transmits message 644B as part of messaging conversation 644, as shown in FIG. 6U. Accordingly, computer system 600 has shared credential information for the car key for the first vehicle with Jane, enabling Jane to provision Jane's computer system with the car key having access to the first vehicle with the permissions defined by the mobile car detail role.

Figure 6V:
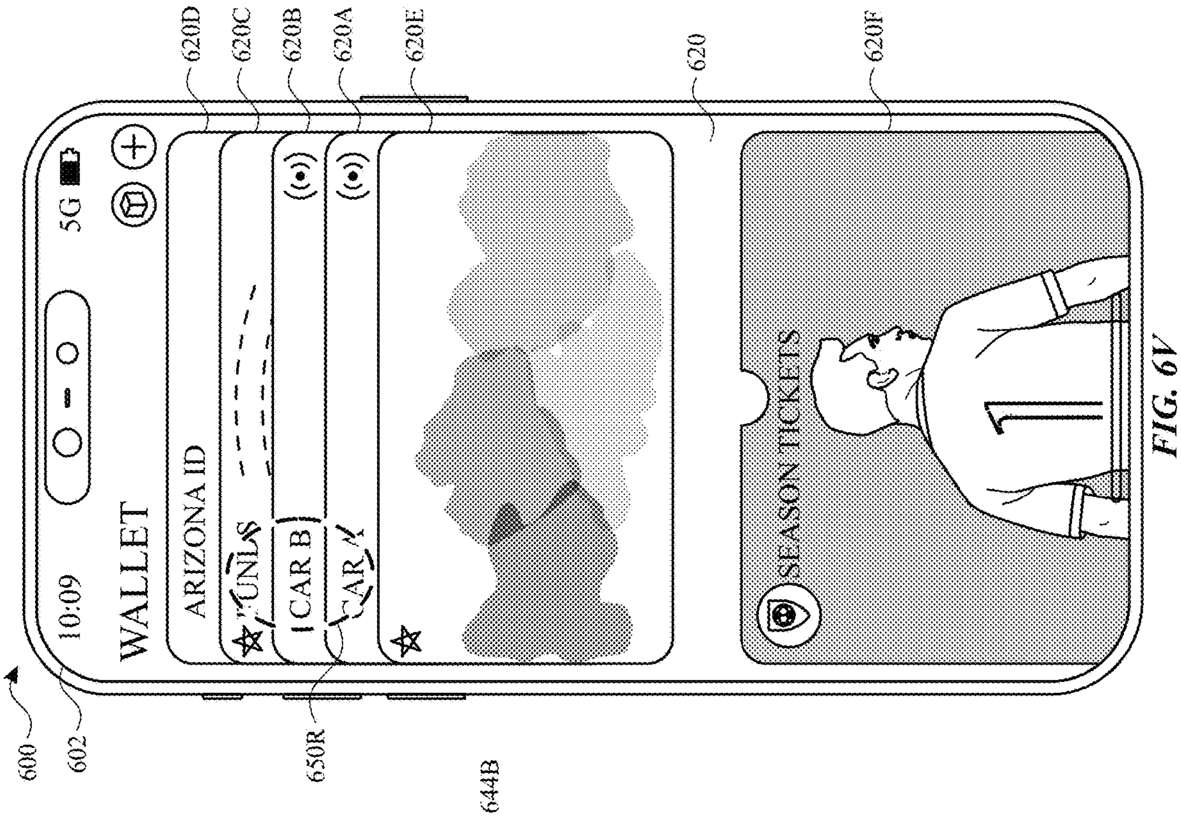
Figure 6U:
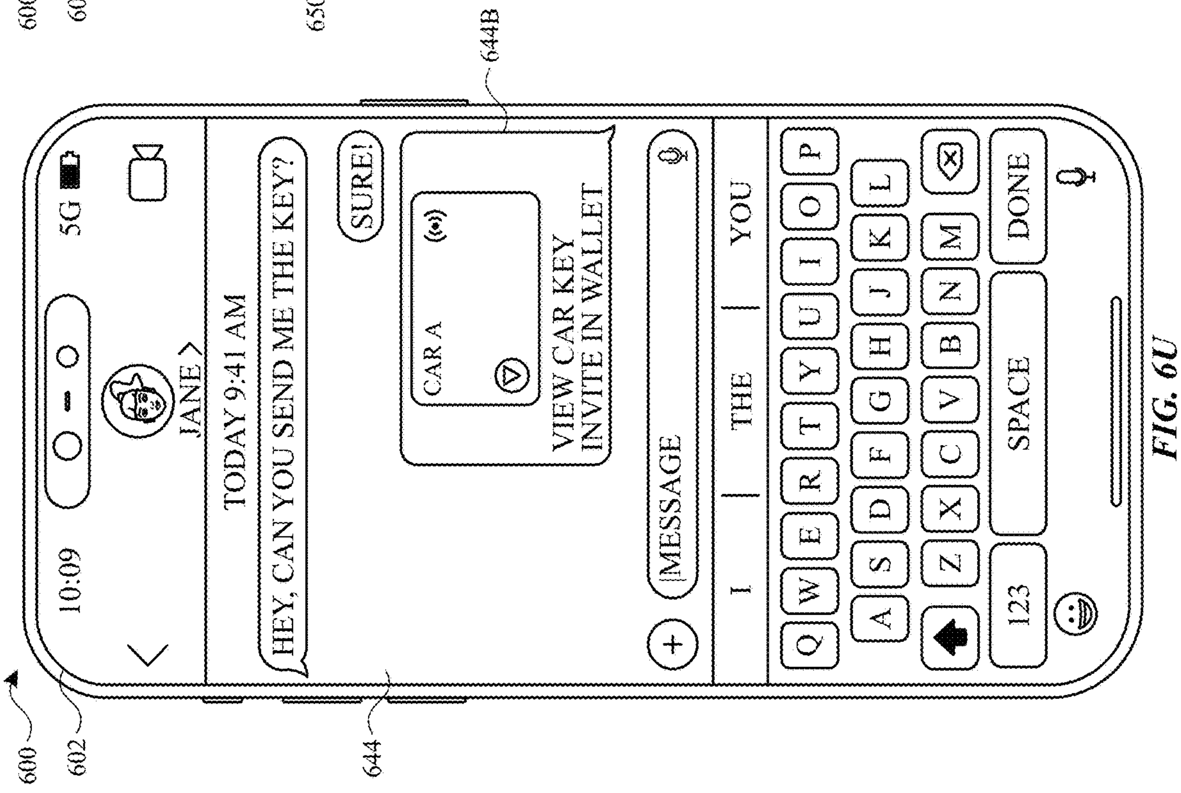
Figure 6X:
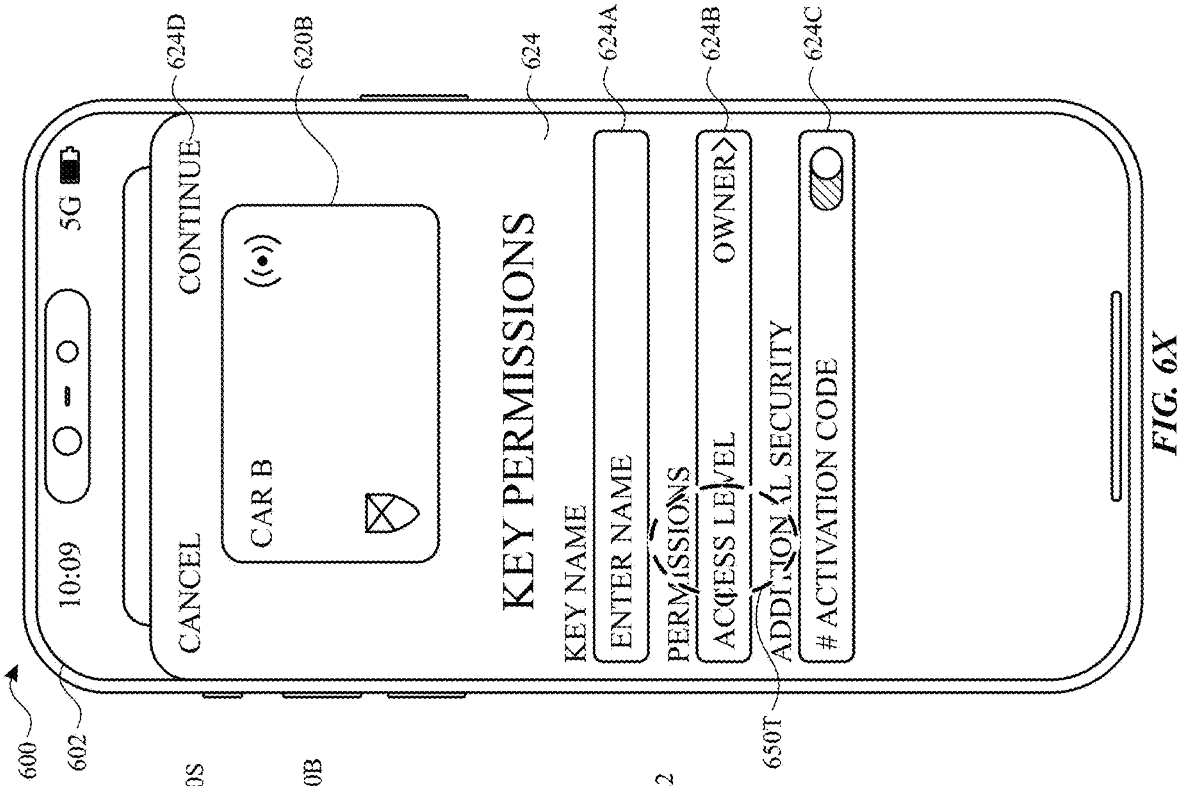

At FIG. 6V, computer system 600 again displays wallet user interface 620. As described above, the credentials of the car key corresponding to indication 620B are stored in a secure element of computer system 600 and enable computer system 600 to unlock the second vehicle, start the second vehicle, monitor settings of the second vehicle, and/or open windows of the second vehicle. At FIG. 6V, computer system 600 receives input 650R (e.g., a tap input, a touch input, and/or an air gesture) directed to indication 620B of the car key of the second vehicle.

Figure 6W:
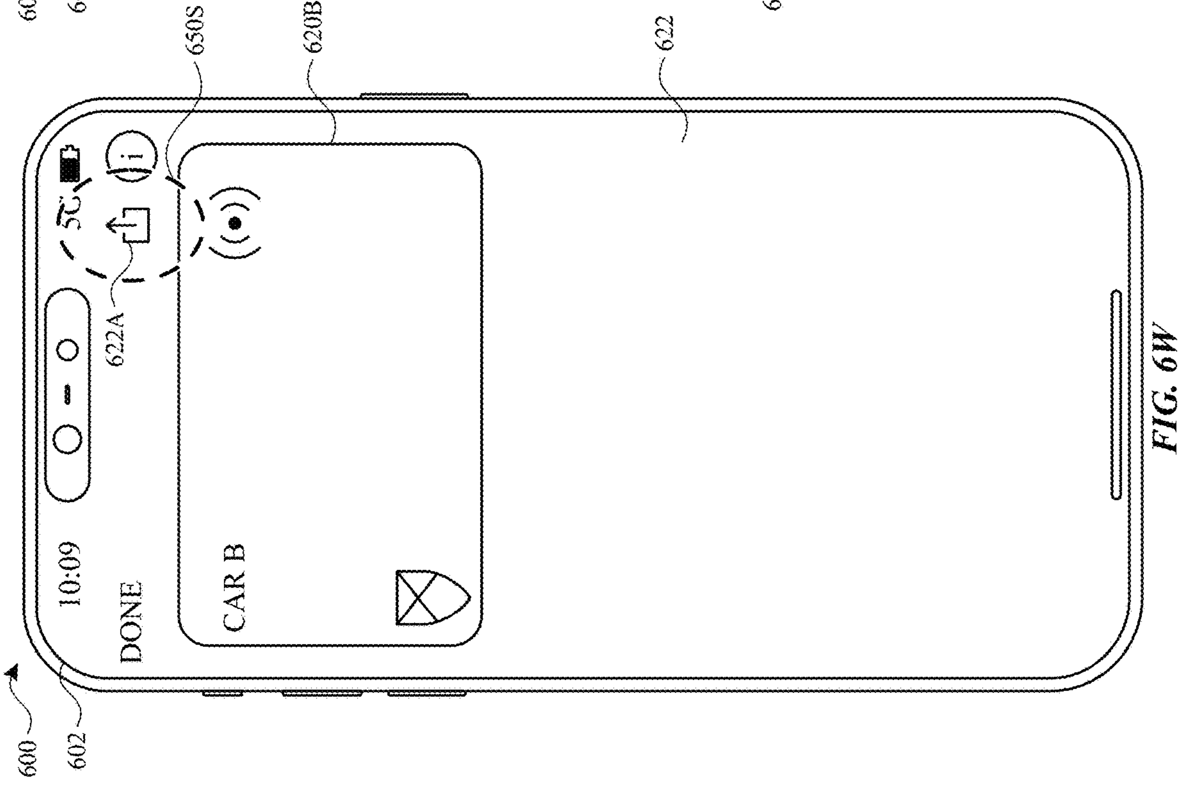

At FIG. 6W, in response to receiving input 650R, computer system 600 displays indication 620B of the car key (e.g., without displaying indications of other accounts provisioned onto computer system 600) along with share option 622A as part of car key user interface 622. In some embodiments, car key user interface 622 provides additional information about the car key (e.g., previous usage of the car key, types of vehicle access that are enabled, other users with which the car key is shared, and/or information about the second vehicle for which the car key is configured to provide access). At FIG. 6W, computer system 600 receives input 650S (e.g., a tap input, a touch input, and/or an air gesture) directed to share option 622A.

At FIG. 6X, in response to receiving input 650S, computer system 600 initiates a process to share the car key of the second vehicle with another device and/or user, including displaying share user interface 624. Sharing user interface 624 includes name field 624A for receiving user input of a name of the shared key, permissions field 624B for receiving user input selecting an access level that should be provided to the second vehicle, and activation code option 624C for toggling an activation code option that requires the recipient of the shared key to enter an activation code for additional security. At FIG. 6X, computer system 600 receives input 650T (e.g., a tap input, a touch input, and/or an air gesture) directed to permissions field 624B.

At FIG. 6Y, in response to receiving input 650T, computer system 600 displays access user interface 626. Access user interface 626 enables computer system 600 to receive user inputs to specify the level of access the shared key should provide to the device and/or user with which the car key is shared. Access user interface 626 includes a plurality defined roles 626A (e.g., the same as in FIG. 6M). In comparison to access user interface 626 at FIG. 6M, access user interface 626 at FIG. 6U now includes the previously created role of "Mobile Car Detail", as shown by mobile car detail role option 626C. Thus, the role that the user previously created has been saved and is now available for the user to select when sharing keys with other devices and/or users, thereby reducing the need for the user to provide inputs to again select the same levels of access to the vehicle (e.g., the second vehicle) for the car key being shared. At FIG. 6Y, computer system 600 has received input 650 directed to mobile car detail role option 626C and, in response, has displayed a check mark next to the option to indicate that the option is selected. Thus, the user can proceed to share the car key for the second vehicle with others by reusing the previously created mobile car detail role.

FIG. 7 is a flow diagram illustrating a method for managing car key credentials using a computer system, in accordance with some embodiments. Method 700 is performed at a computer system (e.g., 100, 300, 500, 600, and/or 630) (e.g., a smartphone, a wearable device (e.g., a smartwatch), a tablet computer, a desktop computer, a laptop computer, and/or a head-mounted device (e.g., a head-mounted augmented reality and/or extended reality device)) that is in communication with (e.g., includes and/or is connected to) one or more input devices (e.g., a touch-sensitive surface, RF circuitry (e.g., 108), a near-field communication (NFC) reader, a keyboard, mouse, trackpad, one or more optical sensors for detecting a QR code, barcode, a gaze, and/or gestures, one or more capacitive sensors for detecting hover inputs, a microphone, and/or accelerometer/gyroscope/inertial measurement units). In some embodiments, the computer system is in communication with one or more display generation components (e.g., a display controller, a touch-sensitive display system, a display screen, a monitor, a projector, a holographic display, and/or a head-mounted display system). Some operations in method 700 are, optionally, combined, the orders of some operations are, optionally, changed, and some operations are, optionally, omitted.

As described below, method 700 provides an intuitive way for managing car key credentials. The method reduces the cognitive burden on a user for managing car key credentials, thereby creating a more efficient human-machine interface. For battery-operated computing devices, enabling a user to manage car key credentials faster and more efficiently conserves power and increases the time between battery charges.

During a setup process (702) (e.g., as shown in FIGS. 6A-6H) of the computer system (e.g., 600) (e.g., an initial setup process, a setup process initiated to personalize the computer system for use by a user, an initial setup of the computer system, and/or a first configuration of the computer system performed by an end user), the computer system (e.g., 600) receives (704), via the one or more input devices, a request (e.g., 650C) to provision the computer system (e.g., 600) with a secure credential that is configured to provide authorization to use one or more functions of a vehicle (e.g., car, truck, motorcycle, a boat, and/or a plane).

During the setup process (704) (e.g., as shown in FIGS. 6A-6H) of the computer system (e.g., 600), in response to receiving the request (e.g., 650C) to provision the computer system (e.g., 600) with a secure credential that is configured to provide authorization to use one or more functions of the vehicle (and, optionally, in accordance with a determination that a second computer system, different from the computer system, has a secure credential that is configured to provide authorization to use one or more functions of the vehicle), the computer system (e.g., 600) initiates (706) a process (e.g., as shown in FIGS. 6D-6G) to provision the computer system (e.g., 600) with a secure credential that is configured to provide authorization to use one or more functions of the vehicle, wherein as part of the process a second computer system (e.g., 630), different from the computer system (e.g., 600), that is provisioned with a secure credential that is configured to provide authorization to use one or more functions of the vehicle, prompts (e.g., 640A and/or 640B) (e.g., by displaying a request via a display of the second computer system) for authorization (e.g., prompts a user for authorization via a password, a passcode, and/or biometric authentication) to provide (e.g., transmit, directly or indirectly) credential information corresponding to the vehicle to the computer system (e.g., 600).

The computer system (e.g., 600) receives (708) (e.g., during or after the setup process of the computer system), as part of the process to provision the computer system with a secure credential that is configured to provide authorization to use one or more functions of the vehicle, credential information from the second computer system (e.g., 630) based on (e.g., in accordance with) the second computer system (e.g., 630) receiving authorization (e.g., via a password, a passcode, and/or biometric authentication provided at the second computer system) to provide the credential information to the computer system (e.g., 600).

The computer system (e.g., 600) provisions (710) (e.g., during or after the setup process of the computer system and/or in response to receiving the credential information from the second computer system), using the credential information, the computer system (e.g., 600) with a secure credential that is configured to provide authorization to use one or more functions of the vehicle. In some embodiments, provisioning the computer system with the secure credential includes adding and/or storing credentials in a secure element of the computer system. In some embodiments, the secure credential provisioned onto the computer system is configured to enable (e.g., start and/or turn on) the vehicle, unlock the vehicle, and/or unlock doors of the vehicle. In some embodiments, the secure credential provisioned onto the computer system is a token or device-specific identifier corresponding to the vehicle. In some embodiments, while the computer system is provisioned with the secure credential that is configured to provide authorization to use one or more functions of the vehicle, the computer system uses the secure credential to unlock the vehicle, to turn on the vehicle, and/or to lock the vehicle (e.g., in response to user input and/or automatically). Provisioning the computer system with a secure credential to access a vehicle using credential information from a second computer system that already has access to the vehicle enables the computer system to provide vehicle access without the need for the computer system to communicate with or be within range of the vehicle, thereby improving the man-machine interface.

In some embodiments, during the setup process (e.g., as shown in FIGS. 6A-6H) of the computer system (e.g., 600): the computer system (e.g., 600) receives, via the one or more input devices (e.g., via user input on a touchscreen and/or via wireless communication from an external device), account credentials (e.g., login, password, and/or authentication token) corresponding to a first user of a service (e.g., as in FIG. 6B); and logs into the service, using the account credentials, as the first user. In some embodiments, the request to provision the computer system (e.g., 600) with a secure credential that is configured to provide authorization to use one or more functions of a vehicle (e.g., car, truck, motorcycle, a boat, and/or a plane) is received while logged into the service as the first user. In some embodiments, the second computer system (e.g., 630) is logged into the service as the first user.

In some embodiments, provisioning, using the credential information, the computer system (e.g., 600) with the secure credential that is configured to provide authorization to use one or more functions of the vehicle does not include communication with the vehicle. In some embodiments, the computer system and the second computer system do not directly or indirectly communicate with the vehicle. In some embodiments, the vehicle does not communicate with any entities during the setup process of the computer system and/or during the process for provisioning the computer system with the secure credential. In some embodiments, the computer system is provisioned with the secure credential without the need for the computer system to be in communication with the vehicle. Provisioning the computer system with a secure credential to access a vehicle without the need for the computer system to communicate with or be within range of the vehicle enables the computer system to be provisioned with the secure credential at a time and location of the user's preference, rather than needing to be next to the vehicle, thereby improving the man-machine interface.

In some embodiments, provisioning, using the credential information, the computer system (e.g., 600) with the secure credential that is configured to provide authorization to use one or more functions of the vehicle occurs independent of the computer system being within range (e.g., wireless communication range and/or visual range) of the vehicle. In some embodiments, the computer system and the second computer system do not need to be near the vehicle during the setup or provisioning process. In some embodiments, the computer system is provisioned with the secure credential without the need for the computer system to be within any threshold distance of the vehicle. Provisioning the computer system with a secure credential to access a vehicle without the need for the computer system to communicate with or be within range of the vehicle enables the computer system to be provisioned with the secure credential at a time and location of the user's preference, rather than needing to be next to the vehicle, thereby improving the man-machine interface.

In some embodiments, during the process to provision the computer system (e.g., 600) with a secure credential that is configured to provide authorization to use one or more functions of the vehicle, one or more credentials configured to provide authorization to use one or more functions of the vehicle are removed from the second computer system (e.g., 630). In some embodiments, the second computer system loses access (e.g., some or all access) to the vehicle in order for the computer system to be provisioned to access the vehicle. Transferring the vehicle access from the second computer system to the computer system (e.g., removing the second computer system's access to the vehicle) helps to keep access to the vehicle secure by limiting the ability to duplicate access, thereby improving access security.

In some embodiments, subsequent to (and, optionally, during) provisioning the computer system (e.g., 600) with a secure credential that is configured to provide authorization to use one or more functions of the vehicle, the second computer system (e.g., 630) maintains one or more credentials configured to provide authorization to use one or more functions of the vehicle. In some embodiments, the second computer system keeps access (e.g., some or all access) to the vehicle, even after the computer system is provisioned to access the vehicle. Maintaining access to the vehicle at the second computer system after provisioning the computer system with access to the vehicle enables multiple device access to the same vehicle, thereby reducing the likelihood of being locked out of the vehicle and increasing access to the vehicle, thereby improving the man-machine interface.

In some embodiments, the prompt (e.g., 640A and/or 640B) (e.g., by displaying a request via a display of the second computer system) for authorization (e.g., prompts a user for authorization via a password, a passcode, and/or biometric authentication) by the second computer system (e.g., 630) to provide (e.g., transmit, directly or indirectly) credential information corresponding to the vehicle includes a prompt for a password, a passcode, and/or biometric (e.g., facial, fingerprint, and/or eye-based) authentication. Requiring a successful entry of a password, passcode, and/or biometric authentication at the second computer system before the second computer system transmits credential information about the vehicle to the computer systems helps to prevent unauthorized access of the credential information and of the vehicle, thereby providing improved security.

Note that details of the processes described above with respect to method 700 (e.g., FIG. 7) are also applicable in an analogous manner to the methods described below. For example, method 800 optionally includes one or more of the characteristics of the various methods described above with reference to method 700. For example, the computer systems are the same computer systems. For another example, the car keys provisioned and then shared are the same car keys. For another example, the vehicles are the same vehicles. For brevity, these details are not repeated below.

FIGS. 8A-8B are a flow diagram illustrating a method for managing car key credentials using a computer system, in accordance with some embodiments. Method 800 is performed at a computer system (e.g., 100, 300, 500, 600, and/or 630) that is in communication with (e.g., includes and/or is connected to) one or more display generation components (e.g., a display controller, a touch-sensitive display system, a display screen, a monitor, a projector, a holographic display, and/or a head-mounted display system) and one or more input devices (e.g., a touch-sensitive surface, RF circuitry (e.g., 108), a near-field communication (NFC) reader, a keyboard, mouse, trackpad, one or more optical sensors for detecting a QR code, barcode, a gaze, and/or gestures, one or more capacitive sensors for detecting hover inputs, a microphone, and/or accelerometer/gyroscope/inertial measurement units).

The computer system (e.g., 600) receives (802), via the one or more input devices, a request (e.g., 650H) (e.g., touch input, a gesture, an air gesture, and/or cursor input) to display available roles for sharing a first credential that is configured to provide authorization to use one or more functions of a first vehicle (e.g., car, truck, motorcycle, a boat, and/or a plane).

In response to receiving the request (e.g., 650H) to display available roles for sharing the first credential, the computer system (e.g., 600) displays (804), via the one or more display generation components (e.g., 602), available roles (e.g., 626A1-626A4) for sharing the first credential, including displaying (e.g., without displaying any representation of a role that corresponds to authorization to use a third set of one or more functions of the vehicle): a representation of a first role (e.g., 626A1) that corresponds to (e.g., includes and/or provides) authorization to use a first set of one or more functions of a vehicle, and a representation of a second role (e.g., 626A2), different from the first role, that corresponds to (e.g., includes and/or provides) authorization to use a second set of one or more functions, different from the first set of one or more functions, of a vehicle.

The computer system (e.g., 600) receives (806) (e.g., subsequent to displaying available roles for sharing the first credential), via the one or more input devices, a request (e.g., 650J) (e.g., touch input, a gesture, an air gesture, and/or cursor input) to create a new role for sharing the first credential.

In response to receiving the request (e.g., 650J) to create a new role for sharing the first credential, the computer system (e.g., 600) initiates (808) a process (e.g., as shown in FIGS. 6N-6Q) to create a new role for sharing the credential.

During (810) the process (e.g., as shown in FIGS. 6N-6Q) to create the role for sharing the credential, the computer system (e.g., 600) receives (812), via the one or more input devices, user input (e.g., 650K, 650L, and/or 650M) that includes selection of a third set of one or more functions, different from the first set of one or more functions and the second set of one or more functions, of a vehicle.

During (810) the process (e.g., as shown in FIGS. 6N-6Q) to create the role for sharing the credential, the computer system (e.g., 600) creates (814), based on (e.g., in response to) the user input that includes selection of the third set of one or more functions, a third role (e.g., corresponding to 626C) that corresponds to the third set of one or more functions and that is different from the first role and the second role.

Subsequent to creating the third role that corresponds to the third set of one or more functions of a vehicle, the computer system (e.g., 600) receives (816), via the one or more input devices, a request (e.g., 650S directed to 622A, but for CAR A) to share the first credential with a remote user using the third role.

In response to receiving the request to share the first credential with the remote user using the third role, the computer system (e.g., 600) initiates (818) a process to share the first credential with the remote user using the third role, wherein the process includes providing the remote user with authorization to use the third set of one or more functions of the first vehicle (and, optionally, without providing the remote user access to at least one function of the first vehicle that is included in the first set and/or the second set of one or more functions).

In some embodiments, the computer system displays a list of existing roles from among which selection can be made. In some embodiments, the set of one or more functions include an indication of whether the recipient of car key can share the key with others. In some embodiments, the set of one or more functions include an indication of whether the recipient of car key can see other user accounts having access to the car key (e.g., other than those with whom they share the car key).

In some embodiments, subsequent to creating the third role that corresponds to the third set of one or more functions, the computer system (e.g., 600) receives, via the one or more input devices, a second request (e.g., 650S) (e.g., touch input, a gesture, an air gesture, and/or cursor input) to display available roles for sharing a second credential (e.g., for CAR B), different from the first credential (e.g., for CAR A), that is configured to provide authorization to use one or more functions of a second vehicle (e.g., car, truck, motorcycle, a boat, and/or a plane) that is different from the first vehicle. In response to receiving the second request (e.g., 650T) to display available roles for sharing the second credential, the computer system (e.g., 600) displays (e.g., as in FIG. 6Y), via the one or more display generation components (e.g., 602), available roles for sharing the second credential, including displaying: a representation of the first role (e.g., 626A1) that corresponds to (e.g., includes and/or provides) authorization to use the first set of one or more functions of a vehicle, a representation of the second role (e.g., 626A2) that corresponds to (e.g., includes and/or provides) authorization to use the second set of one or more functions of a vehicle, and a representation of the third role (e.g., 626C) that corresponds to (e.g., includes and/or provides) authorization to use the third set of one or more functions of a vehicle. In some embodiments, the computer system initiates a process to share the second credential with a second remote user (different from the remote user) using the third role, wherein the process includes providing the second remote user with authorization to use the third set of one or more functions of the second vehicle.

Note that details of the processes described above with respect to method 800 (e.g., FIGS. 8A-8B) are also applicable in an analogous manner to the methods described above. For example, method 700 optionally includes one or more of the characteristics of the various methods described above with reference to method 800. For example, the computer systems are the same computer systems. For another example, the car keys provisioned and then shared are the same car keys. For another example, the vehicles are the same vehicles. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve management of car key credentials. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to manage car key credentials. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of managing car key credentials, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, car key credentials can be managed by inferring preferences based on non-personal information data or a bare minimum amount of personal information, such as the content being requested by the device associated with a user, other non-personal information.

What is claimed is:

1. A computer system configured to communicate with one or more input devices, comprising:

one or more processors; and memory storing one or more programs configured to be executed by the one or more processors, the one or more programs including instructions for:

during a setup process of the computer system:

receiving, via the one or more input devices, a request to provision the computer system with a secure credential that is configured to provide authorization to use one or more functions of a vehicle; and in response to receiving the request to provision the computer system with a secure credential that is configured to provide authorization to use one or more functions of the vehicle, initiating a process to provision the computer system with a secure credential that is configured to provide authorization to use one or more functions of the vehicle, wherein as part of the process a second computer system, different from the computer system, that is provisioned with a secure credential that is configured to provide authorization to use one or more functions of the vehicle, displays a prompt for authorization to provide credential information corresponding to the vehicle to the computer system;

responsive to the second computer system receiving authorization, via one or more input devices of the second computer system, to provide credential information corresponding to the vehicle to the computer system:

receiving, as part of the process to provision the computer system with a secure credential that is configured to provide authorization to use one or more functions of the vehicle, credential information from the second computer system based on the second computer system receiving authorization to provide the credential information to the computer system; and provisioning, using the credential information, the computer system with a secure credential that is configured to provide authorization to use one or more functions of the vehicle.

2. The computer system of claim 1, the one or more programs further including instructions for:

during the setup process of the computer system:

receiving, via the one or more input devices, account credentials corresponding to a first user of a service; and logging into the service, using the account credentials, as the first user;

wherein the request to provision the computer system with a secure credential that is configured to provide authorization to use one or more functions of a vehicle is received while logged into the service as the first user; and wherein the second computer system is logged into the service as the first user.

3. The computer system of claim 1, wherein provisioning, using the credential information, the computer system with the secure credential does not include communication with the vehicle.

4. The computer system of claim 1, wherein provisioning, using the credential information, the computer system with the secure credential that is configured to provide authorization to use one or more functions of the vehicle occurs independent of the computer system being within range of the vehicle.

5. The computer system of claim 1, wherein during the process to provision the computer system with a secure credential that is configured to provide authorization to use one or more functions of the vehicle, one or more credentials configured to provide authorization to use one or more functions of the vehicle are removed from the second computer system.

6. The computer system of claim 1, wherein subsequent to provisioning the computer system with a secure credential that is configured to provide authorization to use one or more functions of the vehicle, the second computer system maintains one or more credentials configured to provide authorization to use one or more functions of the vehicle.

7. The computer system of claim 1, wherein the prompt for authorization by the second computer system to provide credential information corresponding to the vehicle includes a prompt for a password, a passcode, and/or biometric authentication.

8. A non-transitory computer-readable storage medium storing one or more programs configured to be executed by one or more processors of a computer system that is in communication with one or more input devices, the one or more programs including instructions for:

during a setup process of the computer system:

receiving, via the one or more input devices, a request to provision the computer system with a secure credential that is configured to provide authorization to use one or more functions of a vehicle; and in response to receiving the request to provision the computer system with a secure credential that is configured to provide authorization to use one or more functions of the vehicle, initiating a process to provision the computer system with a secure credential that is configured to provide authorization to use one or more functions of the vehicle, wherein as part of the process a second computer system, different from the computer system, that is provisioned with a secure credential that is configured to provide authorization to use one or more functions of the vehicle, displays a prompt for authorization to provide credential information corresponding to the vehicle to the computer system;

responsive to the second computer system receiving authorization, via one or more input devices of the second computer system, to provide credential information corresponding to the vehicle to the computer system:

receiving, as part of the process to provision the computer system with a secure credential that is configured to provide authorization to use one or more functions of the vehicle, credential information from the second computer system based on the second computer system receiving authorization to provide the credential information to the computer system; and provisioning, using the credential information, the computer system with a secure credential that is configured to provide authorization to use one or more functions of the vehicle.

9. The non-transitory computer-readable storage medium of claim 8, the one or more programs further including instructions for:

during the setup process of the computer system:

receiving, via the one or more input devices, account credentials corresponding to a first user of a service; and logging into the service, using the account credentials, as the first user;

wherein the request to provision the computer system with a secure credential that is configured to provide authorization to use one or more functions of a vehicle is received while logged into the service as the first user; and wherein the second computer system is logged into the service as the first user.

10. The non-transitory computer-readable storage medium of claim 8, wherein provisioning, using the credential information, the computer system with the secure credential does not include communication with the vehicle.

11. The non-transitory computer-readable storage medium of claim 8, wherein provisioning, using the credential information, the computer system with the secure credential that is configured to provide authorization to use one or more functions of the vehicle occurs independent of the computer system being within range of the vehicle.

12. The non-transitory computer-readable storage medium of claim 8, wherein during the process to provision the computer system with a secure credential that is configured to provide authorization to use one or more functions of the vehicle, one or more credentials configured to provide authorization to use one or more functions of the vehicle are removed from the second computer system.

13. The non-transitory computer-readable storage medium of claim 8, wherein subsequent to provisioning the computer system with a secure credential that is configured to provide authorization to use one or more functions of the vehicle, the second computer system maintains one or more credentials configured to provide authorization to use one or more functions of the vehicle.

14. The non-transitory computer-readable storage medium of claim 8, wherein the prompt for authorization by the second computer system to provide credential information corresponding to the vehicle includes a prompt for a password, a passcode, and/or biometric authentication.

15. A method, comprising:

at a computer system that is in communication with one or more input devices:

during a setup process of the computer system:

receiving, via the one or more input devices, a request to provision the computer system with a secure credential that is configured to provide authorization to use one or more functions of a vehicle; and in response to receiving the request to provision the computer system with a secure credential that is configured to provide authorization to use one or more functions of the vehicle, initiating a process to provision the computer system with a secure credential that is configured to provide authorization to use one or more functions of the vehicle, wherein as part of the process a second computer system, different from the computer system, that is provisioned with a secure credential that is configured to provide authorization to use one or more functions of the vehicle, displays a prompt for authorization to provide credential information corresponding to the vehicle to the computer system;

responsive to the second computer system receiving authorization, via one or more input devices of the second computer system, to provide credential information corresponding to the vehicle to the computer system:

receiving, as part of the process to provision the computer system with a secure credential that is configured to provide authorization to use one or more functions of the vehicle, credential information from the second computer system based on the second computer system receiving authorization to provide the credential information to the computer system; and provisioning, using the credential information, the computer system with a secure credential that is configured to provide authorization to use one or more functions of the vehicle.

16. The method of claim 15, further comprising:

during the setup process of the computer system:

receiving, via the one or more input devices, account credentials corresponding to a first user of a service; and logging into the service, using the account credentials, as the first user;

wherein the request to provision the computer system with a secure credential that is configured to provide authorization to use one or more functions of a vehicle is received while logged into the service as the first user; and wherein the second computer system is logged into the service as the first user.

17. The method of claim 15, wherein provisioning, using the credential information, the computer system with the secure credential does not include communication with the vehicle.

18. The method of claim 15, wherein provisioning, using the credential information, the computer system with the secure credential that is configured to provide authorization to use one or more functions of the vehicle occurs independent of the computer system being within range of the vehicle.

19. The method of claim 15, wherein during the process to provision the computer system with a secure credential that is configured to provide authorization to use one or more functions of the vehicle, one or more credentials configured to provide authorization to use one or more functions of the vehicle are removed from the second computer system.

20. The method of claim 15, wherein subsequent to provisioning the computer system with a secure credential that is configured to provide authorization to use one or more functions of the vehicle, the second computer system maintains one or more credentials configured to provide authorization to use one or more functions of the vehicle.

21. The method of claim 15, wherein the prompt for authorization by the second computer system to provide credential information corresponding to the vehicle includes a prompt for a password, a passcode, and/or biometric authentication.

* * * * *